US006825751B1

(12) United States Patent
Kita et al.

(10) Patent No.: US 6,825,751 B1
(45) Date of Patent: Nov. 30, 2004

(54) DATA COMMUNICATION APPARATUS, WRISTWATCH TYPE ELECTRONIC DEVICE, AND AUTHENTICATION SYSTEM

(75) Inventors: Kazunori Kita, Tokyo (JP); Fusao Suga, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/472,095

(22) Filed: Dec. 23, 1999

(30) Foreign Application Priority Data

| Dec. 31, 1998 | (JP) | 10-377409 |
| Jan. 28, 1999 | (JP) | 11-020854 |
| Nov. 12, 1999 | (JP) | 11-322085 |

(51) Int. Cl.[7] ............................................. H04Q 1/00
(52) U.S. Cl. ................ 340/5.61; 340/10.52; 343/718; 455/351
(58) Field of Search .......................... 340/10.51, 10.52, 340/5.8, 5.61; 343/718; 455/351

(56) References Cited

U.S. PATENT DOCUMENTS

| 4,952,913 A | * | 8/1990 | Pauley et al. | ............ 340/573.4 |
| 5,532,705 A | * | 7/1996 | Hama | .......................... 343/718 |
| 5,926,144 A | * | 7/1999 | Bolanos et al. | ............. 343/718 |
| 6,278,873 B1 | * | 8/2001 | Itakura et al. | ............... 455/351 |

* cited by examiner

Primary Examiner—Brian Zimmerman
(74) Attorney, Agent, or Firm—Frishauf, Holtz, Goodman & Chick, P.C.

(57) ABSTRACT

A wristwatch comprises an ID Tag (data carrier) function applied to an RF-ID system. A watch main body comprises a reinforce resin-based case having band attachments to which wrist bands are engaged, and a resin-based bezel cover covering the upper section and outer periphery of the case. The case incorporates a display member composed of a fixing member, a resin-based display frame member, a hard glass member, and a waterproof packing, and a circuit member composed of a synthetic rubber-based module cover member, a module fixing member, a module and a module cover member. The case is sealed with a bottom cap member formed of a magnetic material via a waterproof packing, and is further covered with a resin-based case cover. A module comprises module housing members, a watch LSI substrate, a data carrier IC substrate having a data carrier IC that incorporates a control circuit for encoding/decoding and authenticating a transmitting/receiving signal and a data memory storing ID, and a data carrier antenna coil connected to the data carrier IC substrate and assembled at the outer periphery of the watch LSI substrate.

8 Claims, 67 Drawing Sheets

FIG.26
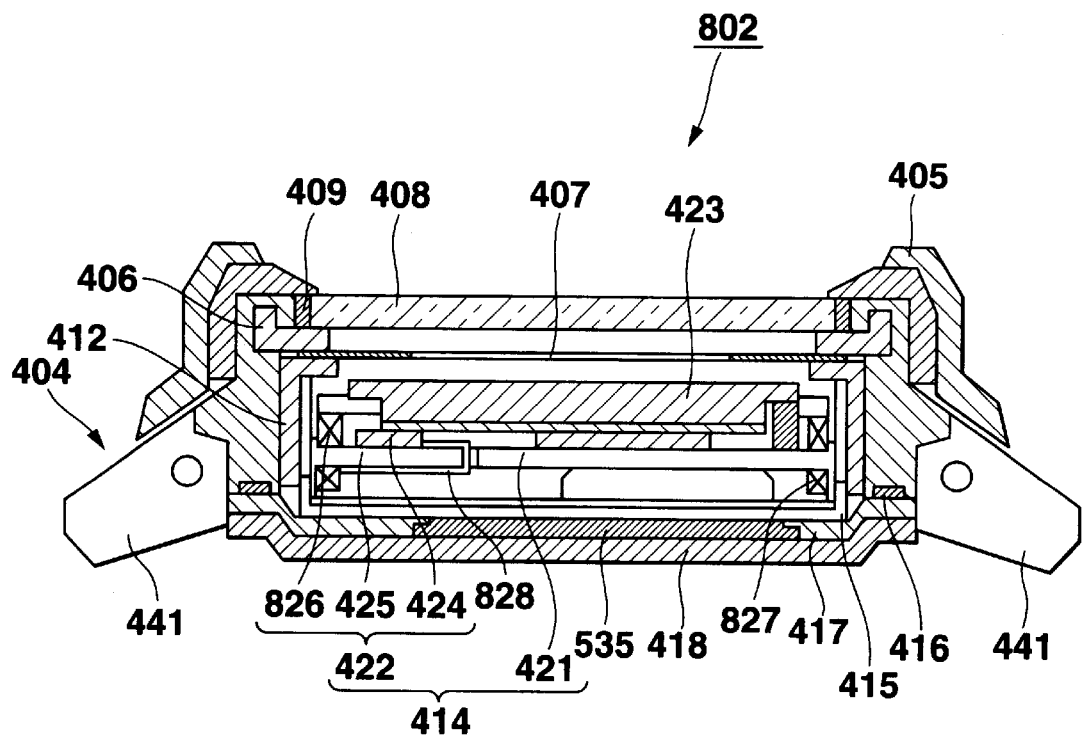
FIG.27A   FIG.27B   FIG.27C
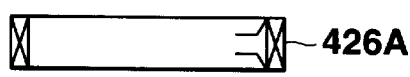
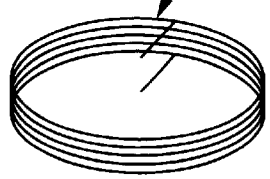
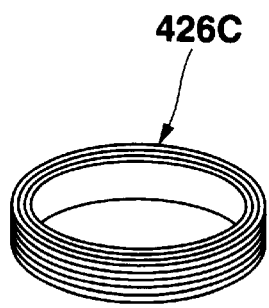

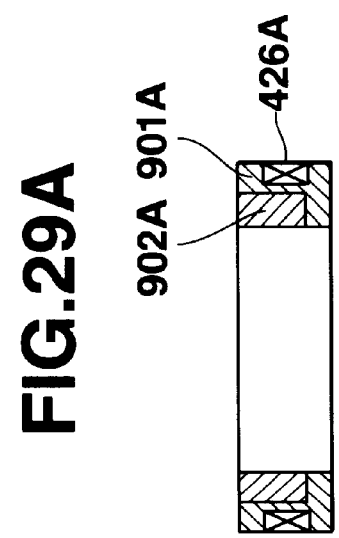
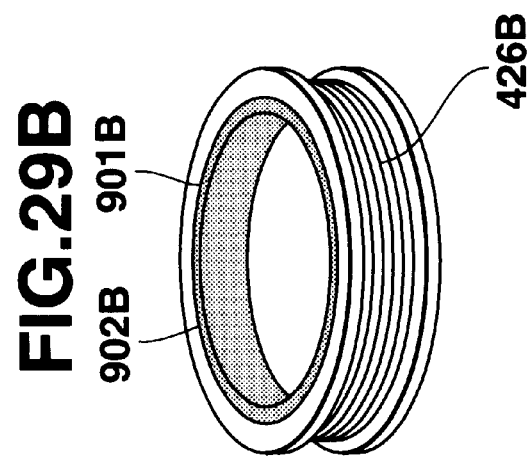
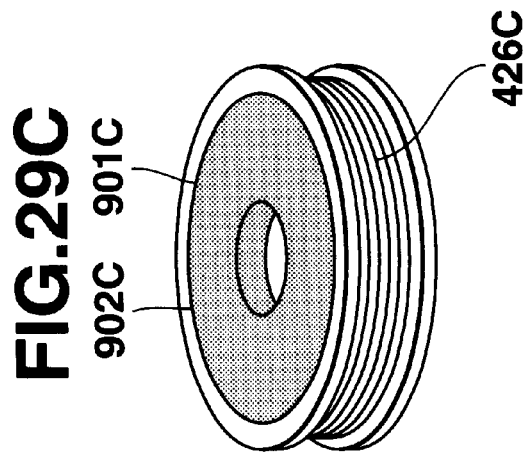

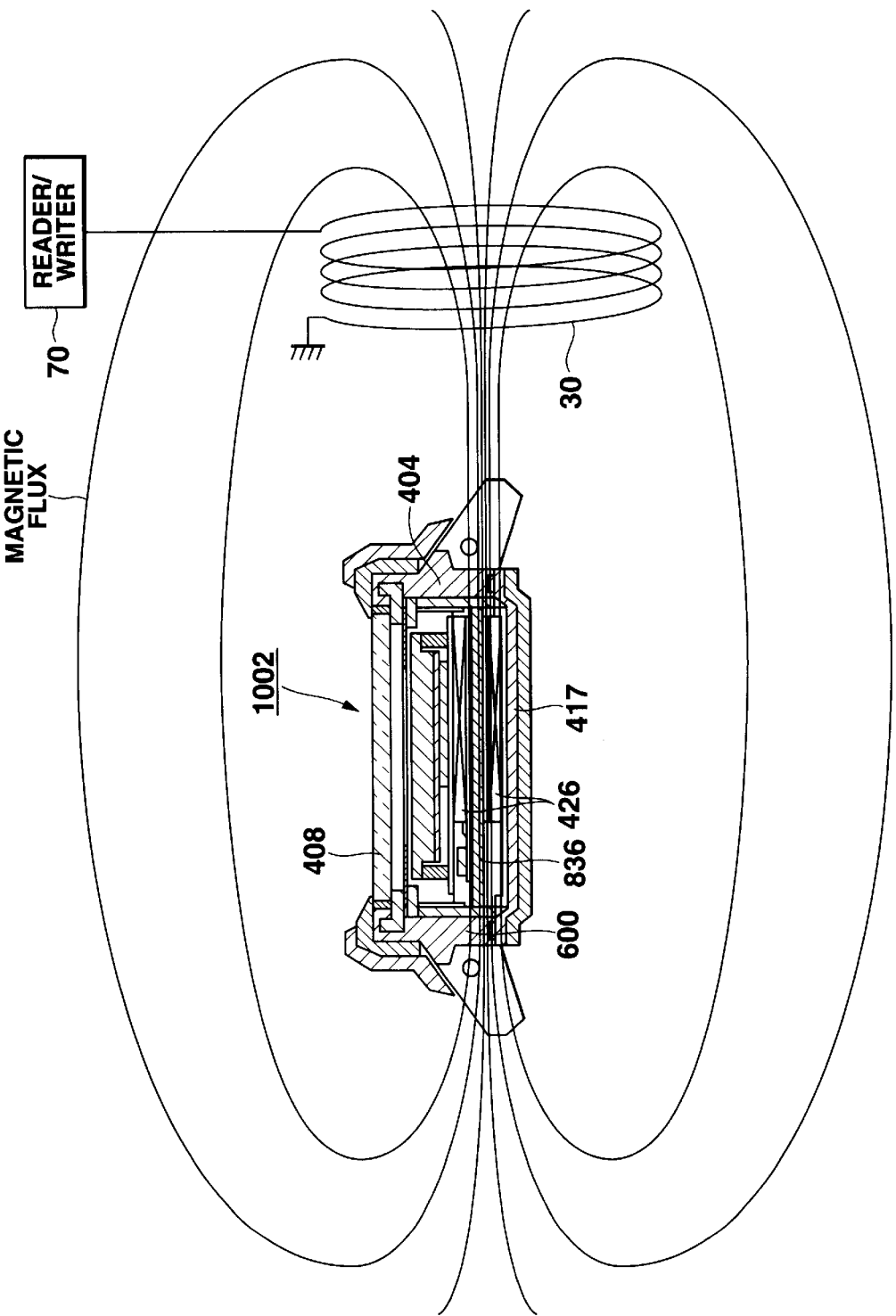

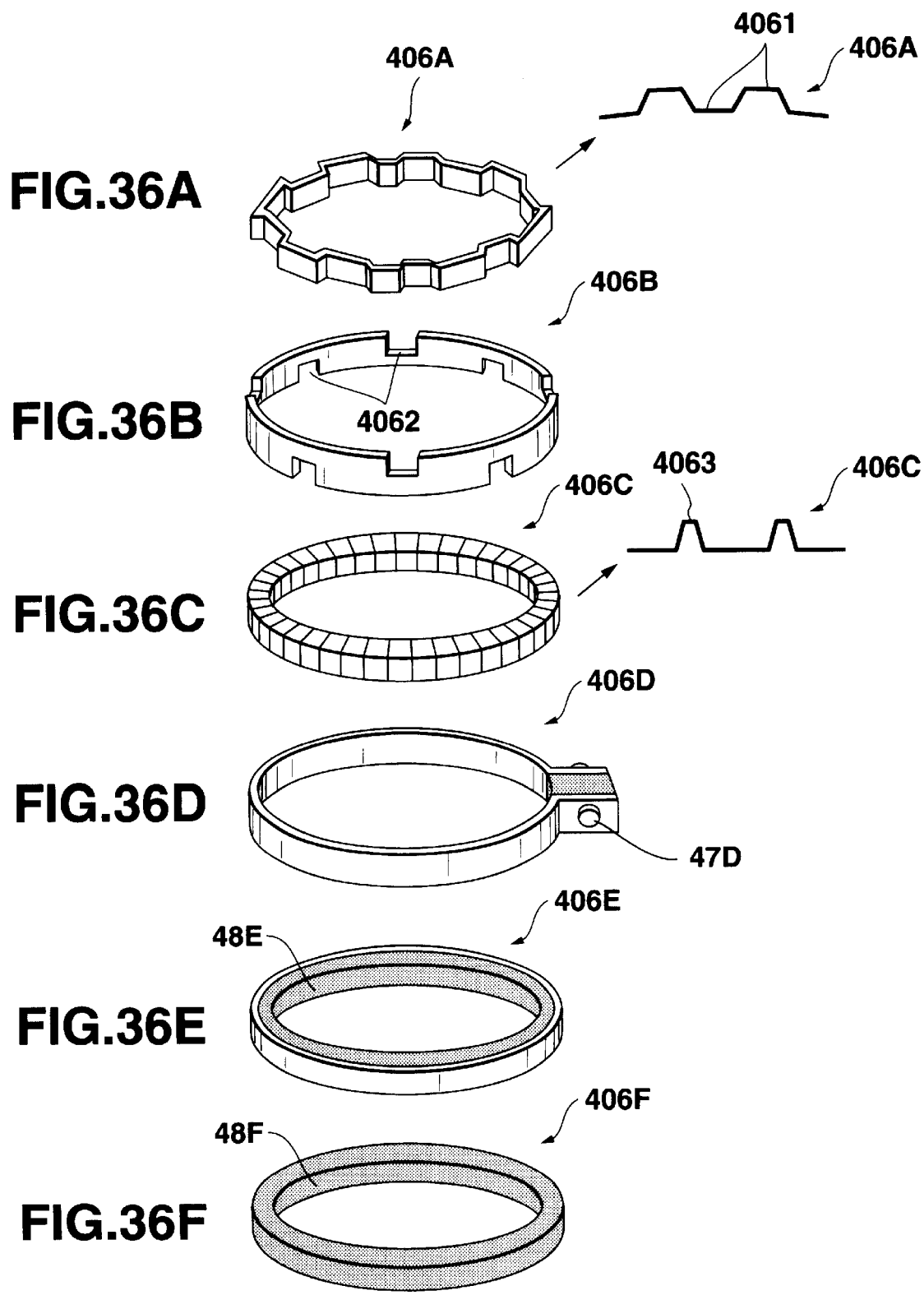

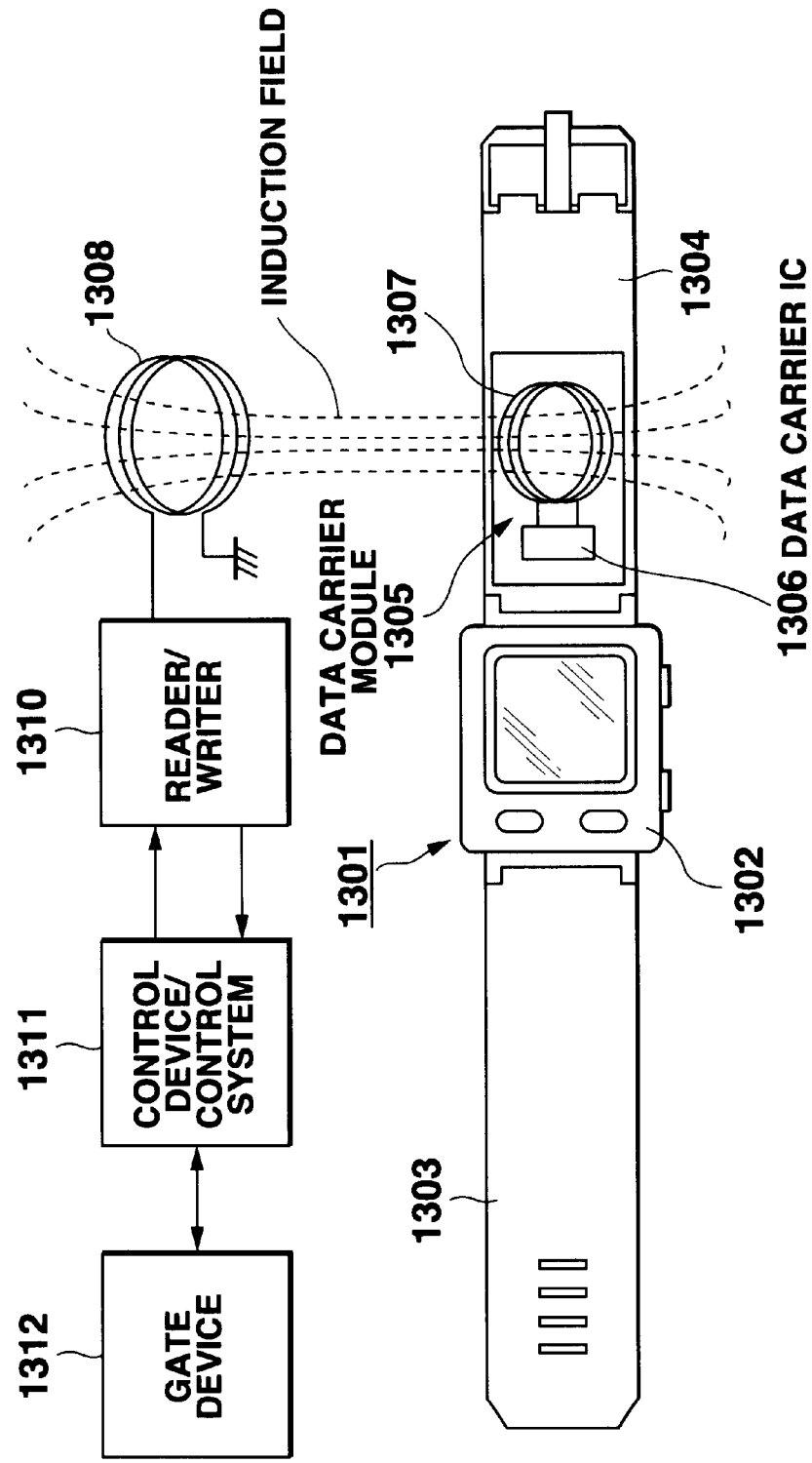

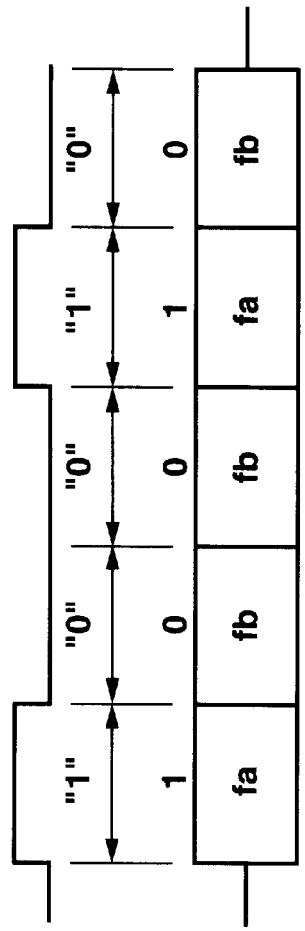
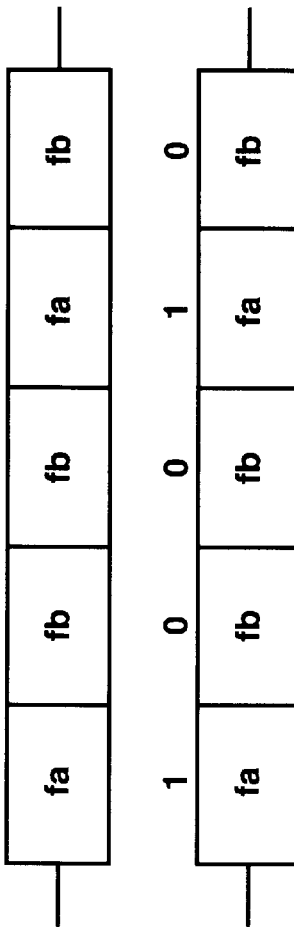
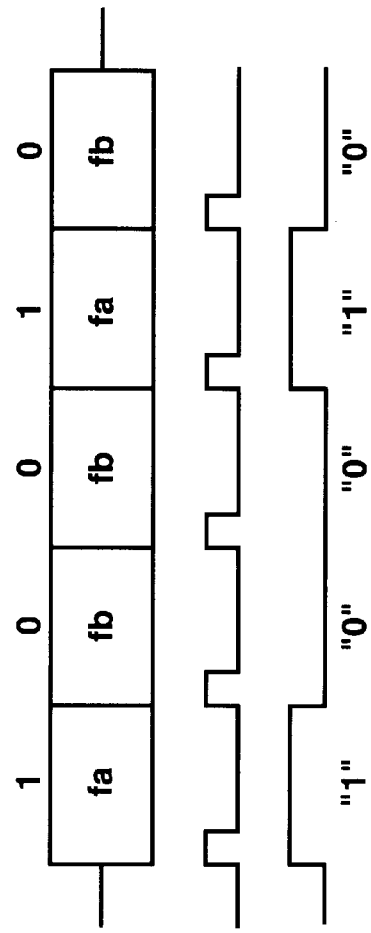
FIG.41A  FIG.41B  FIG.41C  FIG.41D  FIG.41E

FIG.43A FIG.43B FIG.43C
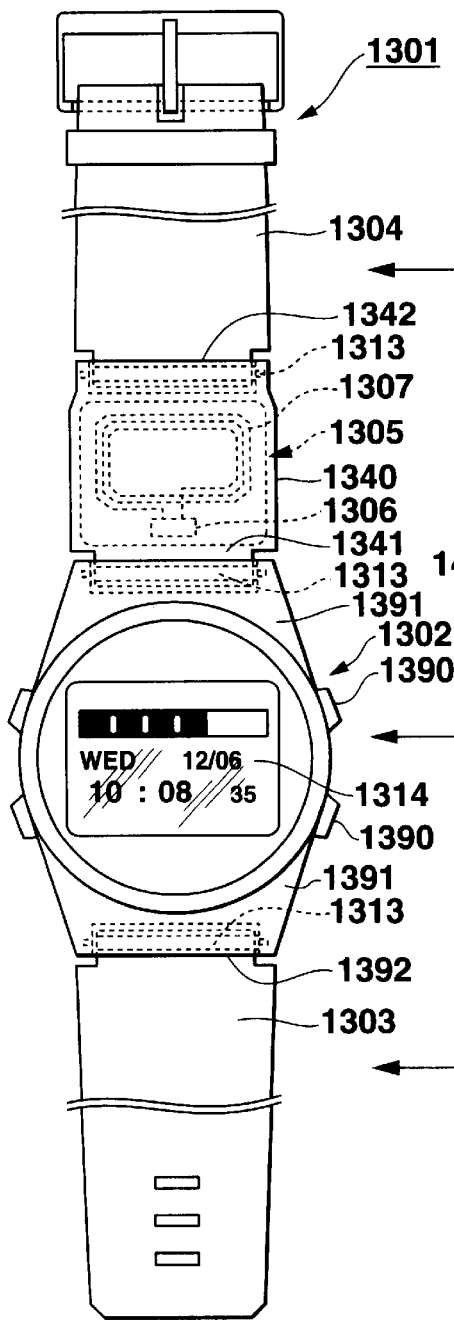
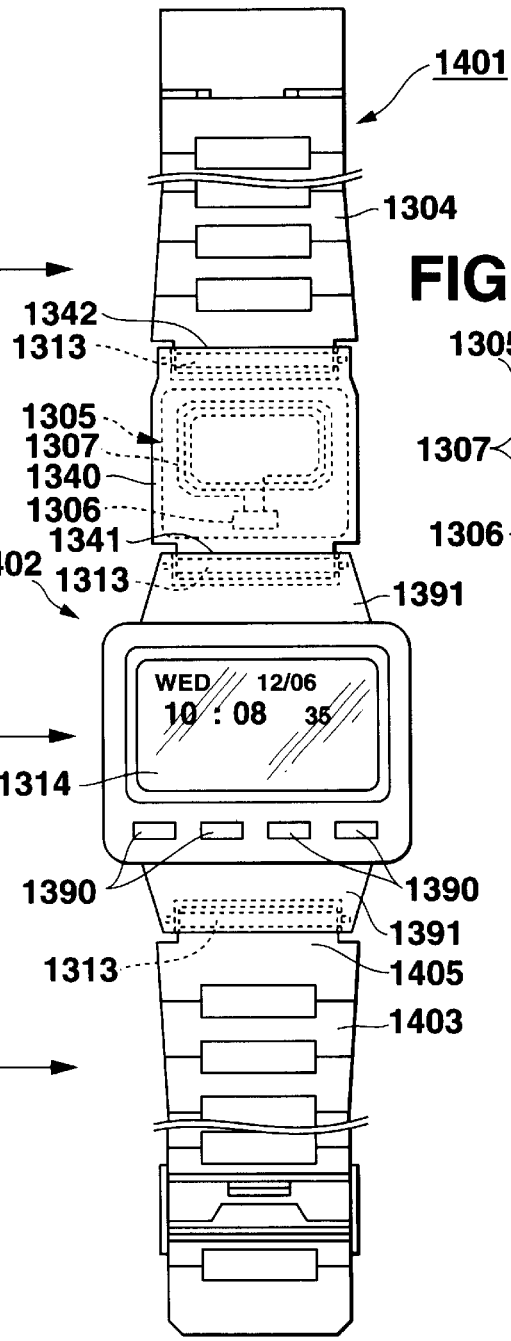
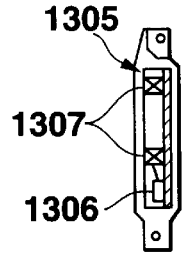

FIG.44A
FIG.44B
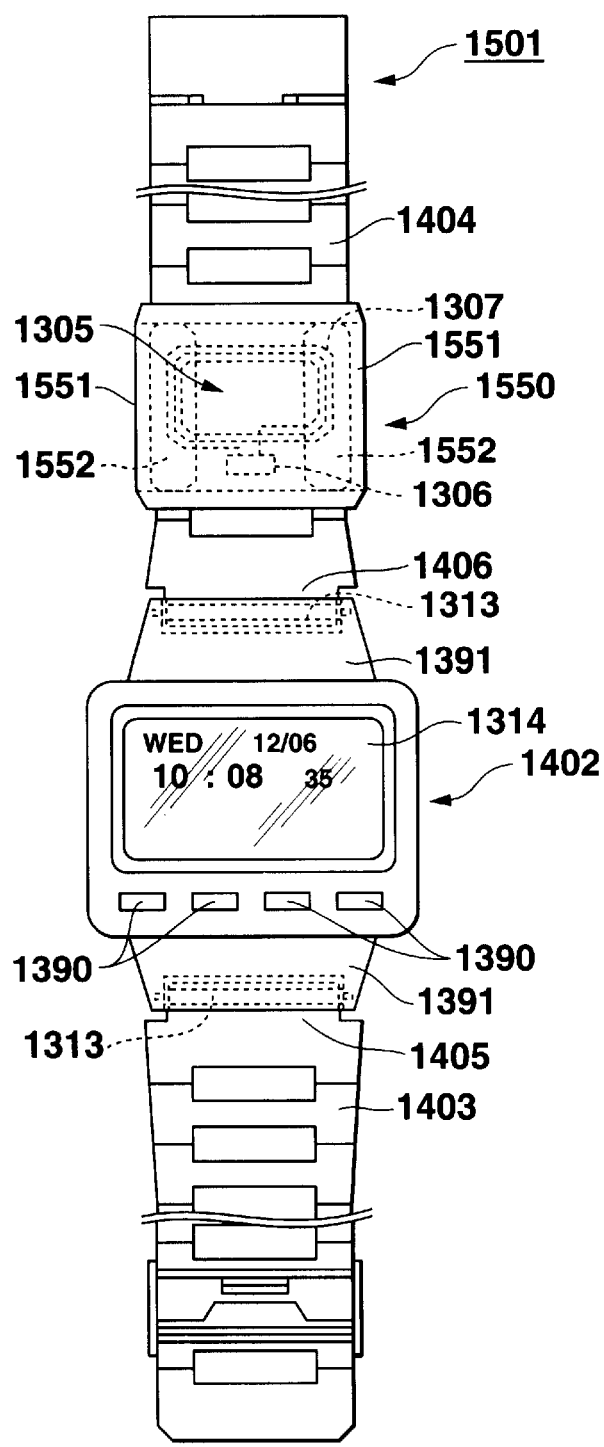
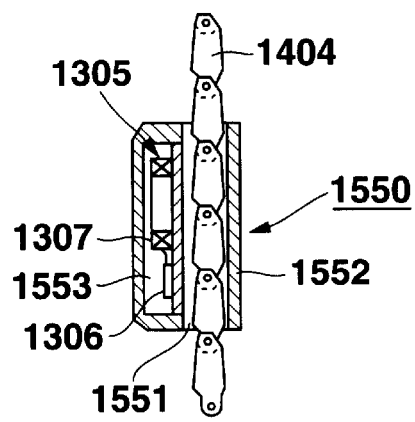

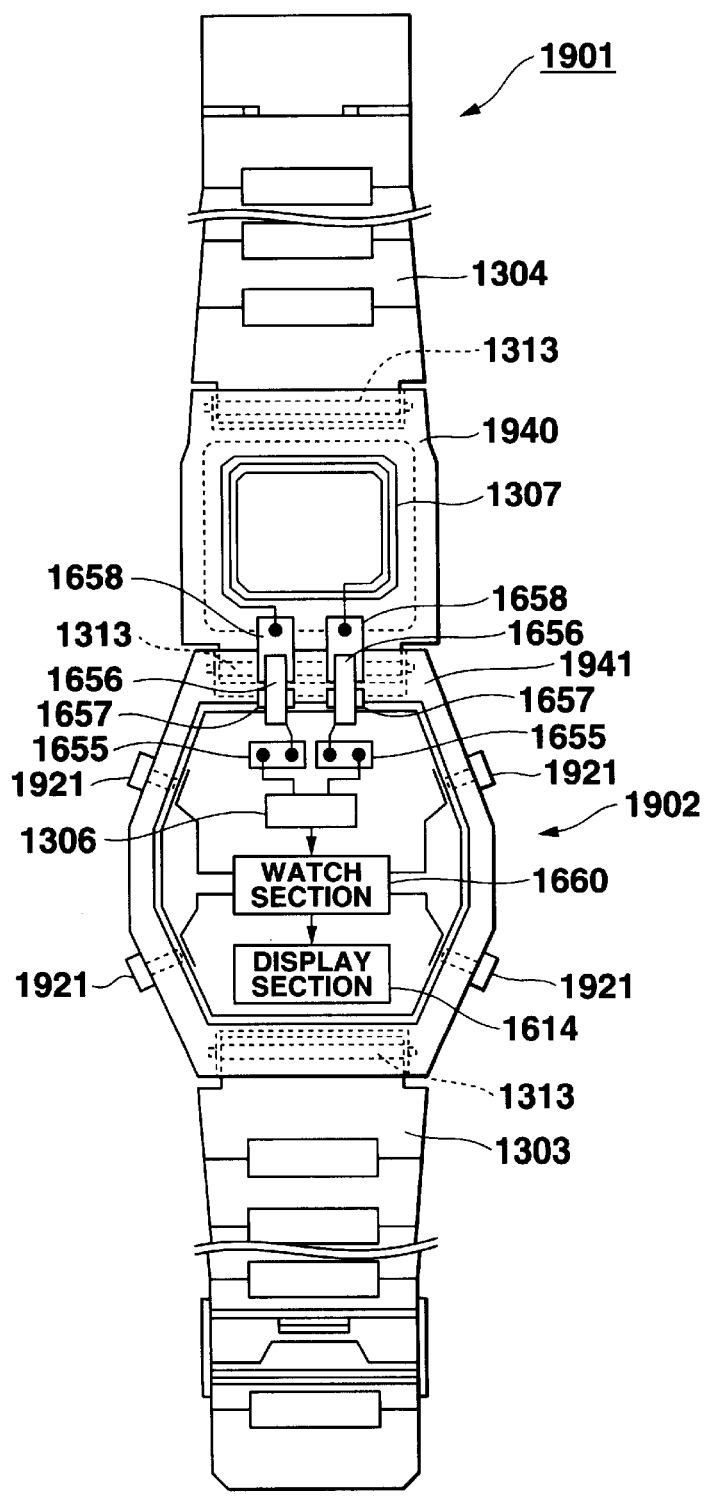
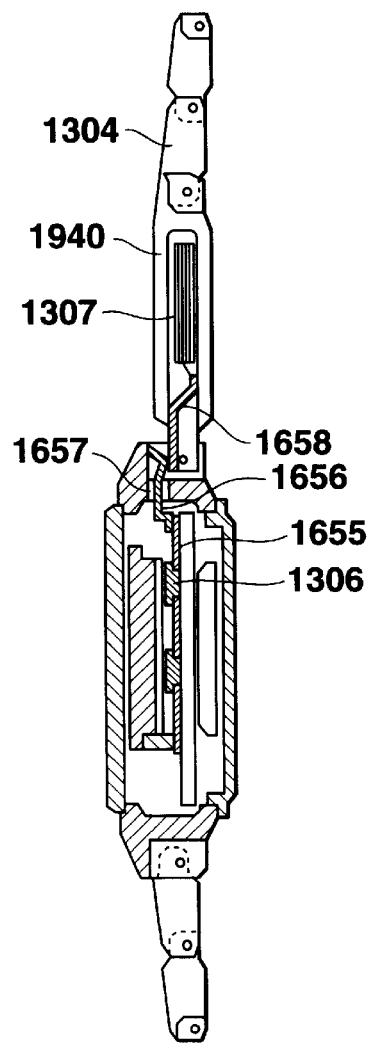
FIG.50A
FIG.50B

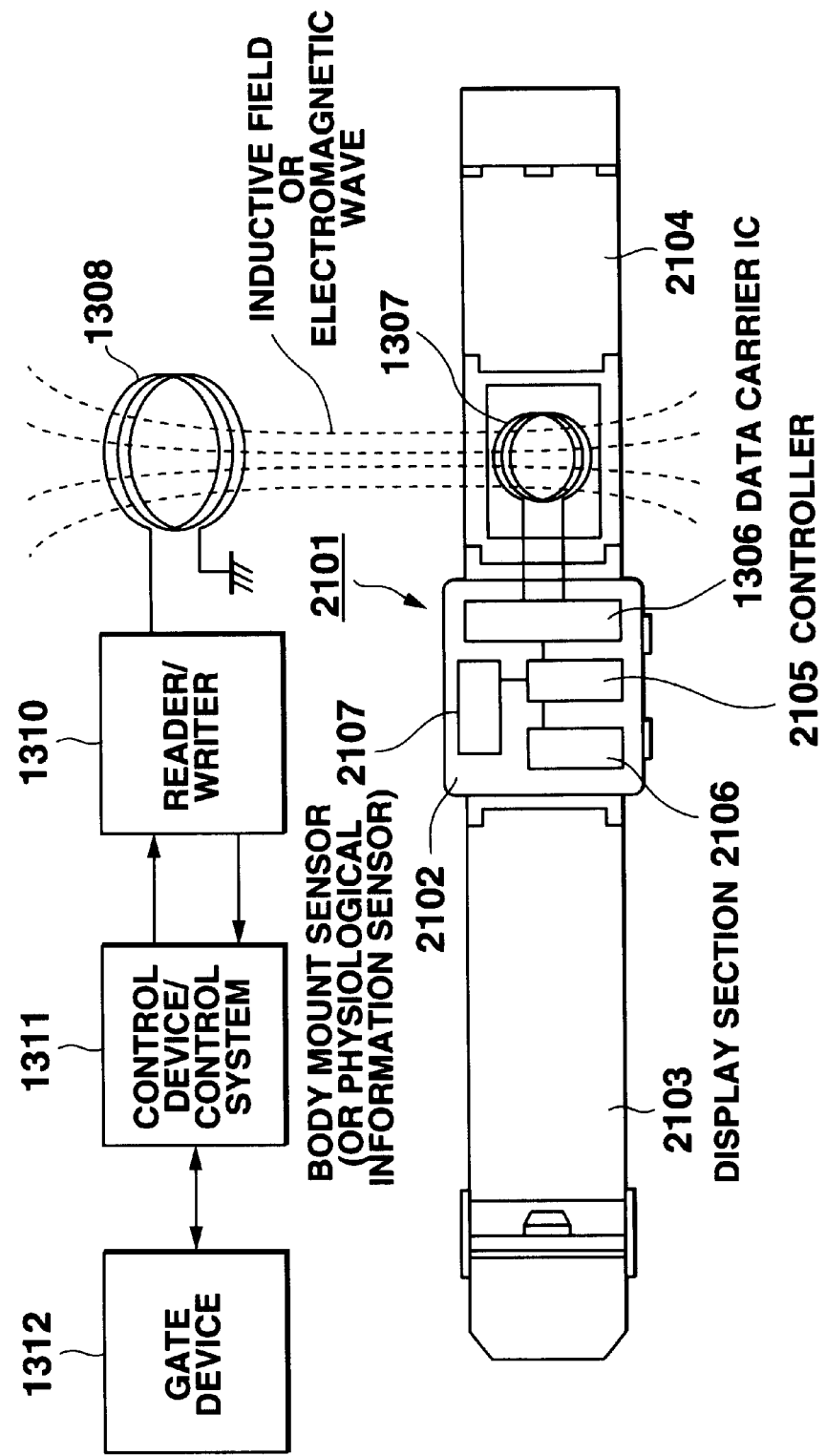

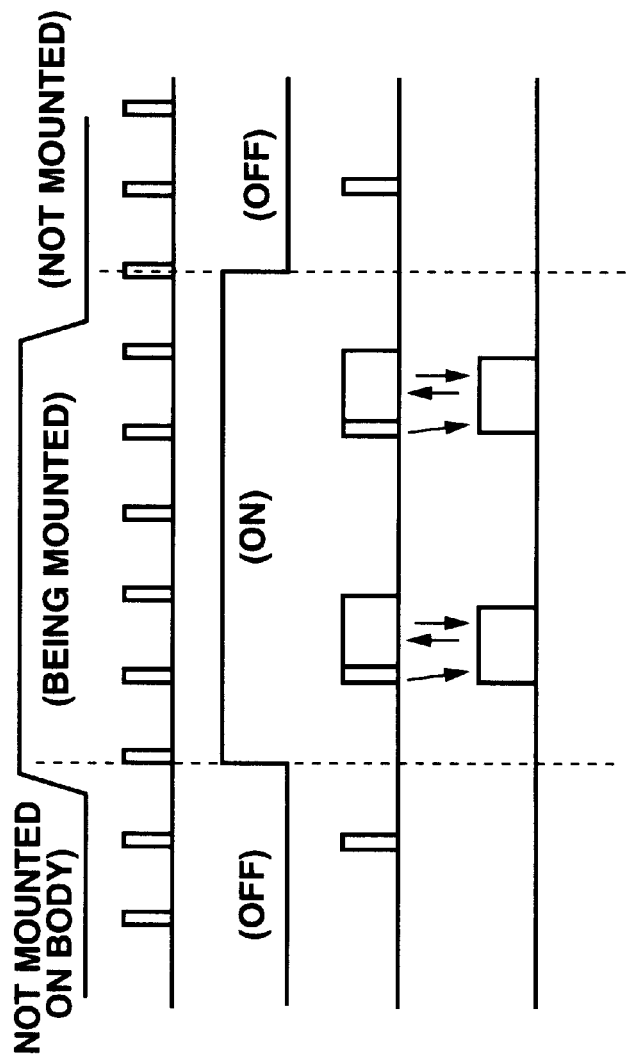

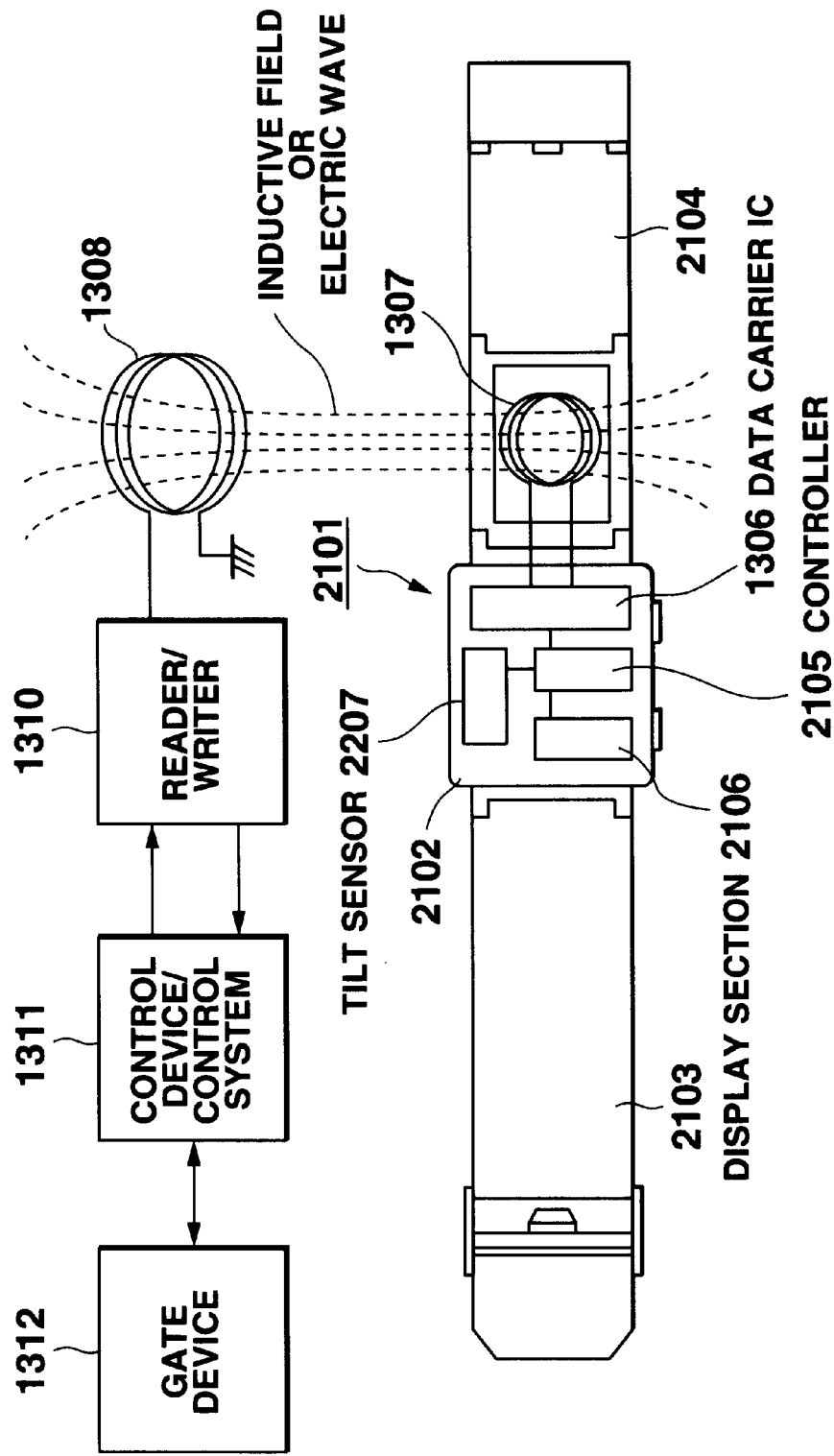

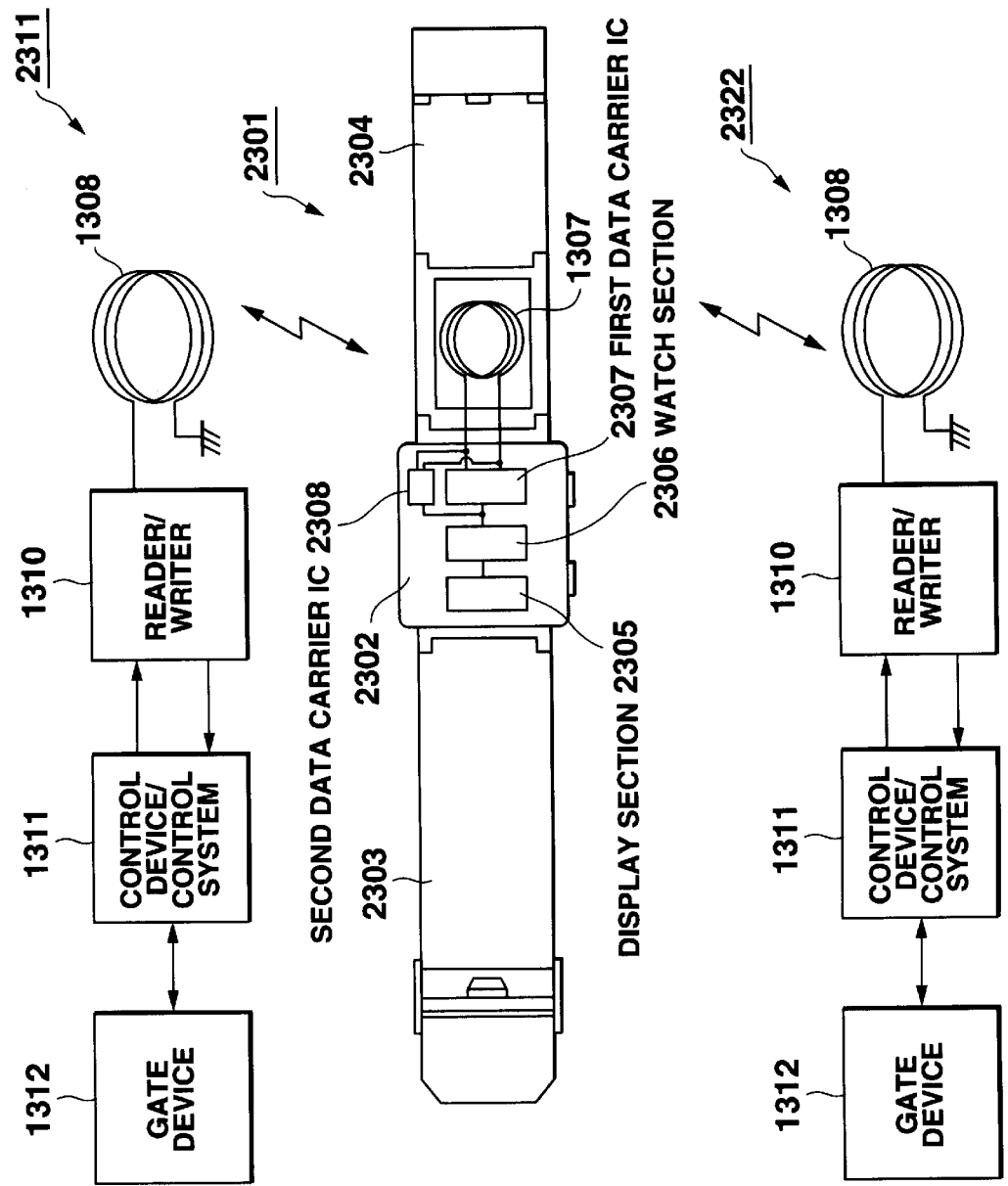

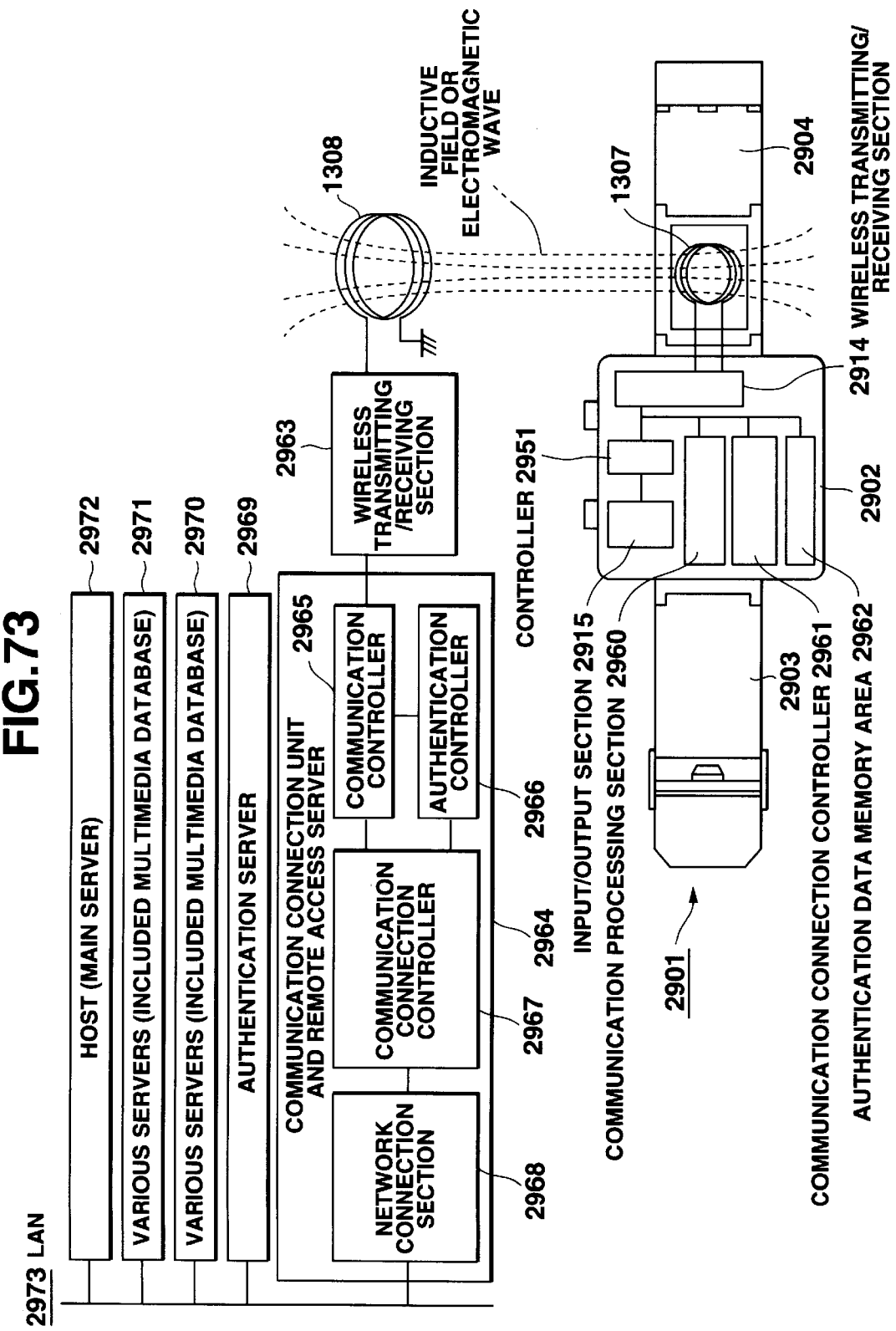

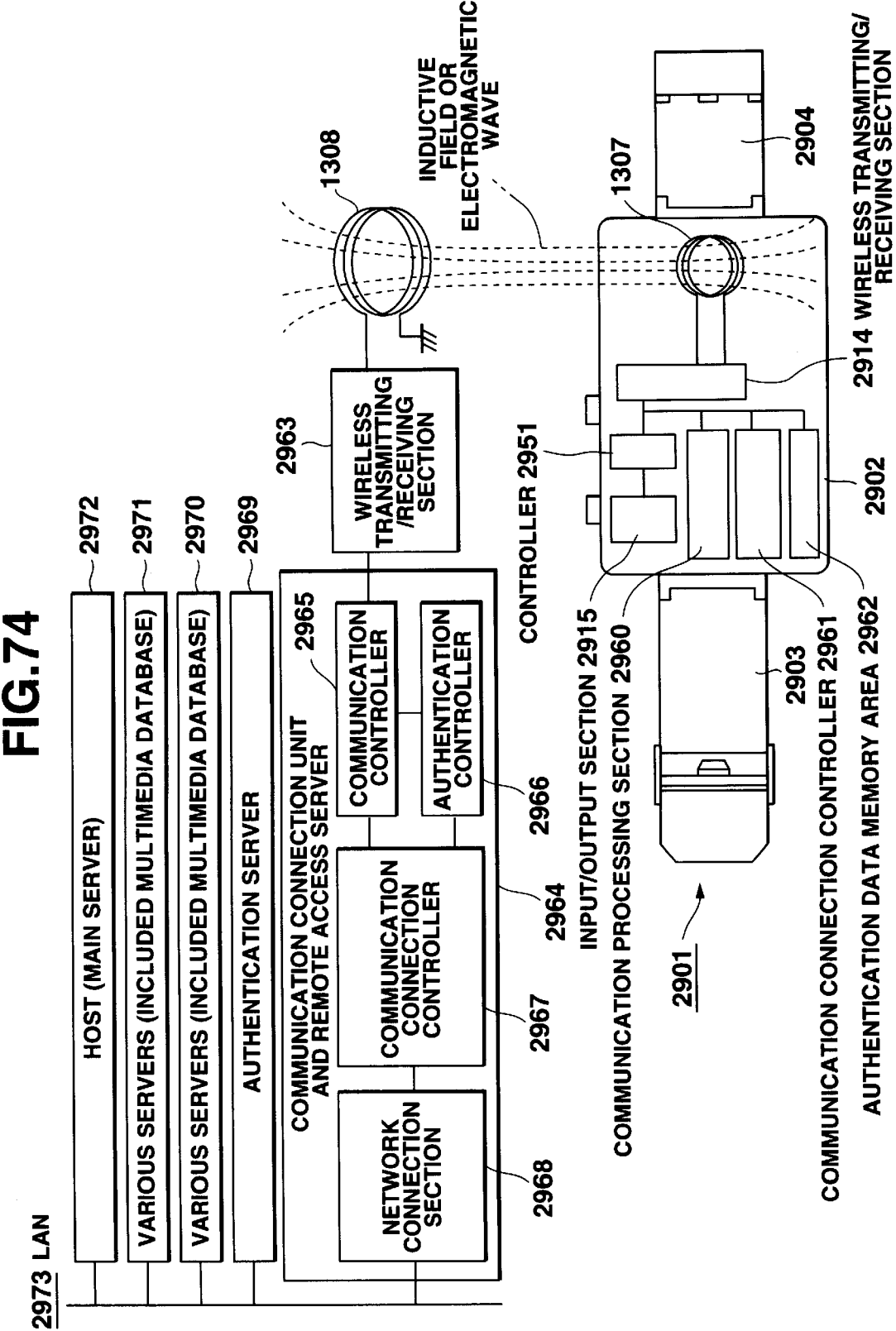

DATA COMMUNICATION APPARATUS, WRISTWATCH TYPE ELECTRONIC DEVICE, AND AUTHENTICATION SYSTEM

BACKGROUND OF THE INVENTION

The present invention relates to a data communication apparatus, a wristwatch type electronic device, and an authentication system which can be effectively applied to various electronic devices such as a wristwatch.

This application is based on Japanese Patent Applications No. 10-377409, filed on Dec. 31, 1998, No. 11-020854, filed on Jan. 28, 1999, and No. 11-322085, filed on Nov. 12, 1999, the entire contents of which are incorporated herein by reference.

Conventionally, as a system capable of directly reading or writing data from an information carrier with non-contact by means of electromagnetic waves without a reader/writer, a data carrier system (or Radio Frequency Identification System=RF-ID System: ISO/IEC 14443, hereinafter, referred to as RF-ID) is known.

At present, the RF-ID system is employed for electronic ticket, electronic commutation ticket or electronic lift ticket used in ski run or the like as an authentication medium (data carrier, which is also called ID Tag, hereinafter, referred to as ID-Tag).

For example, in the electronic lift ticket, the IP-Tag compatible with the above RF-ID system is incorporated in bracelet or necklace and wristwatch that a skier (a person targeted for authentication) wears, thereby making it possible for the skier to pass a gate by holding the tag onto the reader/writer of the gate provided at an entrance of a lift. In this manner, usability of lift is improved for a skier gripping stocks in hands.

The RF-ID system employs a variety of contacting methods according to usage. For example, in the RF-ID system, in the case of an electromagnetic induction method, the ID Tag is composed of an antenna coil in which a loop is formed and a data carrier IC configured to control inductive electromotive force of this antenna coil. The antenna coil or an antenna coil containing a magnet core is opposed between the reader/writer provided at the gate so as to contact a signal of a hundred to some hundreds of KHz (long wave to middle wave) as an information transmission medium utilizing an inductive electromagnetic field.

According to the above contacting method, the ID Tag is adopted to receive data with a distance of some tens of centimeters by means of the coil antenna and to read and write non-volatile memory data in the data carrier IC.

A signal in a long wave to middle wave bandwidth used for such electromagnetic method or an electromagnetic coupling method capable of transmitting power simultaneously during information transmission without incorporating a battery easily transmits a non-conductive material, hardly receives reflection of an electric conductor, and is low in directivity of electromagnetic waves. Thus, there is an advantage that, even if a direction in which the ID Tag is passed during contacting slightly changes, contact data is hardly changed. However, there is a disadvantage that, if an obstacle composed of a metal (an electric conductor) or the like is present between gate and ID Tag, electromotive force is generated at the above metal by means of a magnetic field from an antenna coil, a current is induced, the magnetic field is disturbed by that current, and contact is prevented.

From the foregoing, when the ID Tag utilized for the RF-ID system of electromagnetic induction method or electromagnetic coupling method is incorporated in bracelet, necklace, or wristwatch that a skier (a person targeted for authentication) wears, and is utilized as an electric lift ticket, the following structures or the like are adopted, thereby to overcome the above problem and ensure proper communication environment.

(1) a structure for mounting the ID Tag on a resin-based wrist band or arm band;

(2) a structure for mounting the ID Tag incorporating rectangular or coil-shaped body on a wristwatch type holder; and (3) a structure for housing the ID Tag loop-shaped antenna coil and a data carrier IC in a resin-based watch case and a bottom cap.

However, in the case of such incorporation or integration, in particular, when a wristwatch for outdoor or sports activities is exemplified, many metallic members (electric conductors) are employed for a bottom cap or a window frame and the like allocated at the wristwatch main body for the purpose of improving water resistance (pressure resistance), shock resistance, rigidity, and hostile-environment resistance. Therefore, there arises a problem that a failure is likely to occur in data communication with the reader/writer installed at the gate.

However, in the case of such incorporation or integration, in particular, when a wristwatch for outdoor or sports activities is exemplified, a plenty of metallic members (electric conductors) are employed for a bottom cap or a window frame and the like allocated at the wristwatch main body for the purpose of improving water resistance (pressure resistance), shock resistance, rigidity, and hostile-environment resistance. Therefore, there arises a problem that a failure is likely to occur in data communication with the reader/writer installed at the gate.

To avoid the foregoing failure, such metallic member must be substituted by a non-conductive member such as resin. Thus, there has been a problem that the manufacturers cannot guarantee water resistance (pressure resistance), shock resistance, rigidity, and hostile-environment resistance of the wristwatch main body.

Further, many of the present RF-ID systems are applied to electronic communication ticket systems or prepaid card systems. However, with respect to credit systems, electronic commerce or the like including data protection problem, in particular, security problem, development is slower than a contact type IC card system.

BRIEF SUMMARY OF THE INVENTION

The present invention has been achieved to cope with the above mentioned circumstance. It is an object of the present invention to provide a data communication apparatus and a wristwatch type electronic device capable of preferable communication while maintaining ornamental properties of a conventionally inherent wristwatch or variety of external design and while maintaining guarantee for water resistance (pressure resistance), shock resistance, rigidity, and hostile-environment resistance of the inherent wristwatch main body.

It is another object of the present invention to provide an authentication system intended for improving utility by a user receiving system service in consideration of reliability in security.

To achieve the above objects, a data communication apparatus according to the present invention comprises a resin-based mainframe, a metallic annular member installed on this mainframe, a metallic plate-shaped member installed on the bottom face side of the mainframe, and an antenna coil arranged at a position distant from the plate-shaped member wherein electromotive force is generated according to a change with time in a magnetic flux that passes between the annular member and the plate-shaped member.

With the above arrangement, even if the metallic (conductive) annular member and metallic plate-shaped member on the back face side of the mainframe are installed, the mainframe is resin-based, and the antenna coil is arranged at a position distant from this metallic plate-shaped member. Thus, inductive electromagnetic waves are extremely hardly prevented by the plate-shaped member or metallic annular member. Failure-free, proper communication can be ensured while a guarantee for water resistance (pressure resistance), shock resistance, rigidity, and hostile-environment resistance are well ensured.

Further, to achieve the foregoing objects, this wristwatch type electronic device according to the present invention comprises a calculator configured to calculate at least time information, a display configured to display the calculation result by the calculator, an electromotive generating section provided at a wrist band section wherein electromotive force is generated according to change with time in a magnetic flux supplied from the outside, a data processing section independent of the calculator wherein data is processed corresponding to electromotive force generated by the electromotive force generating section, and a controller configured to control the electromotive force generating section based on the data processed by the data processing section and output electromagnetic induction wave.

With such arrangement, the electromotive force generating section is provided at the wrist band section. Thus, even if the wristwatch type electronic device main body is formed of a conductive material such as metallic material, there is no problem with operation of the electromotive force generating section in which electromotive force is generated according to change with time in the magnetic flux supplied from the outside, ensure ornamental properties or design variety of the wristwatch type electronic device main body. Inductive electromagnetic waves of their proper frequency band can be utilized without need for considering communication failures when the electromotive force generating section is incorporated in the device main body. Further, the electromotive force generating section is not arranged in the device main body. Thus, the mounting constraint is not widened, and there is no need for increasing the device main body in size according to the size of the electromotive force generating section. Therefore, there can be provided a wristwatch type electronic device comprising a data processing function in the same size as the existing wristwatch.

Further, to achieve the foregoing objects, the wristwatch type electronic device according to the present invention comprises a calculator configured to calculate at least time information, a display configured to display the calculation result by the calculator, an electromotive force generating section configured to generate electromotive force according to change with time in a magnetic flux supplied from the outside, a data processing section independent of the calculator wherein data is processed corresponding to the generated electromotive force by the electromotive force generating section, and a controller configured to control the electromotive force generating section based on the data processed by the data processing section and output electromagnetic induction waves.

With such arrangement, a function as a wristwatch is obtained by the calculator and the display. In addition to the wristwatch function, a function as a data communication apparatus is further obtained by the electromotive force generating section and data processing section and controller independent of the calculator. Therefore, there can be provided a wristwatch type electronic device that readily provides the function as a wristwatch and the function as a data communication apparatus.

Furthermore, to achieve the foregoing objects, an authentication system according to the present invention comprises a reader configured to read authentication data from an electronic device mounted on a person targeted for authentication by electromagnetic induction, a determining section configured to determine whether or not the authentication data read by the reader matches that registered in the system, and an enabling section configured to enable utilization of the system by the person targeted for authentication when the matching is determined by the determining section.

With such arrangement, authentication data is read from the electronic device mounted on the person targeted for authentication in non-communication state by means of electromagnetic induction. When the read authentication data matches that registered in the system, the utilization of the system by the person targeted for authentication is enabled, thereby making it possible to manage system utilization.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 26 is a cross section view of a watch main body showing a modified example of the eighth embodiment;

FIGS. 27A, 27B and 27C are views each showing an antenna coil according to a ninth embodiment of the present invention;

FIGS. 29A, 29B and 29C are views each showing another antenna coil;

FIG. 34 is an illustrative view illustrating a magnetic field generated during data communication;

FIGS. 36A, 36B, 36C, 36D, 36E and 36F are views each showing a modified example of a window frame according to a twelfth embodiment of the present invention;

FIG. 37 is a view of system configuration showing a thirteenth embodiment of the present invention;

FIGS. 41A, 41B, 41C, 41D and 41E are timing charts showing transmitting/receiving operation of the thirteenth embodiment;

FIG. 43A is a front view showing an example of the wristwatch according to a fourteenth embodiment of the present invention;

FIG. 43B is a front view showing another example of the wristwatch according to the fourteenth embodiment of the present invention;

FIG. 43C is a cross section view of the wristwatch according to the fourteenth embodiment of the present invention;

FIG. 44A is a front view of the wristwatch according to a fifteenth embodiment of the present invention;

FIG. 44B is a cross section view of the wristwatch according to the fifteenth embodiment of the present invention;

FIG. 50A is a conceptual view of a wristwatch according to a nineteenth embodiment of the present invention;

FIG. 50B is a cross section view of a wristwatch according to the nineteenth embodiment of the present invention;

FIG. 53 is a view of system configuration showing a twenty-first embodiment of the present invention;

FIGS. 54A, 54B, 54C, 54D and 54E are timing charts showing operation of the twenty-first embodiment;

FIG. 55 is a view of system configuration showing a twenty-second embodiment of the present invention;

FIG. 57 is a view of system configuration showing a twenty-third embodiment of the present invention;

FIG. 73 is a view of system configuration showing a twenty-ninth embodiment of the present invention; and FIG. 74 is a view of system configuration showing a modified example of the twenty-ninth embodiment.

DETAILED DESCRIPTION OF THE INVENTION

Figure 1:
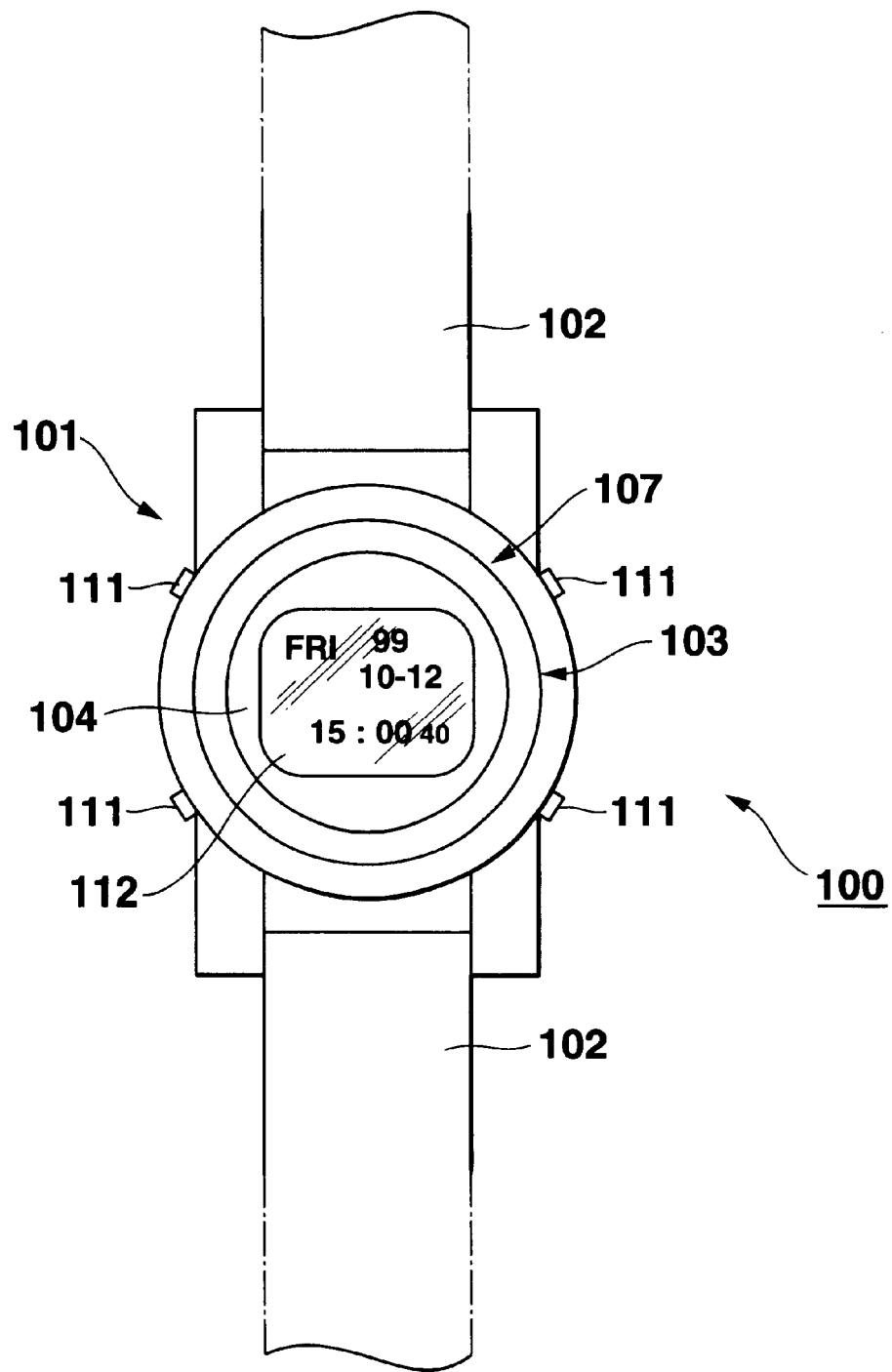
FIG. 1 is a plan view of a wristwatch showing a first embodiment of the present invention.

Preferred embodiments of a data communication apparatus, a wristwatch type electronic device, and an authentication system according to the present invention will now be described with reference to the accompanying drawings.

FIGS. 1 to 36 show the first to twelfth embodiments of the present invention, and show a structure when a watch case main body is provided with a data carrier antenna coil. Hereinafter, each of the embodiments will be described in detail.

First Embodiment

FIGS. 1 to 5 are views each showing a wristwatch 100 as a data communication apparatus according to the first embodiment of the present invention.

The wristwatch 100 is composed of a watch main body 101 and wrist band members 102, 102 engaged at both ends of the watch main body 101. The watch main body 101 has a vertically opening resin-based case 103. The case 103 has its upper face closed by a hard glass member 104 such as mineral glass and its lower face closed by a metallic bottom cap member 105 (back cover 105). A reinforce metal member 106 positioned on its upper face side is incorporated at the inside of the case 103, and a bezel 107 is provided at the outside of its upper face side. A plurality of key members 111 or the like are mounted on a peripheral wall of the case 103.

A module 108 is hosed inside of the case 103. The module 108 is composed of a watch LSI substrate on which an LCD panel 112 is mounted, a transmitting/receiving signal modulation circuit or an encoding/decoding circuit, a data memory which stores data such as ID, an IC substrate or the like on which an IC chip that incorporates a transmission/reception or authentication control circuit is mounted, wherein a play in the case 103 is prevented by a module cover 109 (refer to FIGS. 4 and 5) mainly formed by resin.

Figure 4:
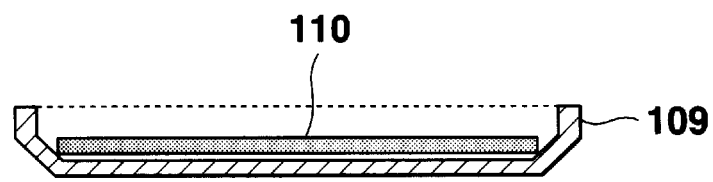
FIG. 4 is a schematic cross section view of the plastic cover.
Figure 5:
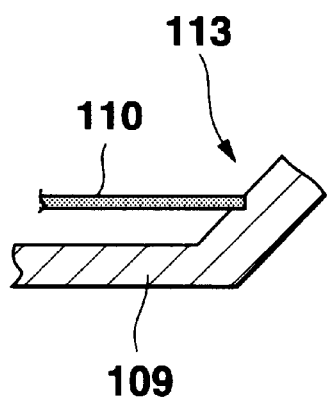
FIG. 5 is an enlarged view of essential parts shown in FIG. 4.

Inside of the case 103, there is housed a data carrier antenna coil 110 connected to an IC substrate, which transmits and receives a signal by electromagnetic induction at the lower section of the module 108. The data carrier antenna coil 110, as shown in FIGS. 4 and 5 (partially enlarged view of FIG. 4), is supported by a cutout 113 provided on the inner periphery face on the bottom face side of the plastic cover 109, whereby the data carrier antenna coil 110 is positioned at a position distant from a back cover 105.

Figure 2:
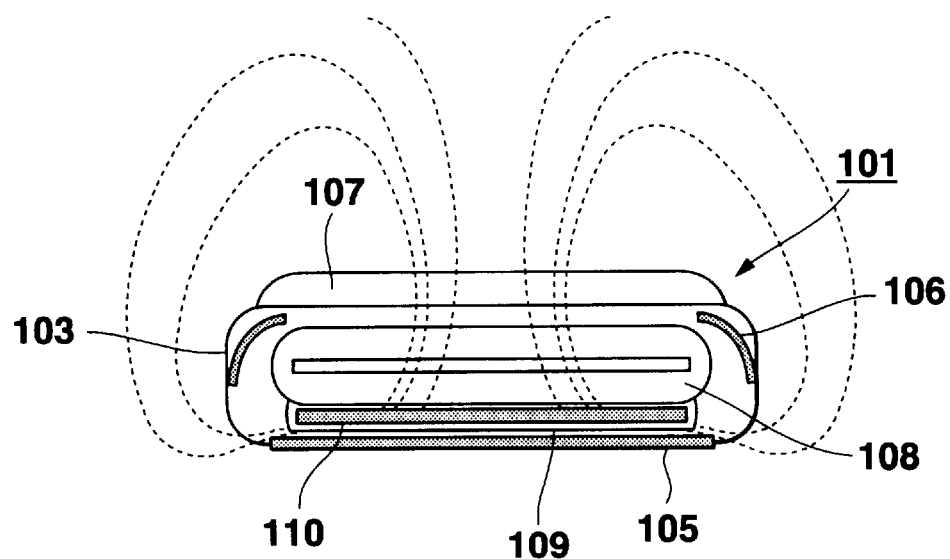
FIG. 2 is a schematic cross section view of a watch main body in the first embodiment.
Figure 3:
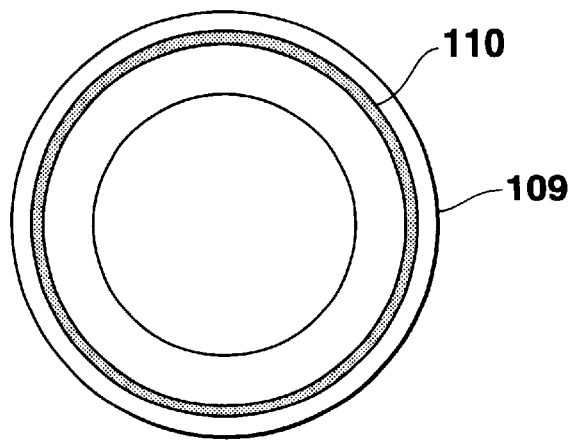
FIG. 3 is a plan view showing a plastic cover.

In the present embodiment with such arrangement, even if the back cover 105 is metallic (conductive), and is structured of a metal member 106 incorporated inside of the case 103, as shown in FIG. 2, a magnetic flux path in which a magnetic flux passes a side section on the lower face side from the upper face of the case 103 is ensured during data transmission/reception. Moreover, the data carrier antenna coil 110 is distant from the back cover 105. Thus, even if the back cover 105 is made of a metal, there are very few cases that the cap member interferes communication. Therefore, it is possible to ensure proper communication while maintaining water resistance (pressure resistance), shock resistance, rigidity, and hostile-environment resistance.

Other embodiments according to the present invention will be described. The same sections as those of the first embodiment will be indicated in the same reference numerals and their detailed description will be omitted.

Second Embodiment

Figure 6:
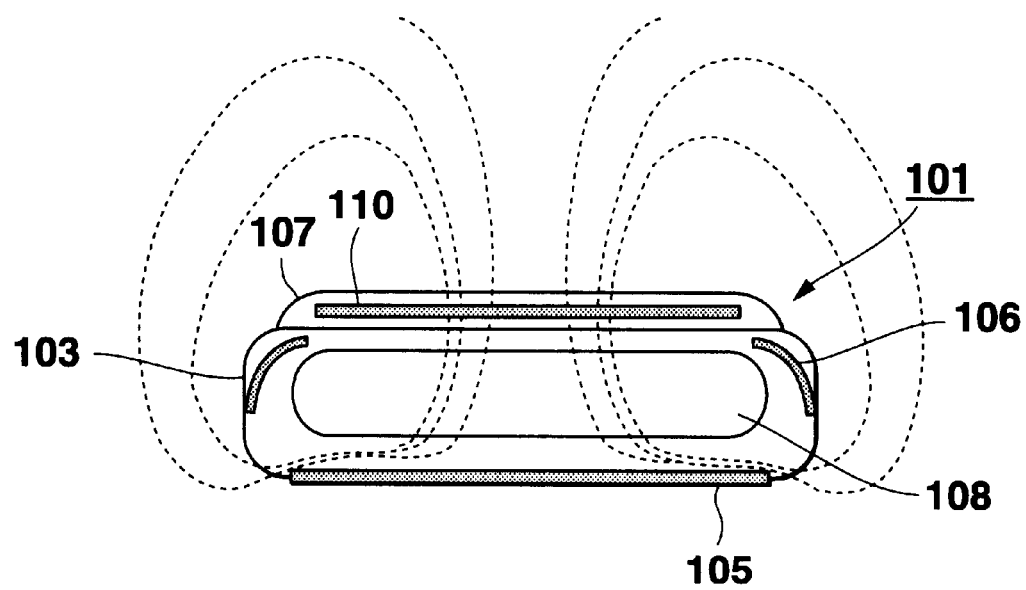
FIG. 6 is a schematic cross section view of a watch main body showing a second embodiment of the present invention.
Figure 7:
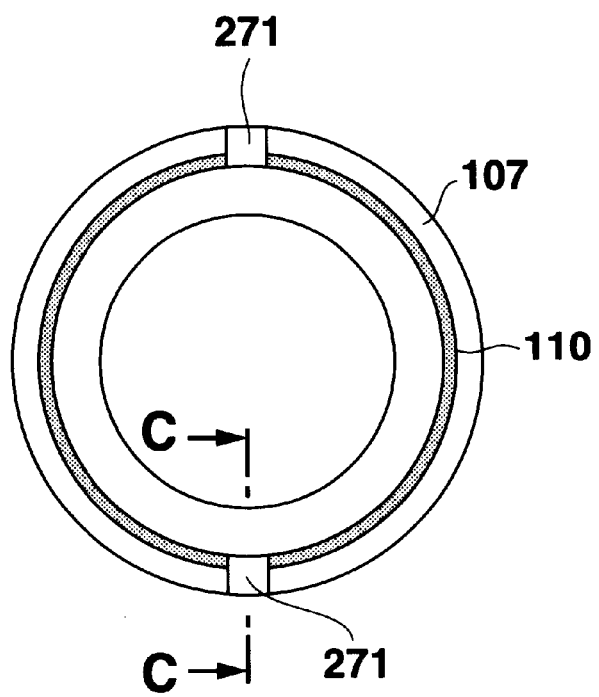
FIG. 7 is a bottom view showing a shock absorption bezel.
Figure 8:
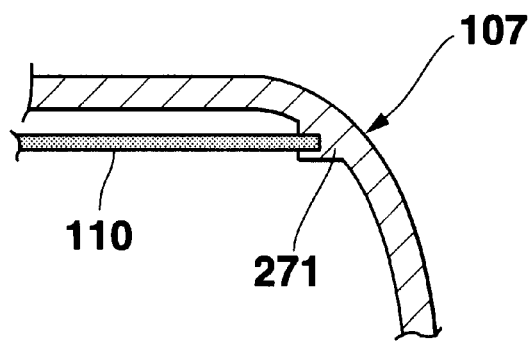
FIG. 8 is a cross section view taken along the line C—C shown in FIG. 7.
Figure 9:
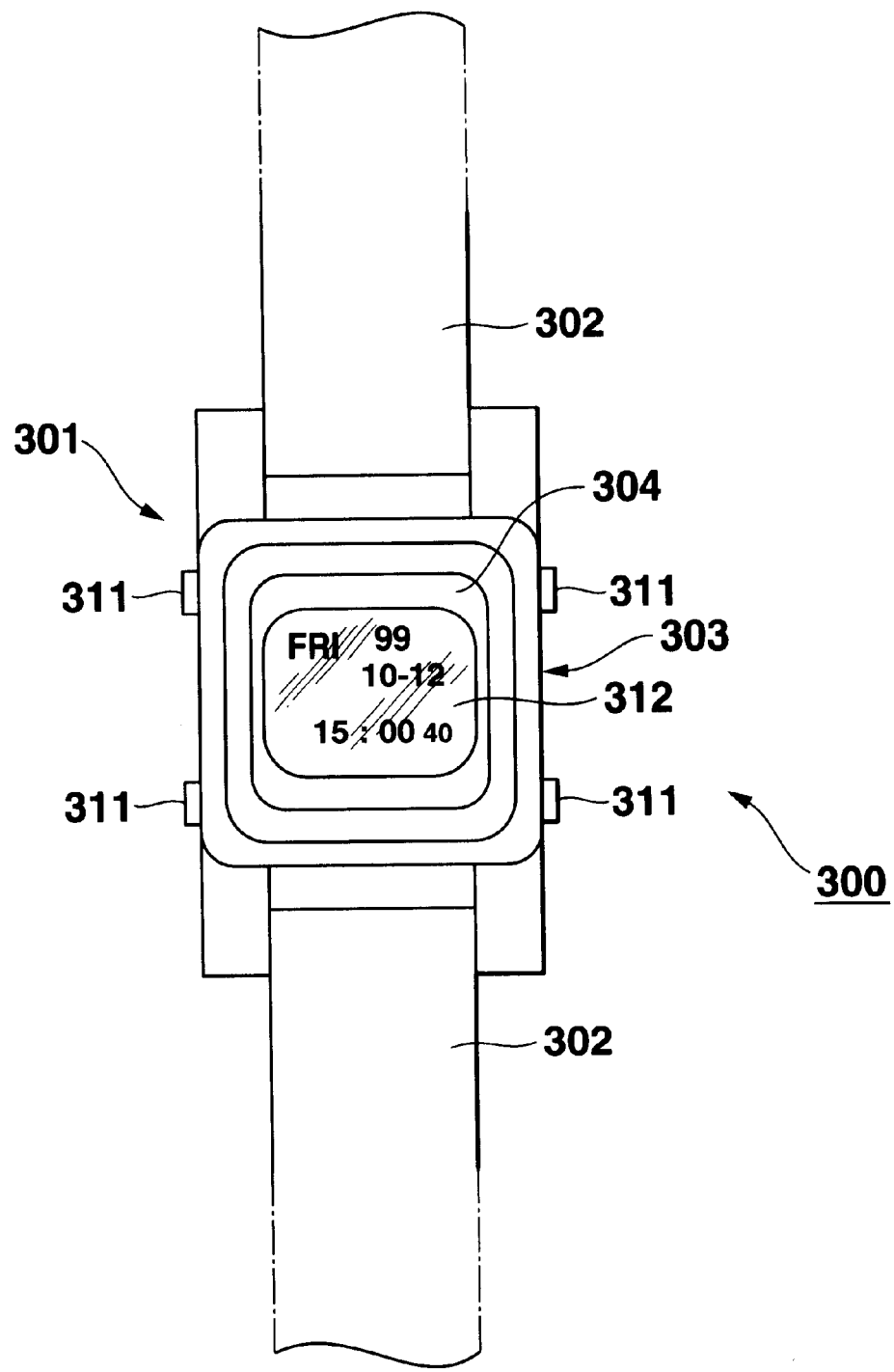
FIG. 9 is a plan view of a wristwatch showing a third embodiment of the present invention.
Figure 10:
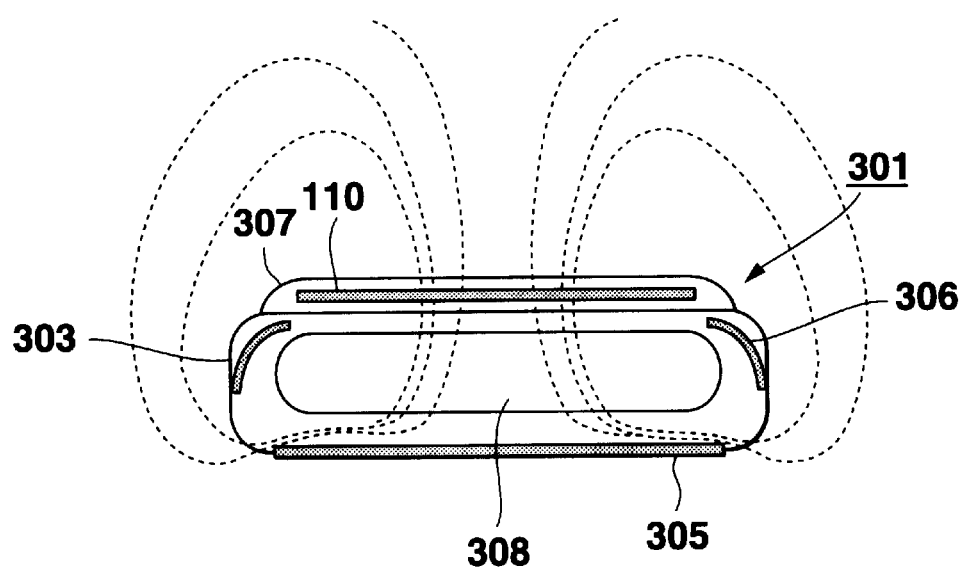
FIG. 10 is a schematic cross section view of the watch main body in the third embodiment.

FIGS. 6 to 8 show the second embodiment of the present invention.

Hereinafter, differences from the first embodiment will be described. That is, in the present embodiment, as shown in FIGS. 7 and 8 (cross section view taken along the line C—C in FIG. 7), cutouts 271, 271 for fixing the data carrier antenna coil 110 are formed at the inside periphery of the upper face side of a bezel 207, and the data carrier antenna coil 110 is positioned and fixed in the bezel 207 via the cutouts 271, 271. Namely, the data carrier antenna coil 110 is structured of being arranged outside of the hard glass member 104 (refer to FIG. 1).

In such arrangement also, a magnetic flux path in which a magnetic flux passes the side section on the lower face side from the upper face of the case 103 is ensured during data transmission/reception. Moreover, the data carrier antenna coil 110 is distant from the back cover 105. Thus, even if the back cover 105 is made of a metal, there are very few cases that the cap member interferes communication. Therefore, an effect similar to that in the first embodiment is obtained.

Third Embodiment

FIGS. 9 to 12 show the third embodiment of the present invention.

A wristwatch 300 is composed of a watch main body 301 and wrist band members 302, 302 engaged at both ends of the watch main body 301. The watch main body 301 has a vertically opening resin-based case 303. An upper face of the case 303 is closed by a hard glass member 304, and a lower face thereof is closed by a metallic bottom cap member 305 (back cover 305). A reinforce metal member 306 positioned at the upper face side is incorporated inside of the case 303, and a bezel 307 is provided outside of the upper face side thereof. A plurality of key members 311 or the like are mounted on a peripheral wall of the case 303.

A module 308 is housed inside of the case 303. The module 308 is composed of a watch LSI substrate on which an LCD panel 312 is mounted, a transmitting/receiving signal modulation circuit or an encoding/decoding circuit, a data memory which stores data such as ID, and an IC substrate or the like on which an IC chip that incorporates transmission/reception or authentication control circuit is mounted.

Figure 11:
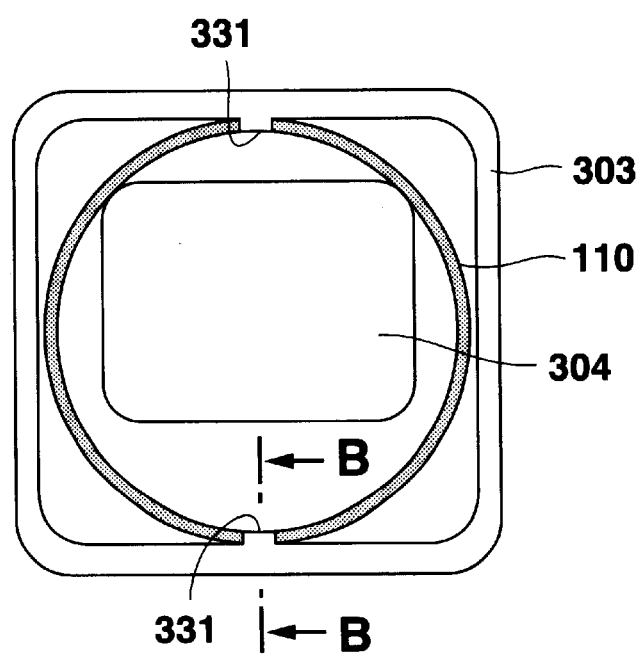
FIG. 11 is a bottom view showing a watch case.
Figure 12:
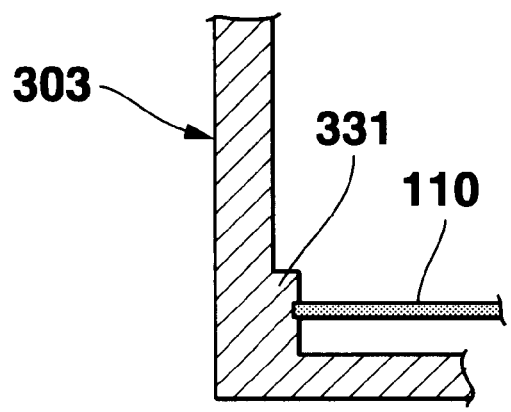
FIG. 12 is a cross section view taken along the line B—B shown in FIG. 11.
Figure 13:
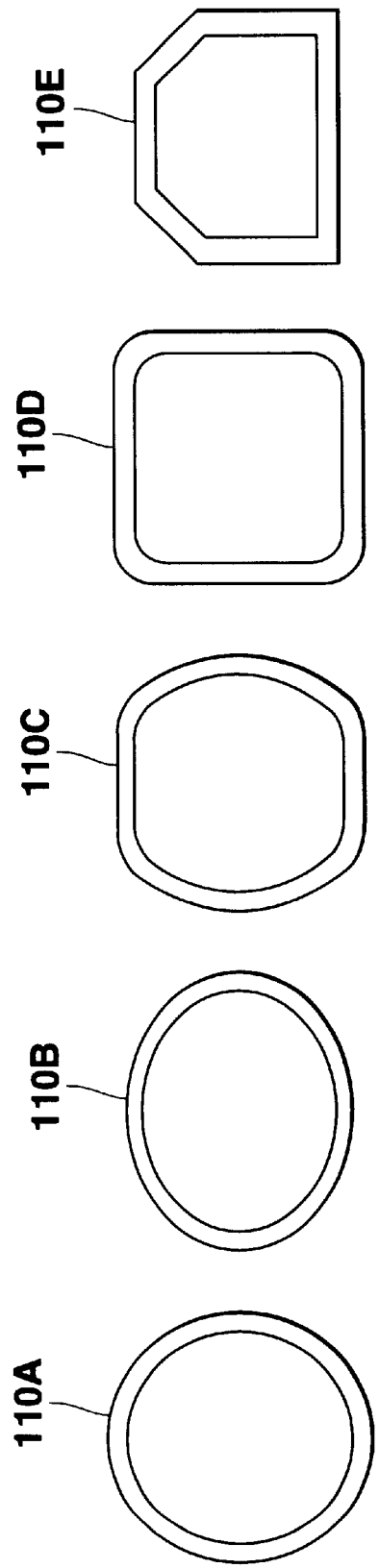
FIGS. 13A, 13B, 13C, 13D and 13E are views each showing a modified example of an antenna coil of the present invention.

As shown in FIGS. 11 and 12 (a cross section view taken along the line B—B in FIG. 11), cutouts 331, 331 for fixing the data carrier antenna coil 110 are formed at the periphery inside of the upper face side of the case 303, and the data carrier antenna coil 110 is positioned and fixed to the case 303 via the cutouts 331, 331. Namely, the data carrier antenna coil 110 is structured of being arranged between the hard glass member 304 (refer to FIG. 11) and a module 308.

In such arrangement also, a magnetic flux path in which a magnetic flux passes a side section of a lower face side from an upper face of the case 301 during data transmission/reception. Moreover, the data carrier antenna coil 110 is distant from the back cover 305. Thus, even if the back cover 305 is made of a metal, there are very few cases that the cap member interferes communication. Therefore, an effect similar to that of the second embodiment is obtained.

FIGS. 13A to 13E illustrate a winding shape of the data carrier antenna coil 110. The winding shape of the data carrier antenna coil 110 can properly be a circular shape 110A shown in FIG. 13A, an elliptical shape 110B shown in FIG. 13B, a rectangular shape 110D shown in FIG. 13D, a polygonal shape 110E shown in FIG. 13E, or any other shape 110C or the like shown in FIG. 13C according to the case shape to the extent such that an opening area of the antenna coil is not changed.

Fourth Embodiment

Figure 14:
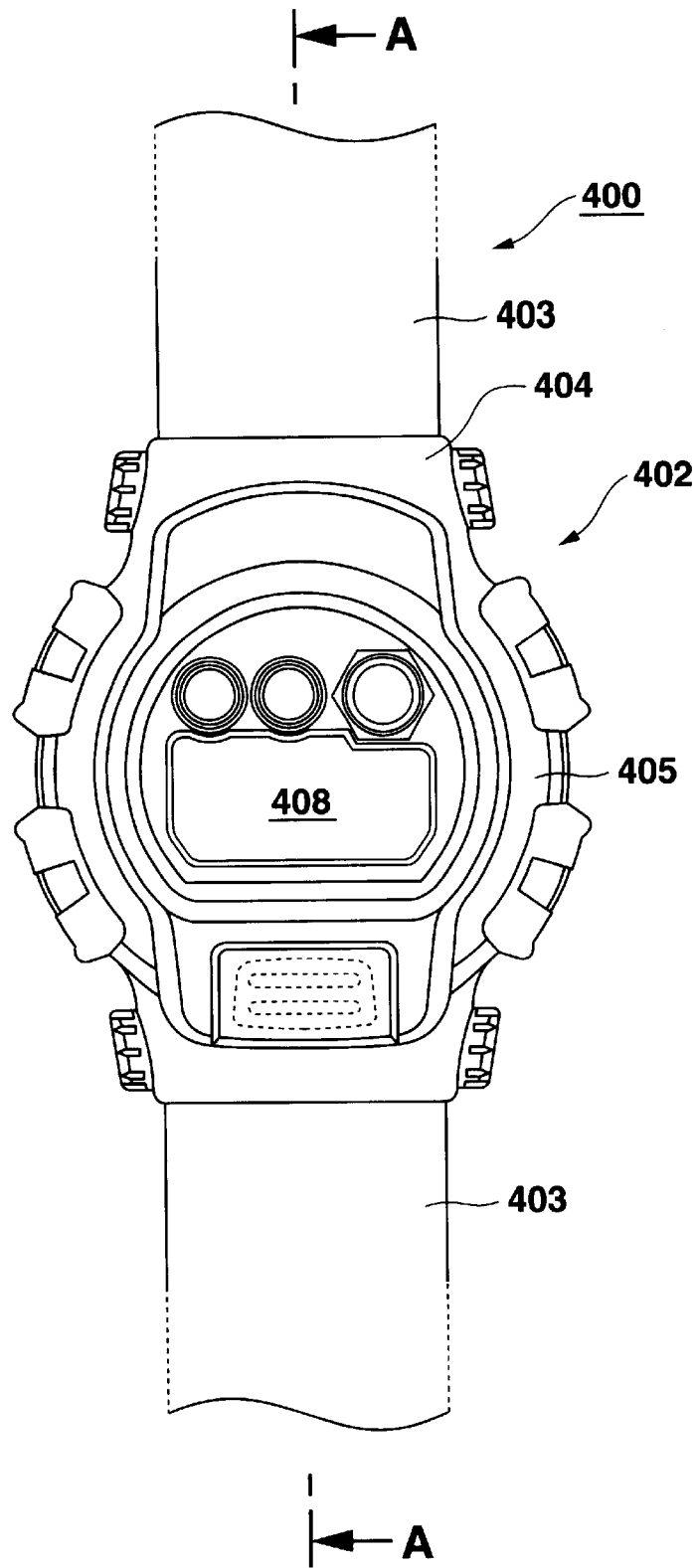
FIG. 14 is a plan view of a wristwatch showing a fourth embodiment of the present invention.
Figure 15:
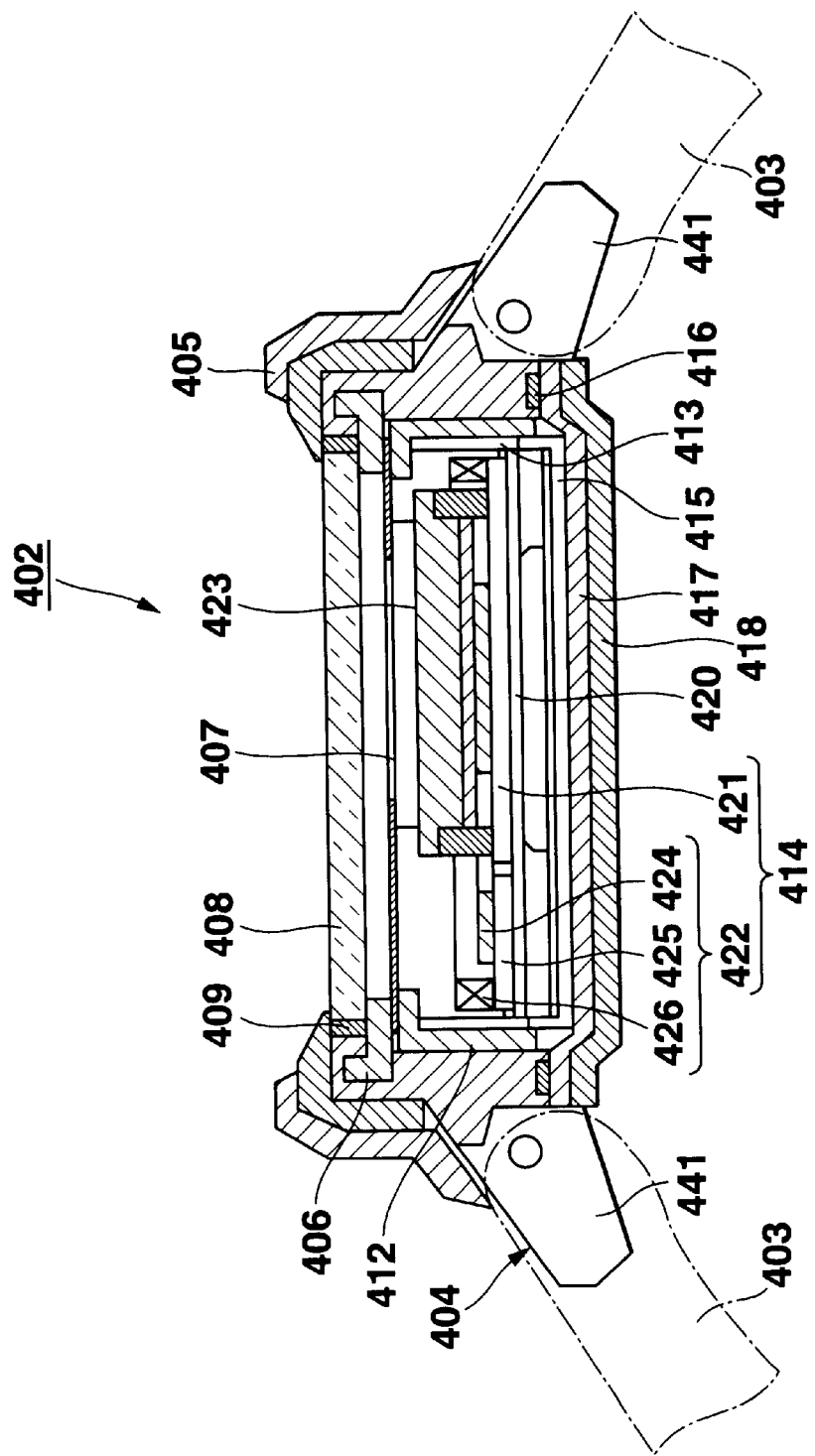
FIG. 15 is a cross section view showing a watch main body in the wristwatch.
Figure 16:
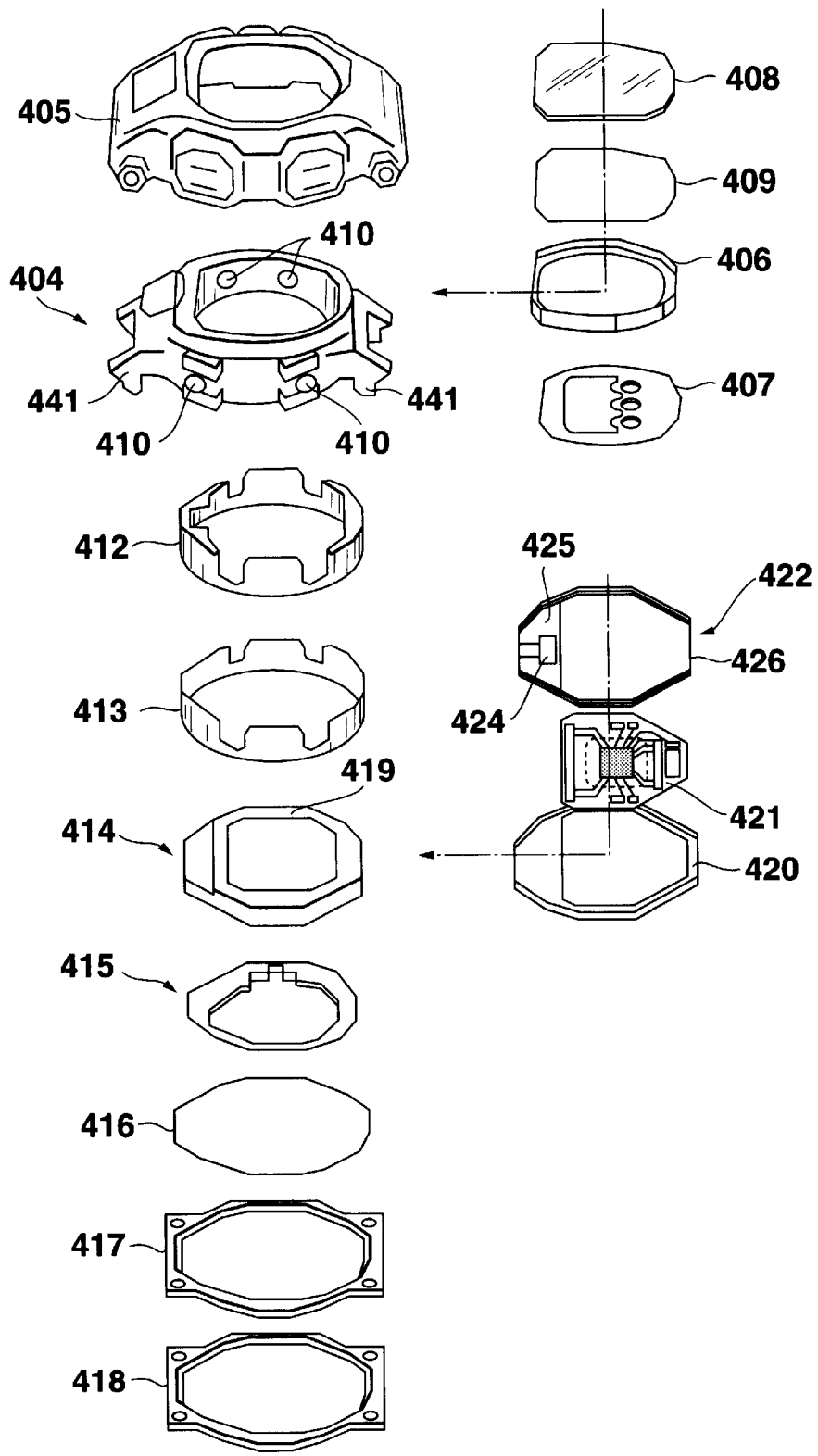
FIG. 16 is an exploded perspective view of the watch main body.

FIGS. 14 to 16 are views showing a wristwatch 400 that is a data communication apparatus according to the fourth embodiment of the present invention.

As is obvious from FIG. 14, the wristwatch 400 provides an appearance of a wristwatch for outdoor or sports activities, and is composed of a watch main body 402, and resin-based wrist band members 403, 403 engaged at both ends of the watch main body 402.

The watch main body 402, as shown in FIGS. 15 and 16, has a structure that a resin-based bezel cover 405 that is an external case for covering the upper section and periphery of a case 404 is armored at the reinforce resin-based case 404 that is an internal case having band attachments 441, 441 to which the wrist band members 403, 403 are engaged. A fixing member 406 is insert-molded at the upward inside of the case 404. A resin-based display frame member 407 is arranged on the back face side of the display frame fixing member 406, whereas a hard glass member 408 upwardly closing the case 404 is attached to the surface side of the display frame fixing member 406 via a waterproof packing 409. A plurality of keys (key members) 410 or the like are mounted on the peripheral wall of the case 404 covered with the bezel cover 405.

A synthetic rubber based module cover member 412 and a module fixing member 413 are overlapped with each other inside of the case 404, a module 414 and a module cover member 415 are housed therein in order, and a downward opening of the case 404 is sealed by a bottom cap member 417 (back cover 417) via the waterproof packing 416.

The back cover 417 is entirely formed of a magnetic material. Preferably, this magnetic material includes a metal or its alloy that is a magnetic object such as iron or ferrite, compound, mixture such as magnetic powders, or sintered material such as ceramic material.

The outside surface of the back cover 417 is covered with a resin-based case cover 418.

The module 414 is composed of a watch LSI substrate 421 positioned by a module hosing member 419 and a module housing member 420 (not shown in FIG. 15), and a data carrier module 422, and the watch LSI substrate 421 is provided with an LCD panel 423.

The data carrier module 422 is composed of a transmitting/receiving signal modulation circuit or an encoding/decoding circuit, a data memory which stores data such as ID, an IC substrate 425 having a data carrier IC 424 that incorporates a transmission/reception or authentication control circuit, and a data carrier antenna coil 426 connected to the IC substrate 425, which transmits and receives a signal by electromagnetic induction. The IC substrate 425 is assembled with the watch LSI substrate 421 side by side. The data carrier antenna coil 426 is assembled at the periphery of the watch LSI substrate 421 so as to be fitted with an internal wall of the module housing member 420.

Figure 17:
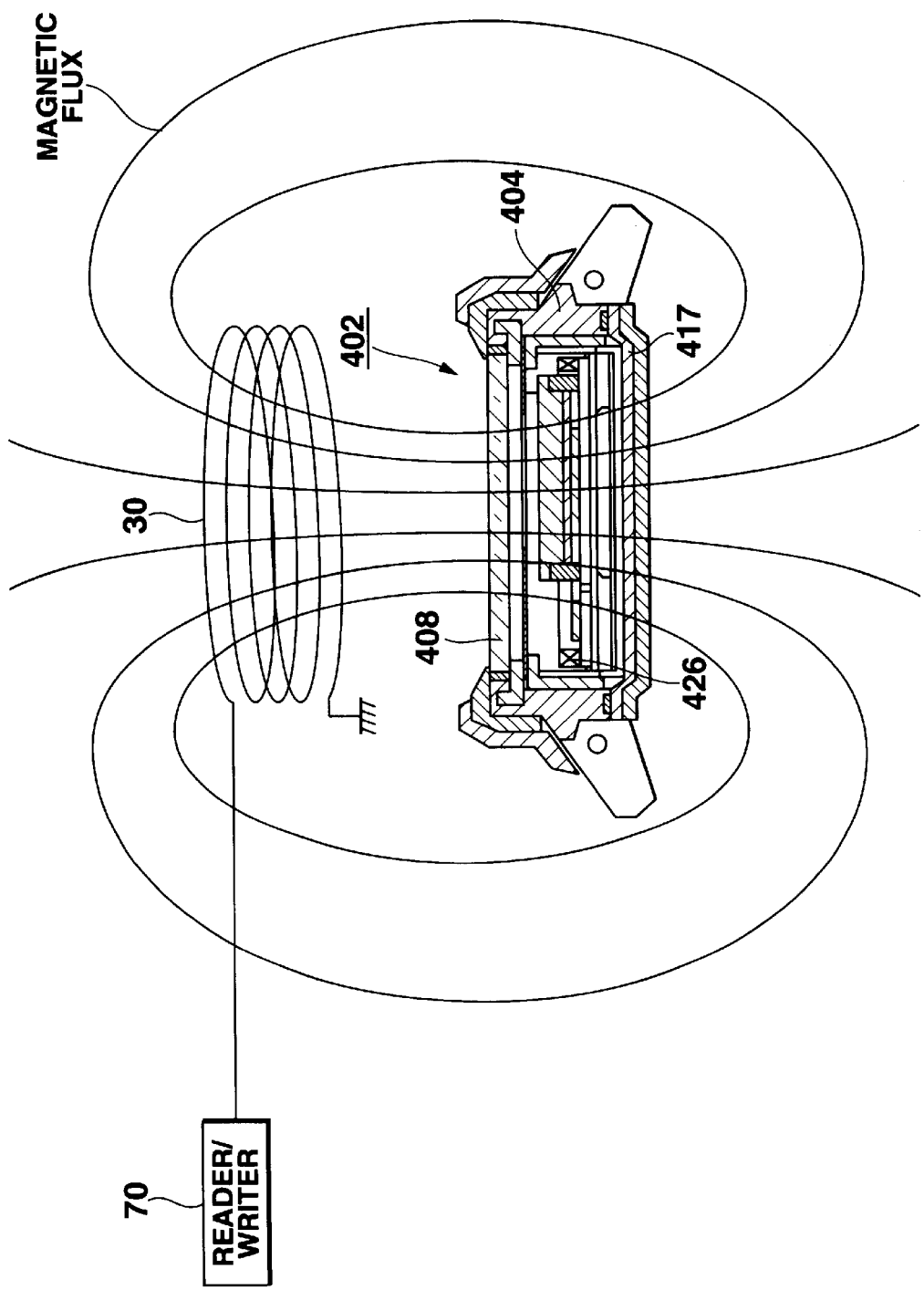
FIG. 17 is an illustrative view illustrating a magnetic field generated during data communication in the fourth embodiment.

In a wristwatch 400 with the above arrangement, a user (a person targeted for authentication) makes it close to the reader/writer of the RF-ID system of electromagnetic induction method or electromagnetic coupling method described in background, thereby making it possible to use the wristwatch 400 itself as an ID Tag. In the wristwatch 400, as described previously, the back cover 417 is formed of a magnetic material. As shown in FIG. 17, when an inductive electromagnetic field is formed between a reader/writer antenna coil 30 that a reader/writer 70 or the like has, its magnetic flux transmits the back cover 417, and passes through the member. Namely, a magnetic flux path in which a magnetic flux passes through the data carrier antenna coil 426 in the case 404 and the back cover 417 is formed of the hard glass member 408 on the upper face of the watch main body 402. Moreover, such magnetic flux path is similar in the case where the aforementioned case 404 is metallic.

From the foregoing, the case 404 or the display frame fixing member 406 can be metallic. Moreover, the back cover 417 can maintain its strength higher than a case when the back cover 417 is unavoidably resin-based in order to make it thin. Therefore, it is possible to ensure proper communication while maintaining water resistance (pressure resistance), shock resistance, rigidity, and hostile-environment resistance. Concurrently, its ornamental properties can be enhanced, and its appearance and design can be diversified according to customer's preference or uses.

Fifth Embodiment

Figure 18:
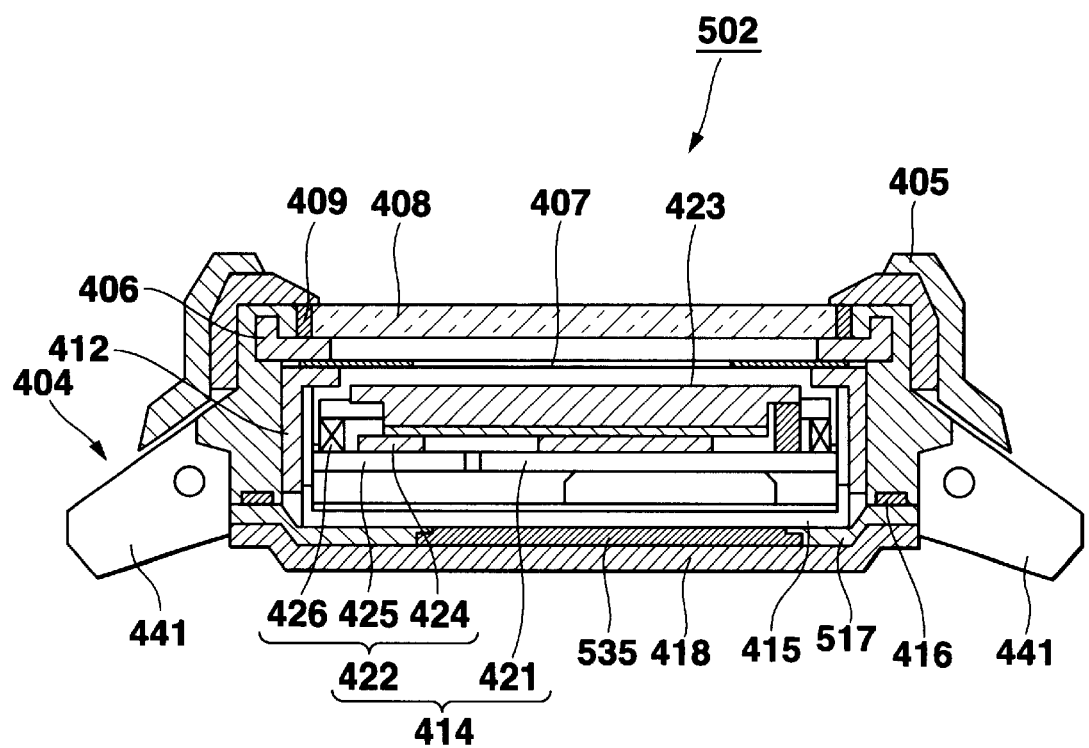
FIG. 18 is a cross section view of a watch main body showing a fifth embodiment of the present invention.
Figure 19:
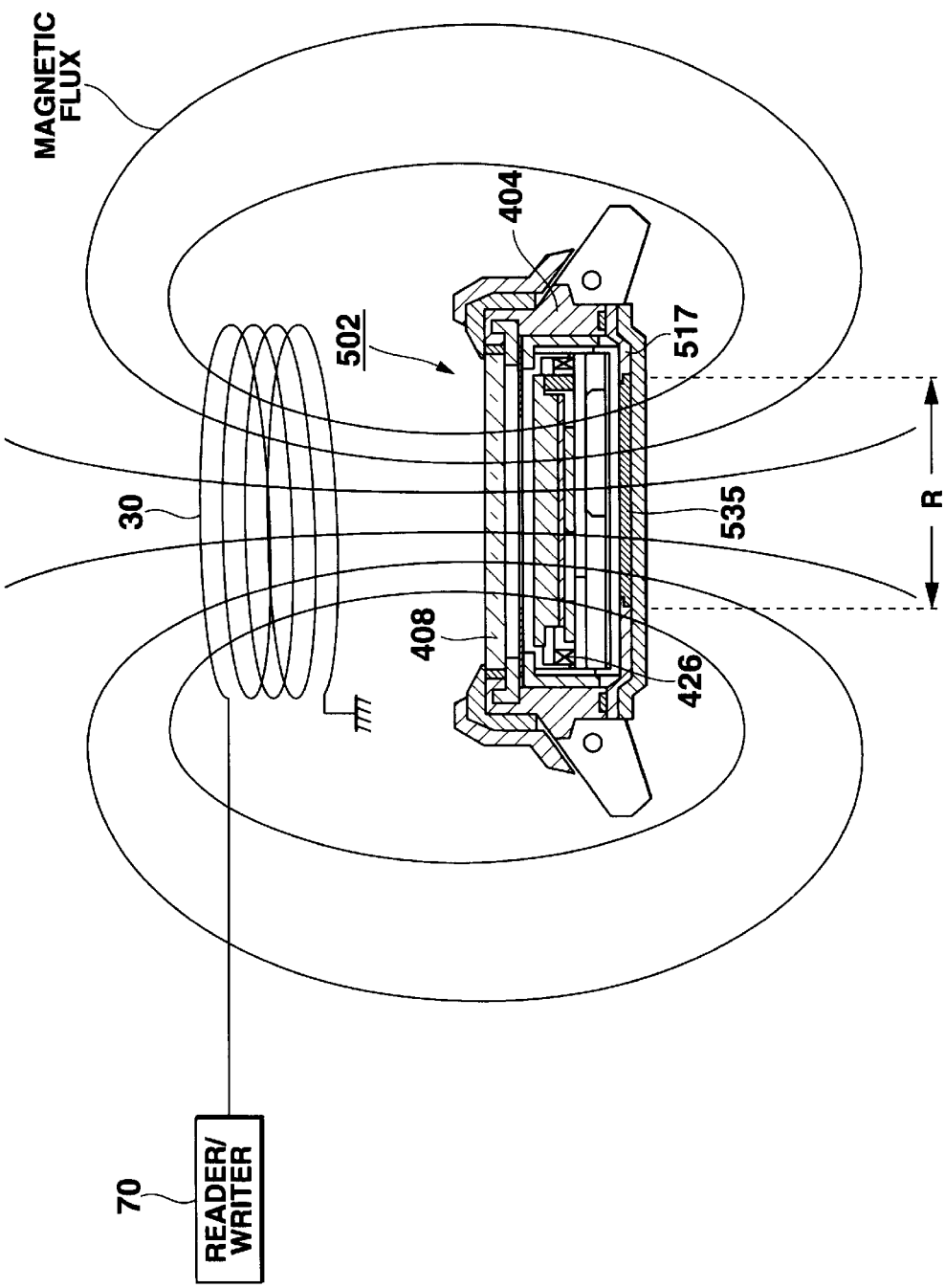
FIG. 19 is an illustrative view illustrating a magnetic field generated during data communication in the fifth embodiment.

FIGS. 18 and 19 are cross section views of a watch main body 502 showing a fifth embodiment of the present invention.

That is, in the present embodiment, a bottom cap member 517 (back cover 517) for closing a downward opening of the case 404 is formed of a metal material, and a back cover for battery replacement 535 for closing a battery replacement hole is attached to a part of the back cover 517. The back cover for battery replacement 535 is substantially at the center of the back cover 517, and is provided at a site corresponding to the inner periphery of the data carrier antenna coil 426. The back cover for battery replacement 535 is formed of a magnetic material. Preferably, this magnetic material includes a metal or its alloy that is a magnetic object such as iron or ferrite, compounds, a mixture such as magnetic powders, or a sintered material such as ceramic material.

The other configurations are similar to those described in the aforementioned first embodiment.

In such arrangement, as shown in FIG. 19, when an inductive electromagnetic field is formed in the midst of the reader/writer antenna coil 30 that the reader/writer 70 or the like has, its magnetic flux transmits the field in an area R corresponding to the back cover for battery replacement 535 and passes through it. Namely, a magnetic flux path in which a magnetic flux passes through the data carrier antenna coil 426 in the case 404 and the back cover for battery replacement 535 is formed of the hard glass member 408 on the upper face of a watch main body 502. Moreover, such magnetic flux path is similar in the case where the aforementioned case 404 is metallic. Therefore, an effect similar to that shown in the fourth embodiment is obtained.

The back cover for battery replacement 535 can be substituted by a material such as resin or ceramics through which a magnetic flux can be transmitted. In this case also, the aforementioned magnetic flux path is formed during communication with the reader/writer 70 or the like. Therefore, a similar effect can be obtained.

In the fourth and fifth embodiments, there is shown a reinforce resin-based case 404. As described previously, in the watch main bodies 402 and 502, a magnetic flux path is ensured in a direction that penetrates its upper and lower faces, thus making it possible to transmit and receive data even if the case 404 is metallic. Therefore, the case 404 is made metallic, thereby making it possible to improve shock resistance and rigidity.

Sixth Embodiment

Figure 20:
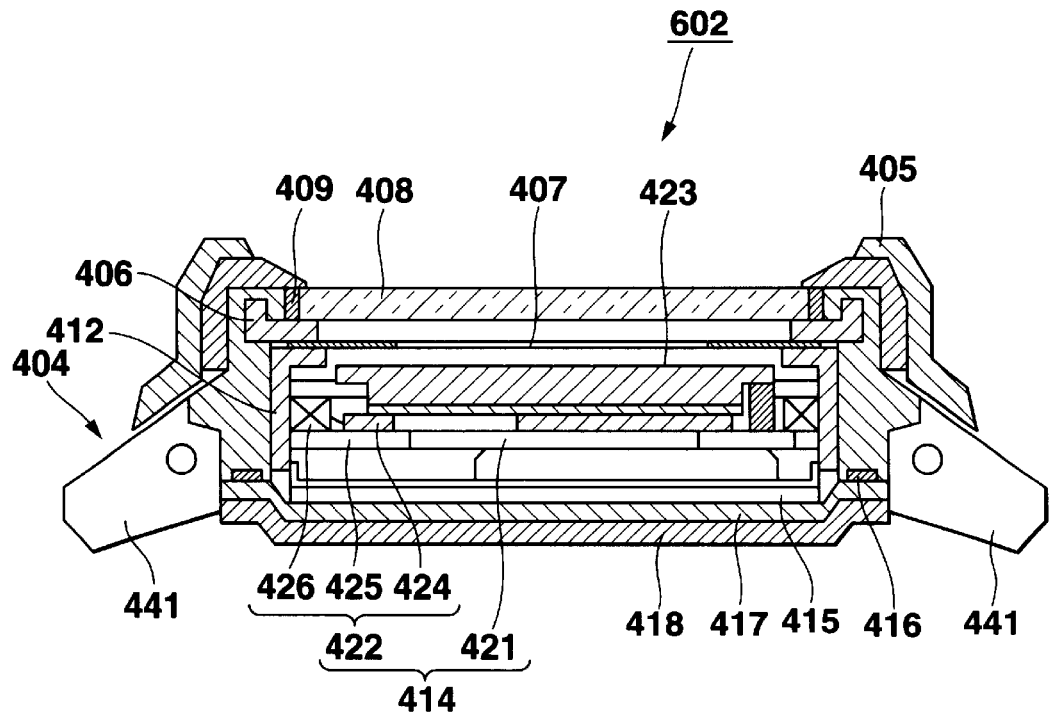
FIG. 20 is a cross section view of a watch main body showing a sixth embodiment of the present invention.

FIG. 20 is a cross section view of a watch main body 602 showing a sixth embodiment of the present invention.

That is, in the present embodiment, as in the fourth and fifth embodiments, the fixing member 406 is insert-molded at the upward inside of the resin-based case 404. The synthetic rubber-based module cover member 412 or the like is provided inside of the case 404, and the module 414 having the data carrier module 422 integrated therewith and the module cover member 415 are housed therein in order. The downward opening of the case 404 is sealed by a back cover 417 via the waterproof packing 416. In the present embodiment, the back cover 517 is formed of a metal material, and the module 414 is positioned at a site distant from the back cover 517 by means of the module cover member 415 or the like.

In such arrangement, although the back cover 417 is metallic, the aforementioned fixing member 406 is positioned at the upward side of the case 404. Further, metal parts do not exist at the downward side of the case 404, making it possible to transmit a magnetic flux on the peripheral wall of the downward side of the case 404. Thus, as described previously, when an inductive electromagnetic field is formed in the midst of the reader/writer antenna coil 30 that the reader/writer 70 has, a magnetic flux passing route 600 that passes through the downward side of the case 404 from the upper face of the watch main body 602 is formed (refer to FIG. 22).

Therefore, the back cover 417 is made metallic, thereby making proper communication possible while maintaining water resistance (pressure resistance), shock resistance, rigidity, and hostile-environment resistance. Moreover, the data carrier antenna coil 426 is provided at a position distant from the back cover 417. Thus, even if the back cover 417 is metallic, there are very few cases that the cap member interferes communication. Therefore, it is possible to ensure proper communication.

Seventh Embodiment

Figure 21:
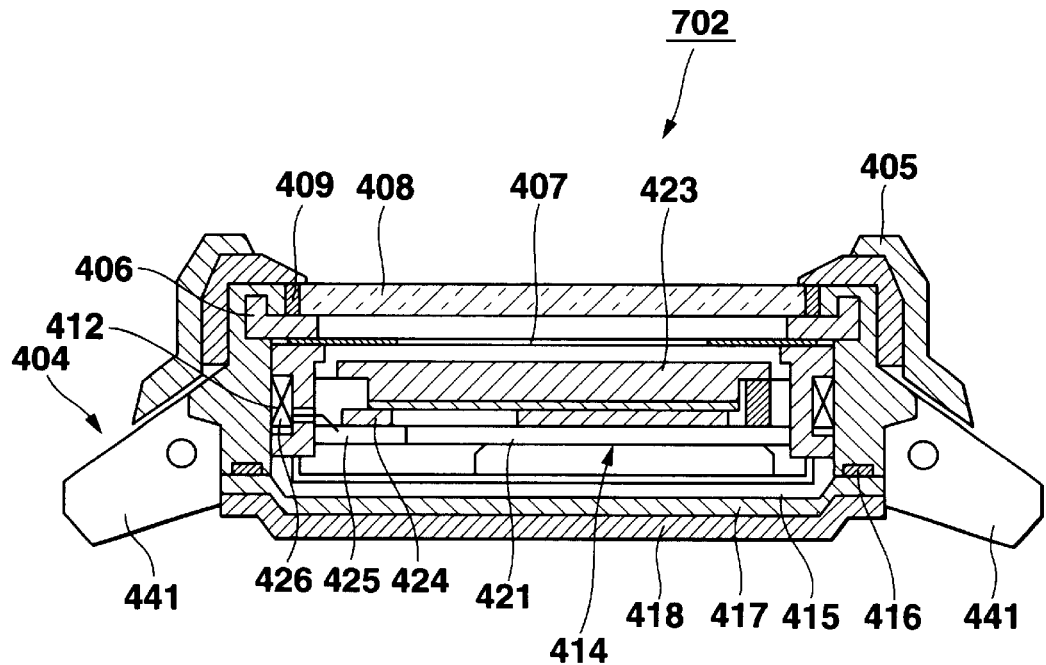
FIG. 21 is a cross section view of a watch main body showing a seventh embodiment of the present invention.

FIG. 21 is a cross section view of a watch main body showing a seventh embodiment of the present invention.

That is, in the present embodiment, as in the sixth embodiment, the back cover 417 is formed of a metal material, whereas the outer peripheral face of the data carrier antenna coil 426 is arranged to be fitted with the downward side of the inner periphery case 404 at the module cover member 412.

Figure 22:
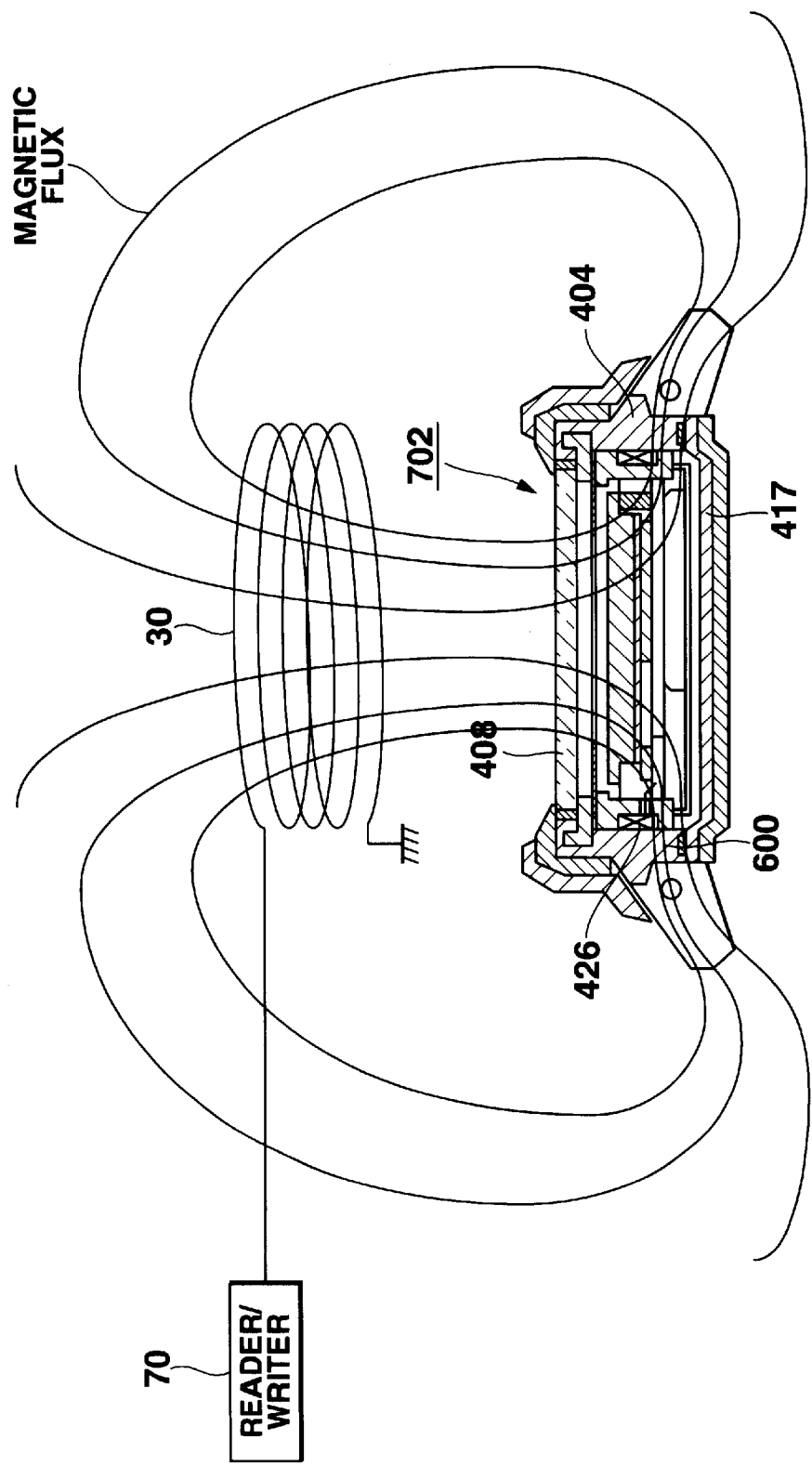
FIG. 22 is an illustrative view illustrating a magnetic field generated during data communication in the sixth and seventh embodiments of the present invention.

In such arrangement, as in the fifth embodiment, it is possible to transmit a magnetic flux on the downward peripheral wall of the case 404. As shown in FIG. 22, when an inductive electromagnetic field is formed in the midst of the reader/writer antenna coil 30 that the reader/writer or the like has, a magnetic flux path in which its magnetic flux passes through the downward side of the case 404 from the upper face of the watch main body 702 is formed. Even if the back cover 417 is made of a metal, there are very few cases that the cap member interferes communication. Therefore, it is possible to ensure proper communication.

In the present embodiment and sixth embodiment, although there is shown the resin-based case 404 having a magnetic flux path ensured on its downward side, all or vertical part of the case 404 may be formed of a magnetic material, for example. In that case also, during data transmission/reception, a magnetic flux path in which a magnetic flux passes through the data carrier antenna coil 426 in the case 404 and the peripheral wall of the case 404 can be formed from the hard glass member 408 on the upper face of the watch main bodies 602 and 702, and an effect similar to the aforementioned effect is obtained.

Eighth Embodiment

Figure 23:
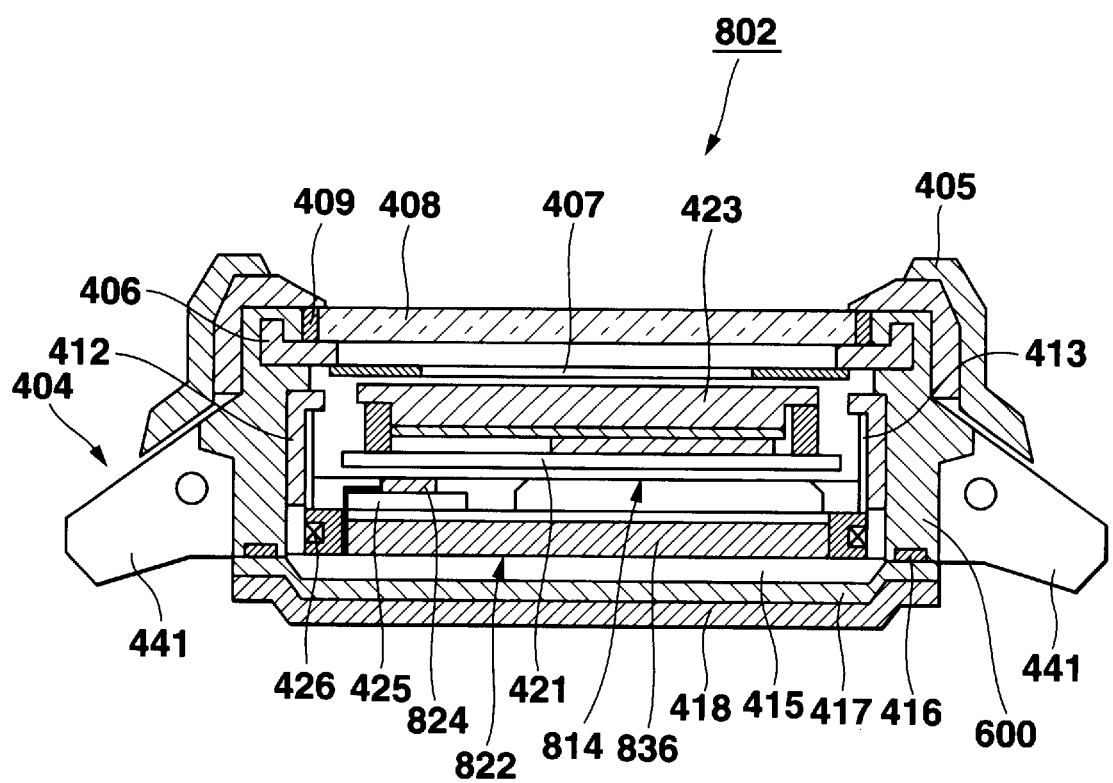
FIG. 23 is a cross section view of a watch main body showing an eighth embodiment of the present invention.
Figure 24:
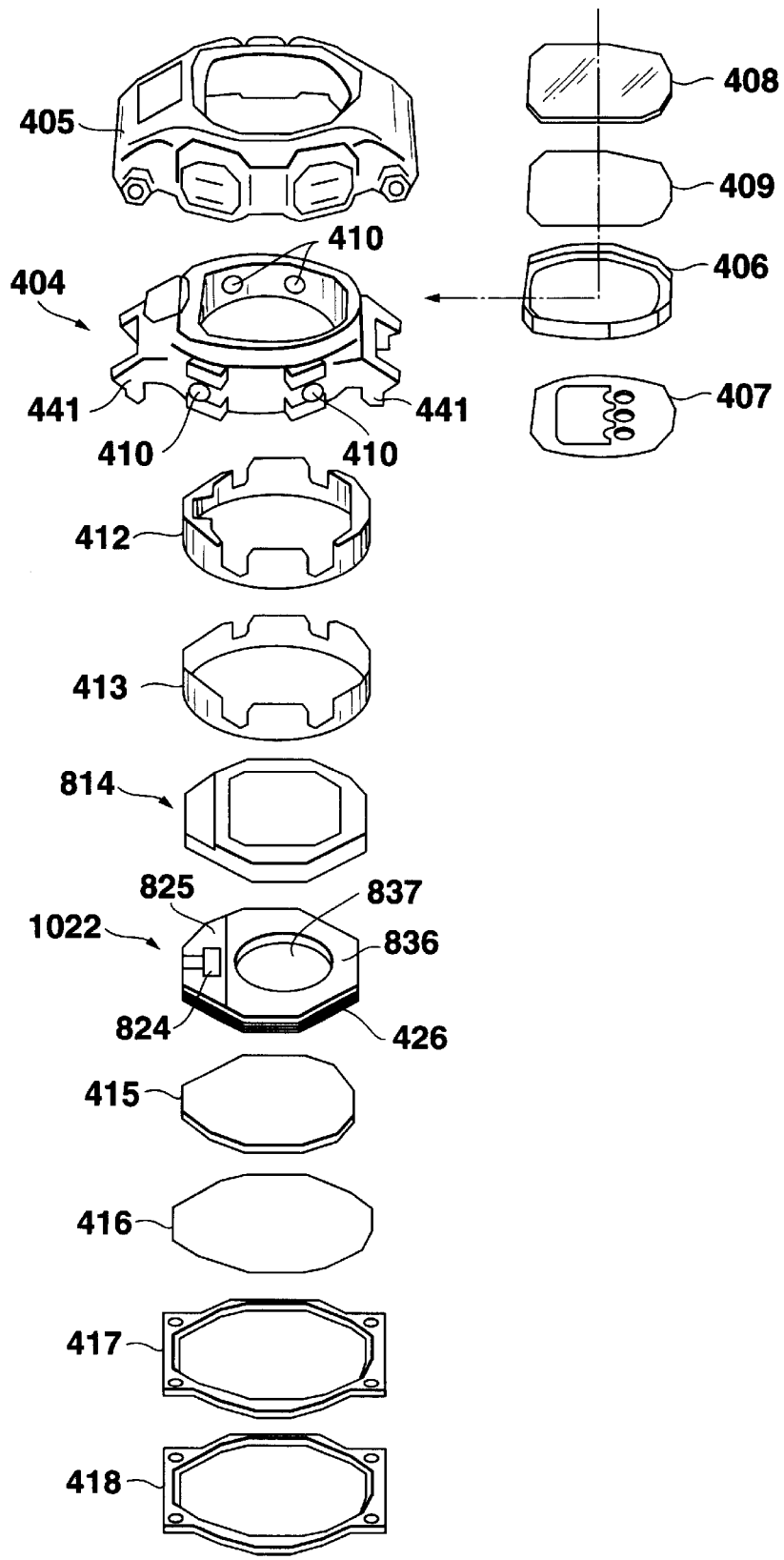
FIG. 24 is an exploded perspective view of the watch main body.

FIGS. 23 and 24 are cross section views of a watch main body 802 showing an eighth embodiment of the present invention.

That is, in the present embodiment, as in the sixth and seventh embodiments, although the back cover 417 is formed of a metal material, a data carrier module 822 is arranged independent of a module 814. Specifically, the data carrier module 822 is positioned and fixed distant from the back cover 417 by some millimeters at the lower part of the module 814.

The data carrier module 822 is composed of a data carrier IC substrate 825 having the aforementioned data carrier IC 824, a data carrier antenna coil 426, and a plate-shaped magnetic core 836 formed of a magnetic material and having a recess 837 at its center. A linear conductive material constituting the data carrier antenna coil 426 is wound on the outer periphery of the magnetic core 836 by some turns or some tens of turns with a vertical direction penetrating the surface and bottom face of the watch main body 802 being a winding axis, and a data carrier IC substrate 825 is arranged at the upper part of the magnetic core 836. The other elements are similar to those shown in the aforementioned other embodiment.

Figure 25:
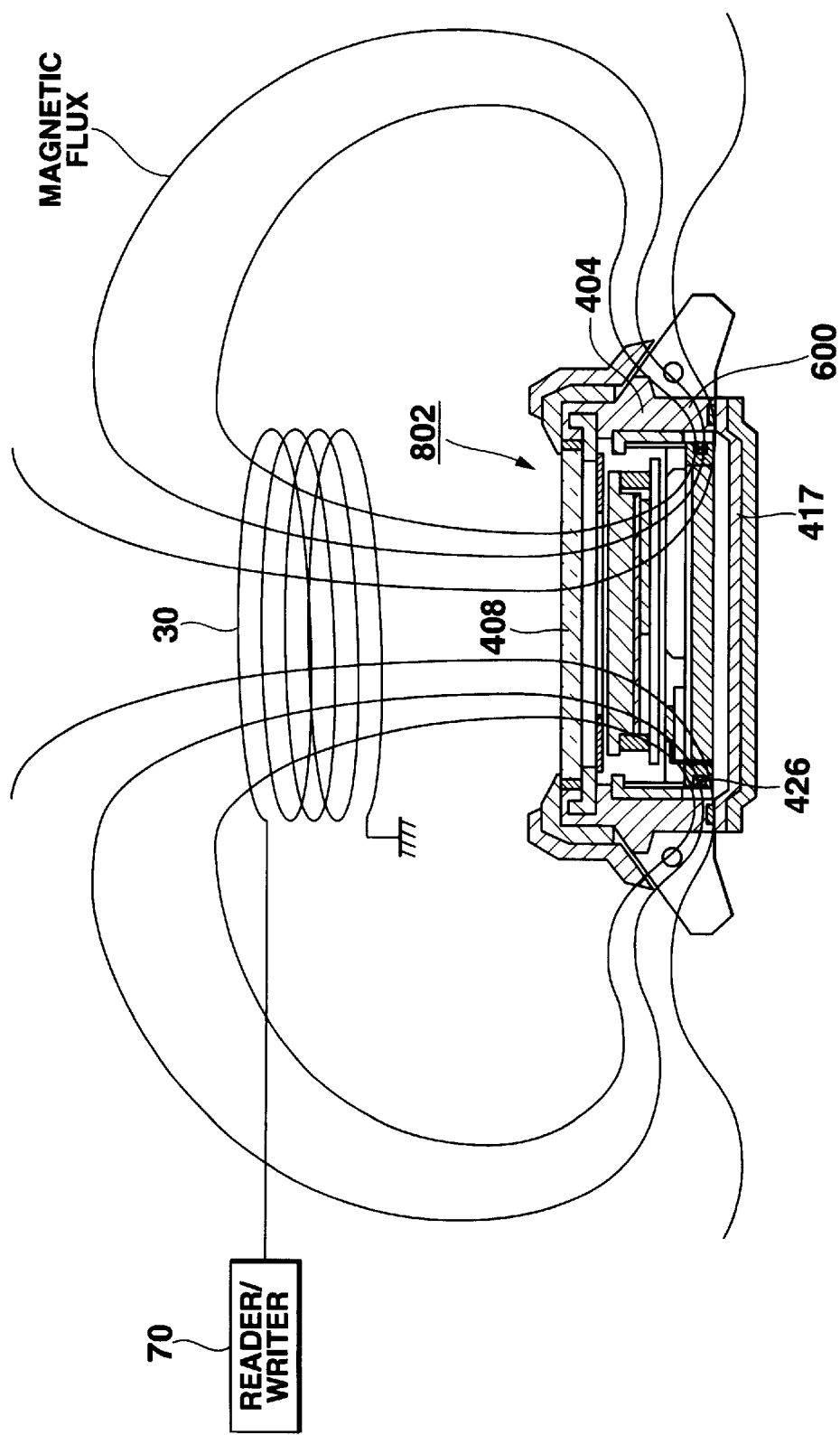
FIG. 25 is an illustrative view illustrating a magnetic field generated during data communication in the eighth embodiment.

In such arrangement also, as shown in FIG. 25, when an inductive electromagnetic field is formed between the reader/writer antenna coil 30 that the reader/writer 70 or the like has, a magnetic flux path in which a magnetic flux passes through the downward side of the case 404 from the upper face of the watch main body 802 is formed. Therefore, effects similar to those shown in the sixth and seventh embodiments are obtained. Moreover, in the present embodiment, a magnetic flux is converged by the magnetic core 836. Thus, even if the back cover 417 is metallic, a proper magnetic flux can be ensured while it is less influenced by such magnetic force. Therefore, a communication state can be improved compared with that shown in the sixth and seventh embodiments each.

FIG. 26 shows a modified example of the fifth embodiment shown in the aforementioned FIG. 18, wherein two data carrier antenna coils are provided. That is, as described previously, the data carrier module 422 is composed of a transmitting/receiving signal modulation circuit or an encoding/decoding circuit, a data memory which stores data such as ID, an IC substrate 425 having a data carrier IC 424 that incorporates a transmission/reception or authentication control circuit, and a first data carrier antenna coil 826 connected to the IC substrate 425, which transmits and receives a signal by means of electromagnetic induction. A second data carrier antenna coil 827 is arranged at the lower part of the IC substrate 425. The second data carrier antenna coil 827 is connected to the data carrier IC 424 via a conductive wire 828.

The first and second data carrier antenna coils 826 and 827 enable communication with the reader/writer antenna coil at each of their different carrier frequencies. For example, the First data carrier antenna coil 826 enables transmission to and reception from the reader/writer antenna coil at a carrier frequency of 125 KHz, and the second data carrier antenna coil 827 enables transmission to and reception from the reader/writer antenna coil at a carrier frequency of 13.56 MHz. Therefore, according to the present embodiment, the same wristwatch (ID Tag) can be used for two types of the RF-ID systems having their different carrier frequencies. Of course, many more data carrier antenna coils are incorporated, thereby making it possible to use the same wristwatch for more various types of systems.

Ninth Embodiment

Now, in the aforementioned fourth to eighth embodiments, an antenna coil available which transmits and receives a signal by means of electromagnetic induction will be described.

FIGS. 27A to 31E are cross section views and perspective views each illustrating an analogous mode when nothing is mounted on the opening of the antenna coil.

Hereinafter, as described in order, in FIG. 27A, reference numeral 426A designates an element consisting of only a data carrier antenna coil, in FIG. 27B, reference numeral 426B designates an element of thin winding type, and in FIG. 27C, reference numeral 426C designates an element of thick winding type.

Figure 28C:
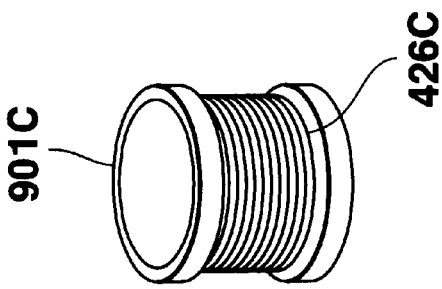
FIGS. 28A, 28B and 28C are views each showing another antenna coil.
Figure 28B:
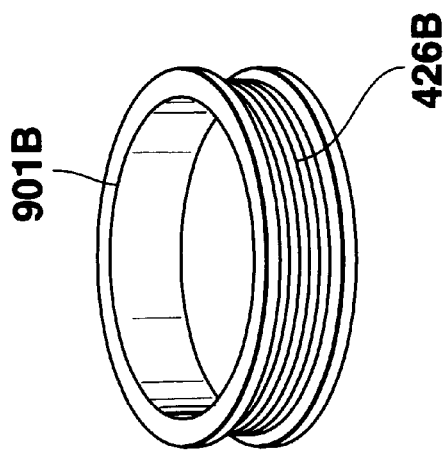
Figure 28A:
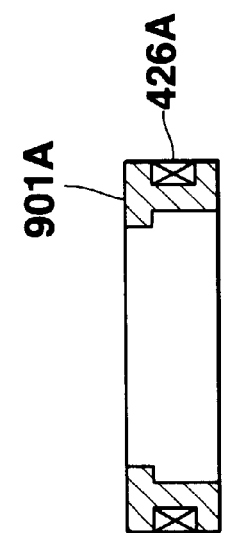

FIG. 28A shows that a linear conductive material constituting the data carrier antenna coil 426A is wound around a cylindrical bobbin 901A by some turns to some tens of turns, FIG. 28B shows a low bobbin 901B, FIG. 28C shows a tall bobbin 901C.

FIG. 29A shows that a linear conductive material constituting the data carrier antenna coil 426A is wound around the cylindrical bobbin 901A by some turns or some tens of turns, and a cylindrical magnetic core 902A consisting of a magnetic material is fitted with the inside of the bobbin 901A, FIG. 29B shows a thin magnetic core 902B, and FIG. 29C shows a thick magnetic core.

Figure 30A:
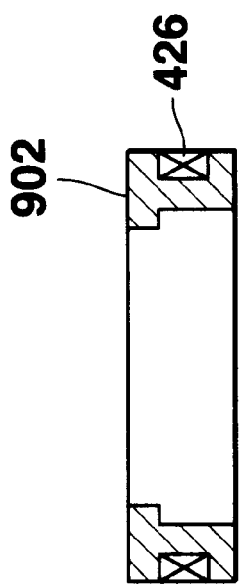
FIGS. 30A and 30B are views each showing another antenna coil.
Figure 30B:
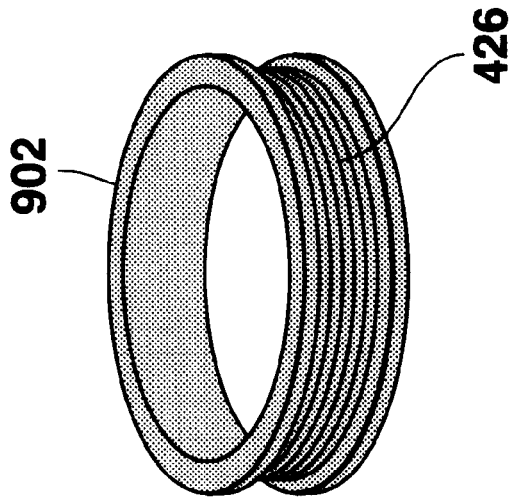

FIGS. 30A and 30B show that a linear conductive member constituting the data carrier antenna coil 426 is directly wound around a cylindrical magnetic core 902 by some turns or some tens of turns.

From among these elements, those having their large openings are employed in the aforementioned fourth to seventh embodiments.

Figure 31D:
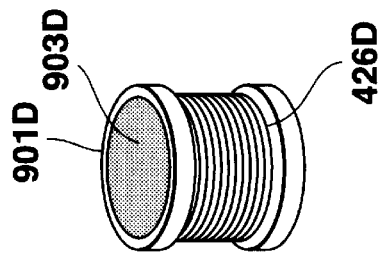
FIGS. 31A, 31B, 31C, 31D and 31E are views each showing another antenna coil.
Figure 31E:
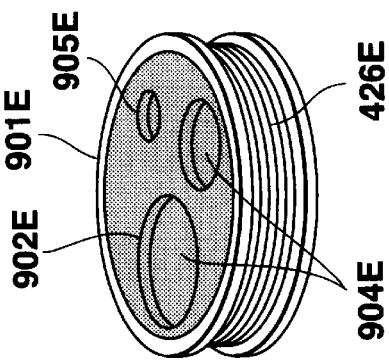
Figure 31B:
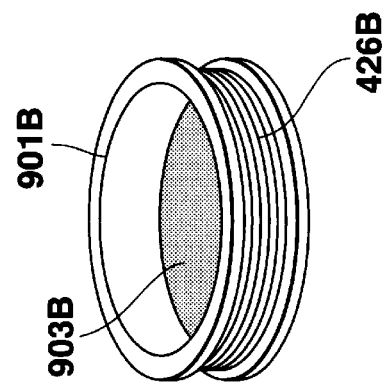
Figure 31C:
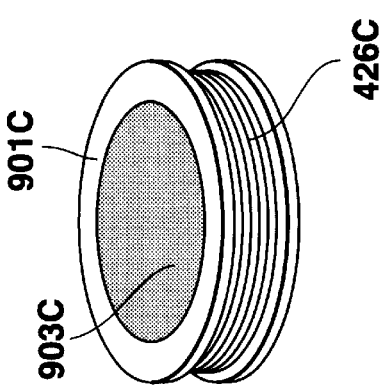

FIGS. 31 to 31E are sectional and perspective views of analogous mode of shape having the opening of the antenna coil filled with the magnetic core.

Figure 31A:
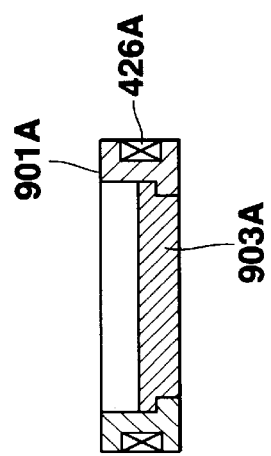

FIG. 31A shows that a plate-shaped magnetic core 903A consisting of a magnetic material is fitted with a cylindrical bobbin 901A around which a linear conductive member constituting the data carrier antenna coil 426 is wound by some turns to some tens of turns (i.e., those shown in FIG. 28A). The antenna of this type is such that a magnetic core 903B is fitted with only a bottom of a bobbin 901B (FIG. 31B), the insides of bobbins 901D and 901C are embedded by magnetic cores 903D and 903C (FIGS. 31D and 31C), the inside of a bobbin 901E is filled with a magnetic core 903E, and the magnetic core 903E is provided with a recess 904E and a hole 905E as required (FIG. 31E). These types are mainly employed in the eighth embodiment.

Tenth Embodiment

Figure 32:
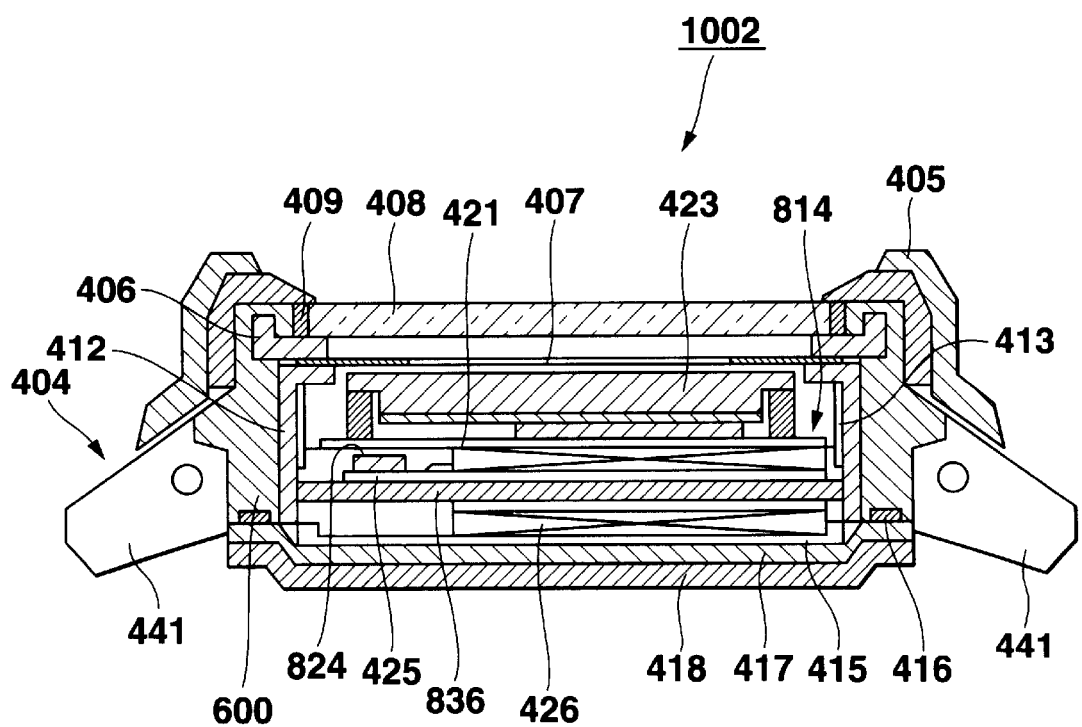
FIG. 32 is a cross section view of a watch main body showing a tenth embodiment of the present invention.
Figure 33:
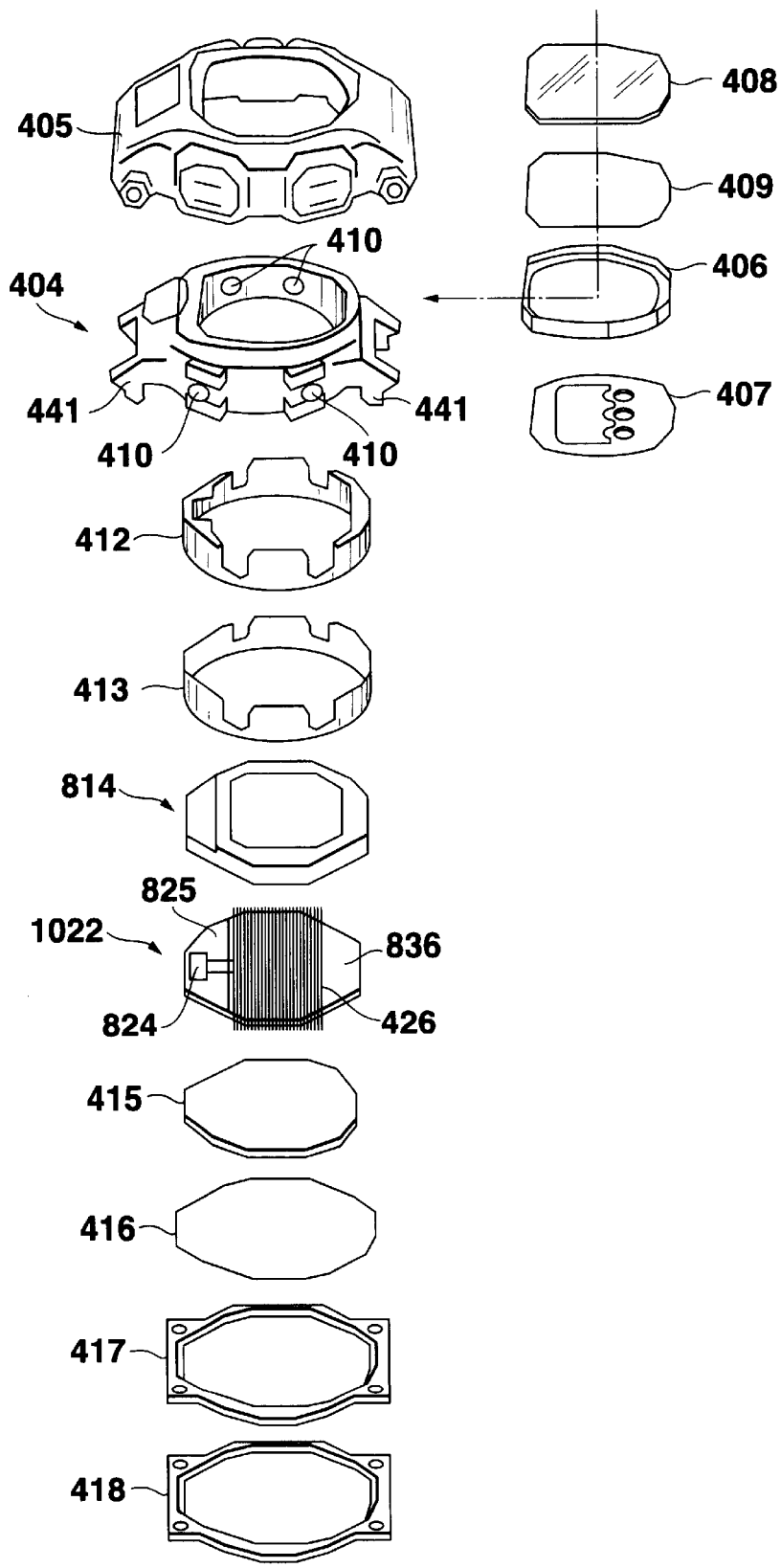
FIG. 33 is an exploded perspective view of the watch main body.

FIGS. 32 to 34 show a watch main body 1002 showing the tenth embodiment of the present invention.

That is, in the present embodiment, as in the eighth embodiment, the back cover 417 is formed of a metal material, and a data carrier module 1022 is arranged independent of a module 814, and is positioned and fixed distant from the back cover 417 by some millimeters at the lower part of the module 814. The data carrier module 1022 is composed of a data carrier IC substrate 825 having the aforementioned data carrier IC 824, a data carrier antenna coil 426, and a plate-shaped magnetic core 826 consisting of a magnetic material.

In the present embodiment, unlike the eighth embodiment, a linear conductive member constituting the data carrier antenna coil 426 is wound around the outer periphery of a disc-shaped magnetic core 436 by some turns to some tens of turns with a horizontal direction orthogonal to that penetrating the surface and back face of the watch main body 1002 being a winding axis, and the data carrier IC substrate 825 is arranged at the upper part of the disc-shaped magnetic core 436.

The other elements are similar to those shown in the aforementioned eighth embodiment.

In such arrangement, a linear conductive member constituting the data carrier antenna coil 426 is wound around the outer periphery of the disc-shaped magnetic core 436 arranged in horizontal direction of the watch main body 1002 by some turns or some tens of turns with the horizontal direction being a winding axis. Thus, when an inductive electromagnet field is formed in the midst of the reader/writer antenna coil 30 that the reader/writer 70 or the like has, a part of the magnetic flux passes through the downward side of the case 404 from the upper face of the watch main body 1002. However, a majority of the magnetic flux exits from the other downward side of the case 404 through the inside of the data carrier antenna coil 426, that is, a disc-shaped magnetic core 836 around which the data carrier antenna coil 426 is wound. Therefore, the magnetic flux of an inductive electromagnetic field can pass in the horizontal direction of the watch main body 1002, and thus, an effect similar to that shown in the aforementioned eighth embodiment is obtained.

Eleventh Embodiment

FIGS. 35A to 35I illustrate an antenna available which transmits and receives a signal by means of electromagnetic induction in the aforementioned tenth embodiment.

Figure 35A:
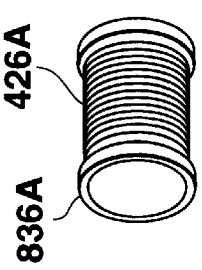
FIGS. 35A, 35B, 35C, 35D, 35E, 35F, 35G, 35H and 35I are views each showing a modified example of an antenna coil according to an eleventh embodiment of the present invention.
Figure 35B:
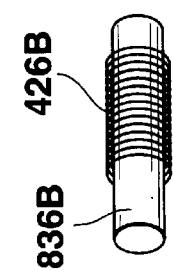
Figure 35C:
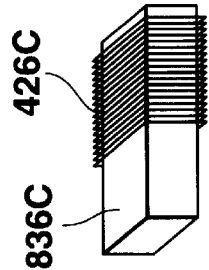
Figure 35D:
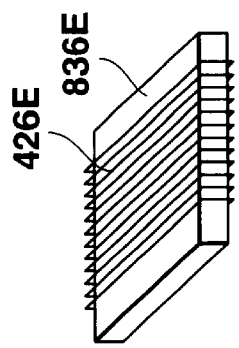
Figure 35E:
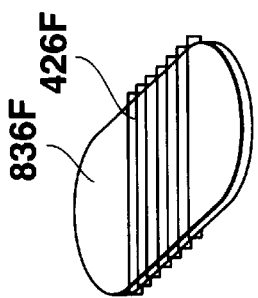
Figure 35F:
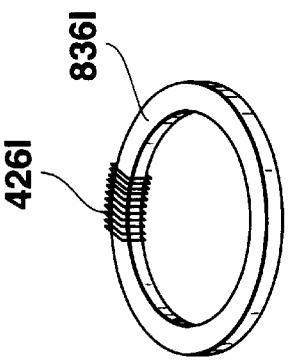
Figure 35G:
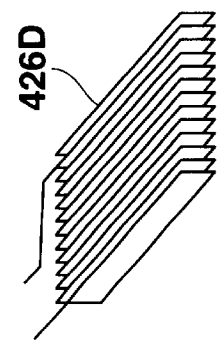
Figure 35H:
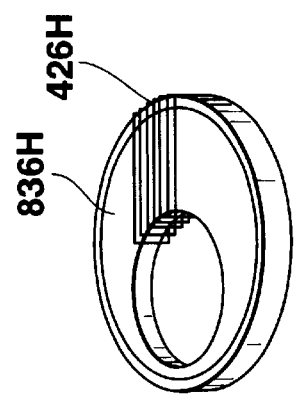
Figure 35I:
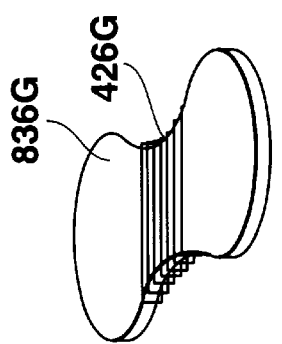

That is, the magnetic core 836 around which a linear conductive member constituting the data carrier antenna coil 426 is mounted by some turns to some tens of turns may be formed in a cylindrical shape 836A (FIG. 35A), a columnar shape 836B (FIG. 35B), square pillar shape 836C (FIG. 35C), a rectangular-plate shape 836E (FIG. 35E), an elliptical shape 836F (FIG. 35F), a butterfly ribbon shape 836G (FIG. 35G), a partially dripped plate shape 836H (FIG. 35H), or a ring shape 836I (FIG. 35I). Occasionally, an antenna having a weak convergence of a magnetic flux and only a data carrier antenna coil 426D (FIG. 35D) may be employed.

Twelfth Embodiment

FIGS. 36A to 36F show the twelfth embodiment of the present invention.

In the present embodiment, there is shown a modified example of a display frame fixing member 406 to be inserted into the aforementioned resin-based case 404. Although each plane is shown to be in circular shape (or in substantially circular shape), it is actually molded in planar shape required.

Hereinafter, as described in order, the display frame fixing member 406A shown in FIG. 36A is formed in shape having an uneven member 4061 in radial direction all around there, and its shape is tuned such that an inductance component in frequency bandwidth used in advance for data transmission/reception is increased compared with a cylindrical shape that is a basic shape.

The display frame fixing member 406B shown in FIG. 36B is shaped so that a plurality of recesses 4062 are provided with equal intervals all around its upper and lower edges, and the display frame fixing member 406C shown in FIG. 36C is shaped so that a plurality of protrusions 4063 are provided with predetermined intervals all around its upper edges.

That is, as shown in FIGS. 36B and 36C, the fixing members are molded in shape so that the sectional shape of the ring cutting direction is diversified, and the shapes of these members are tuned such that the inductance component in frequency bandwidth used in advance for data transmission/reception is increased compared with a cylindrical shape that is a basic shape.

Namely, in the display frame fixing member 406 of the foregoing shape, its impedance is greater than that of the cylindrical shape that is a basic shape. Thus, when this shape is compared with a case in which the shape is merely molded in basic shape, a small amount of eddy current is generated during data transmission/reception. Therefore, when the display frame fixing member 406 in the aforementioned watch main body is formed as shown in FIGS. 36A to 36C, even if it is metallic, a transmission/reception failure caused by an eddy current can be reduced. At the same time, the display frame fixing member is made metallic, thereby making it possible to improve communication performance while maintaining basic performance of the watch main body 1002 such as shock resistance or rigidity.

The display frame fixing member 406D shown in FIG. 36D is screwed and coupled by sandwiching a non conductive member 47 at both ends of a substantially Ω-shaped member. In such display frame fixing member 406D, an electric resistance at the coupling section is greater than that at the other general section, and thus, an eddy current generated during data transmission/reception is reduced. Moreover, mechanical strength can be ensured because of its ring shape. Therefore, an effect similar to the aforementioned effect is obtained. Although there is shown the display frame fixing member 406D screwed at the coupling section by sandwiching the non-conducting member 47D, a similar effect is obtained by coupling both ends by another coupling means such that a contact resistance is increased.

The display frame fixing member 406 shown in FIG. 36E is provided with a coating layer 48E of a coating containing particles or powders around its inner periphery face. In such display frame fixing member 406E also, an eddy current generated during data transmission/reception can be decreased, and an effect similar to the aforementioned effect is obtained.

The display frame fixing member 406F shown in FIG. 36F is provided with a coating layer 48F all around its surface. An effect similar to that shown in FIG. 36E is obtained.

In addition to those shown in FIGS. 36A to 36F, when the display frame fixing member 406 is substituted by that formed of a reinforce resin having strength equal thereto or non-conductive material such as ceramics or another metal with low conductivity, an electric resistance is increased. Thus, an eddy current generated by subjecting the member to an inductive electromagnetic field can be eliminated or reduced, and a transmission/reception failure caused by such eddy current can be reduced (eliminated).

In the present embodiment, a structure of the display frame fixing member 406 of the aforementioned watch main body has been described. However, for example, in the case where the case 404 is metallic, the case 404 is formed in the aforementioned shape. In addition, in the case where there exists another metallic annular member that forms a hollow section penetrated by the magnetic flux of the aforementioned data carrier antenna coil 426, the case 404 is formed in the aforementioned shape. In this manner, a similar effect can be obtained.

FIGS. 37 to 61 show thirteenth to twenty-third embodiments of the present invention, and show a circuit configuration and system configuration when a data carrier antenna coil is provided at the watch band or watch case main body. Hereinafter, each of these embodiments will be described in detail.

Thirteenth Embodiment

FIG. 37 shows a system configuration of the thirteenth embodiment. As illustrated, a wristwatch 1301 constituting this system is composed of, a metallic watch main body 1302, and resin-based Wrist band members 1303 and 1304 engaged with both ends of the watch main body 1302. A data carrier module 1305 is arranged at one wrist band member 1304. The data carrier module 1305 is composed of a data carrier IC 1306 and a data carrier antenna coil 1307 connected to the data carrier IC 1306.

A reader/writer antenna coil 1308 corresponding to the data carrier antenna coil 1307 is grounded at one end, and is connected to a reader/writer 1310 at the other end. The reader/writer 1310 is connected to a gate device 1312 via a control device/control system 1311.

Figure 38A:
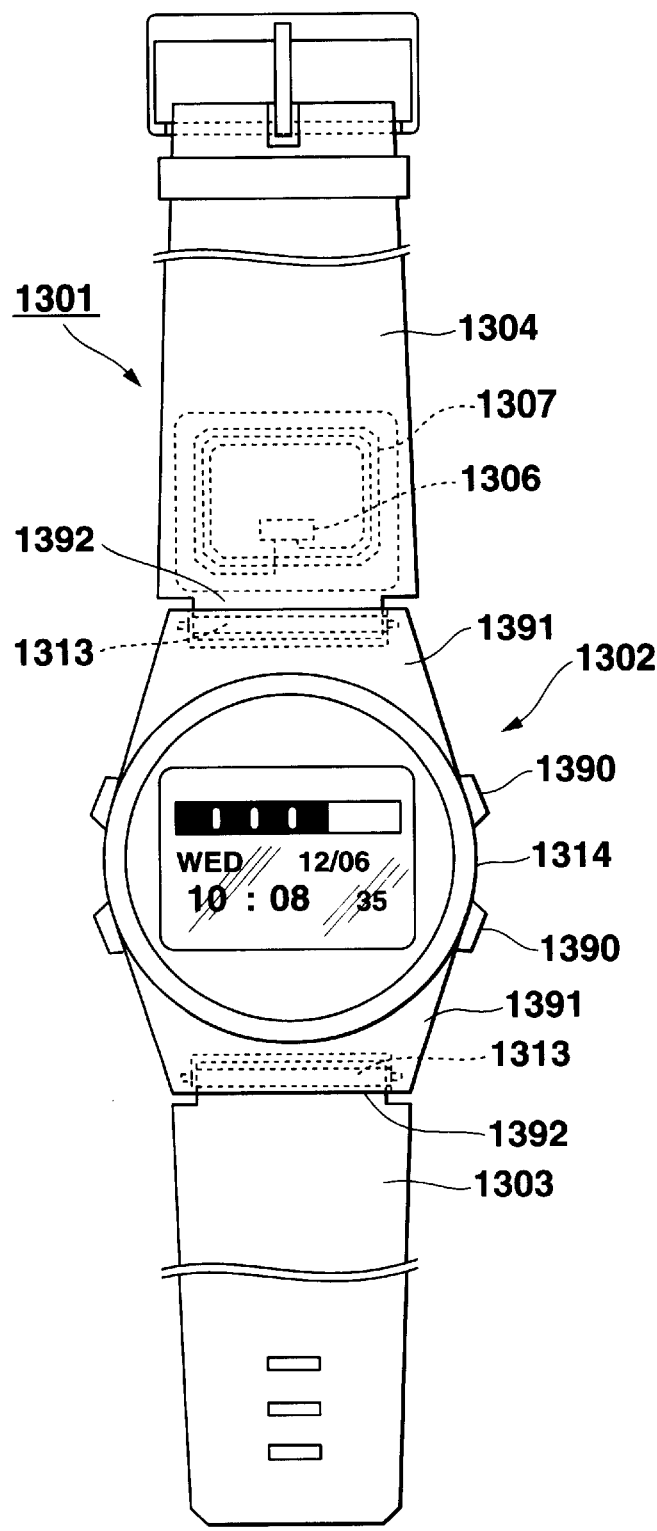
FIG. 38A is a plan view of the wristwatch according to the thirteenth embodiment.
Figure 38B:
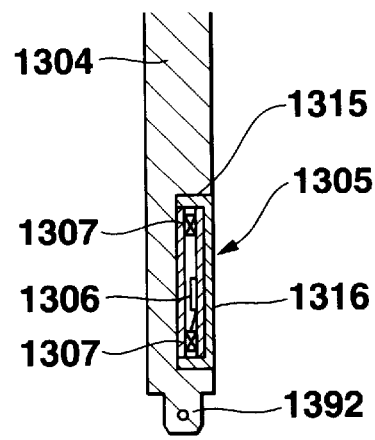
FIG. 38B is a cross section view of the wristwatch according to the thirteenth embodiment.

FIGS. 38A and 38B show a specific arrangement of the wristwatch 1301. That is, a watch main body 1302 has a LCD panel 1314 provided on the center of the display, and a plurality of key members 1390 are provided at its periphery. At a site mutually opposed to the periphery, band attachments 1391, 1391 are provided. Wrist band members 1303 and 1304 are engaged with these band attachments 1391, 1391 by means of a spring rod 1313 inserted through attachments 1392, 1392 provided at its tip end. A recess 1315 opening on its surface side is provided in the vicinity of the attachment 1392 for attaching one band member 1304. The data carrier module 1305 is fittingly arranged in the recess 1315 in plane, and the data carrier module 1305 comprises a case 1316 that houses the data carrier IC 1306 and the data carrier antenna coil 1307.

Figure 39:
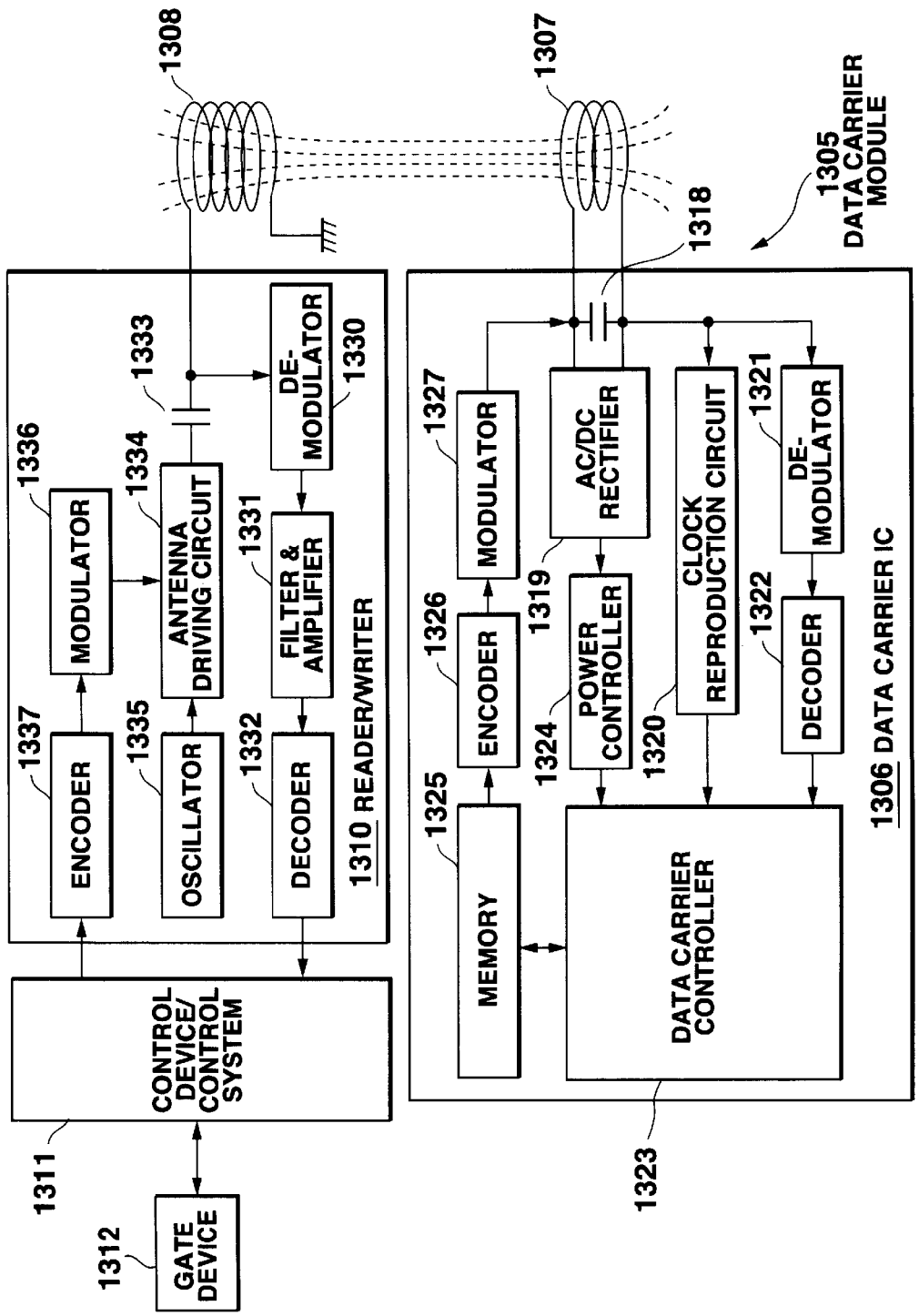
FIG. 39 is a block configuration diagram showing the entire system according to the thirteenth embodiment.

FIG. 39 is a block diagram showing an arrangement of the data carrier module 1305 and the reader/writer 1310. As illustrated, the data carrier module 1305 includes a capacitor 1318 connected at both ends of the data carrier antenna coil 1307, and includes an AC/DC (rectifier) 1319, a clock reproduction circuit 1320, a demodulator 1321, and a decoding section 1322. A current rectified by the AC/DC (rectifier) 1309 is supplied to a data carrier controller 1323 via a power controller 1324. Further, a clock reproduced by the clock reproduction circuit 1320 and data decoded by the decoding section 1322 are input to the data carrier controller 1323. The data carrier controller 1323 supplies data stored in a memory 1325 to an encoder 1326 based on the data or the like input from each section. The data encoded by the encoder 1326 is modulated by a modulator 1327 so as to be transmitted to the data carrier antenna coil 1307.

The reader/writer 1310 includes an antenna driving circuit 1334 connected to one end of a reader/writer antenna coil 1308 via a converter 1333, and a demodulator 1330. A signal demodulated by the demodulator 1330 is filtered and amplified by means of a filter & amplifier 1331, is decoded by means of the decoder 1332, and is supplied to a control device/control system 1311. A control signal from the control device/control system 1311 is encoded by means of an encoder 1337, is demodulated by means of a modulator 1336, and is supplied to an antenna driving circuit 1334. The antenna driving circuit 1334 is configured so as to drive the reader/writer antenna coil 1308 based on a watch of a predetermined frequency output from an oscillator 1335 and a signal modulated by the modulation section 1336.

Figure 40:
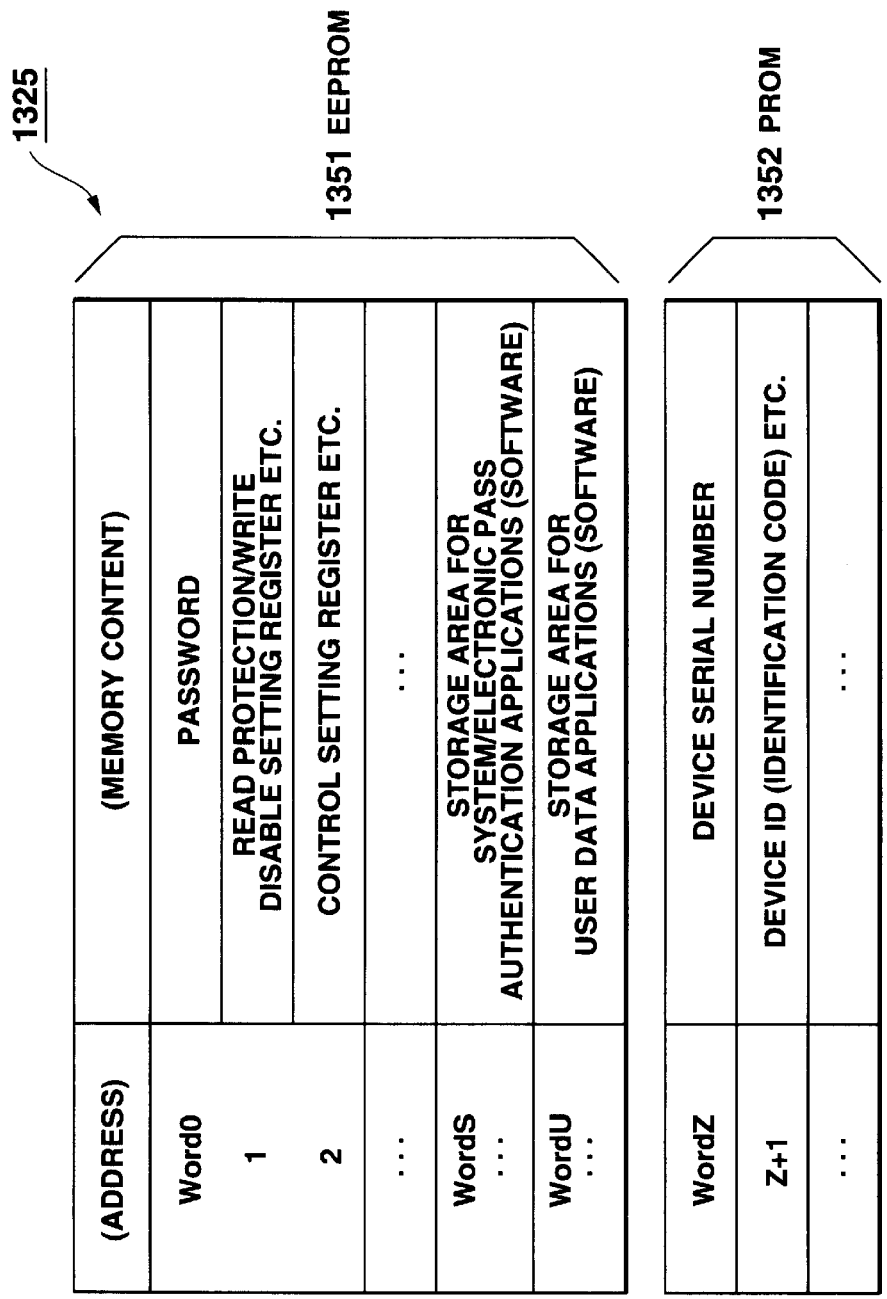
FIG. 40 is a view of memory configuration in a data carrier module shown in FIG. 39.

A memory 1325 of the data carrier IC 1306, as shown in FIG. 40, is composed of EEPROM (non-volatile read/write memory) 1351 and PROM (read-only memory) 1352. The EEPROM 1351 stores passwords (write-only/external read protection), a read protection/write disable setting register or the like, and a control register in order from address (storage section) Word 0. Word S and subsequent are provided with a system/electronic pass or authentication application software storage area, and Word U is provided with a user data/user application software storage area. PROM 1352 stores the device serial number and device ID (identification number) or the like specific to the wristwatch 1301 in order from address Word Z.

In the present embodiment according to the above arrangement, when transmission data (FIG. 41A) is supplied from the memory 1325 of the data carrier IC 1306 to the reader/writer 1310, the data is processed by means of the encoder 1326 and the modulator 1327, and transmitting signal (FIG. 41B) is radiated from the data carrier antenna coil 1307. In this state, when a user wearing the wristwatch 1301 on the wrist is close to a gate device 1312 at which the reader/writer antenna coil 1308 is arranged, the data carrier antenna coil 1307 receives a receiving signal (FIG. 41C) by inductive electromagnetic waves. Then, a clock reproduction circuit 1320 of the data carrier IC 1306 generates a reproducing clock (FIG. 41D), and transmits the reproducing clock (FIG. 41D) to the data carrier controller 1323. The decoder 1322 generates receiving data (FIG. 41D) based on a signal from the demodulator 1321, and transmits the data to the data carrier controller 1323.

Figures 42A, 42B:
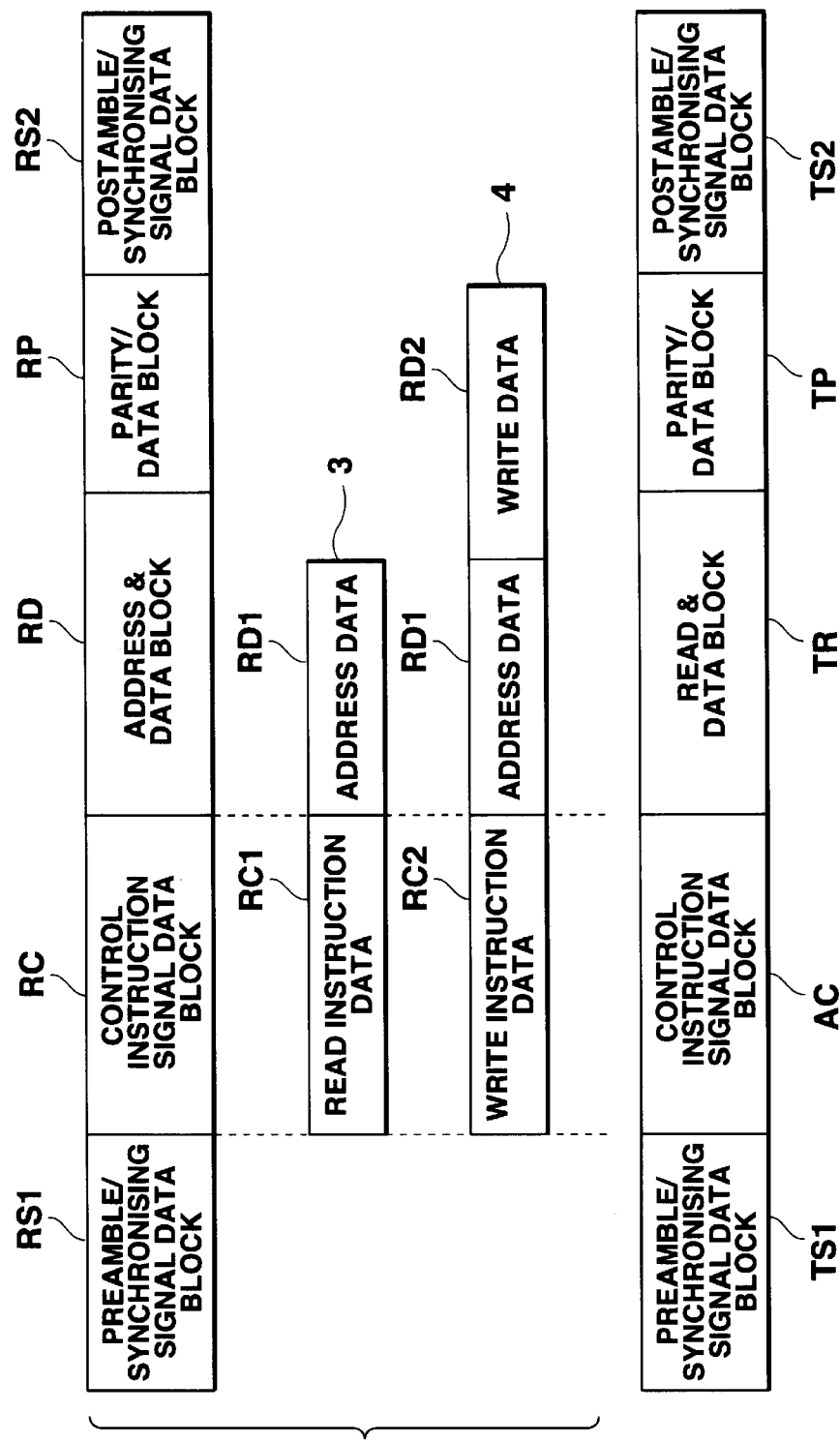
FIGS. 42A and 42B are views of format configuration of transmitting/receiving signals.

A receiving signal (FIG. 41C) (reader/writer→data carrier), as shown in FIG. 42A, is composed of a preamble/synchronizing signal block RS1, a control instruction signal block RC, an address & data block RD, a parity data block RP, and a post-amble/synchronizing signal block RS2 or the like. The control instruction signal block RC and address & data block RD are composed of read instruction data RC1, address data RD1, write instruction data RC2, address data RD2, and write data.

A transmitting signal (FIG. 41B), as shown in FIG. 42B, is composed of a preamble/synchronizing signal block TS1, a control instruction signal block AC, a read data block TR, a parity data block TP, and a post-amble/synchronizing signal block TS2.

When a carrier is transmitted from the reader/writer 1310 side, the power ON set signal and initial output (such as ID) are transmitted from the data carrier IC 1306 side receiving the carrier, and then a receiving wait state is entered. At the reader/writer 1310 side, a receiving mode request and instruction are transmitted before a receiving wait enable time T is elapsed. The data carrier 1306 side transmits a response after receive processing has been done, and a receiving wait state starts. Therefore, this response is received at the reader/writer 1310 side, and the control device/control system 1311 controls the gate device 1312, whereby the gate device 1312 opens. Therefore, a person who is allowed in advance to pass the gate device 1312 wears the wristwatch 1301, thereby enabling check-in.

In the wristwatch 1301, the wrist band member 1304 is provided with the data carrier module having the carrier side antenna coil 1307. Thus, even if the watch main body 1302 is made of a conductive material such as metallic material, there is no problem in communication with the reader/writer 1310, and ornamental properties or design of the watch main body 1302 can be diversified. The wrist band member 1304 on which the data carrier module 1305 is mounted is engaged to an arbitrary watch main body 1302, whereby making it possible to add an electronic pass function to the wristwatch 1 any time. Replacement with a wrist band member 1304 on which the other data carrier module 1305 is mounted makes it possible to modify functions of the ID Tag in the wristwatch 1301.

Fourteenth Embodiment

FIGS. 43A, 43B, and 43C show the fourteenth embodiment of the present invention. That is, the watch main body 1302 and wrist band member 1303 being an example of the wristwatch 1301 shown in FIG. 43A are arranged in a manner similar to that in the aforementioned embodiment shown in FIGS. 38A and 38B. An intervening member 1340 is engaged to the other band attachment 1391 of the watch main body 1302. The intervening member 1340 is made of resin, and incorporates the data carrier module 1305 composed of the data carrier IC 1306 and the data carrier antenna coil 1307 therein, as shown in FIG. 43C. The attachment 1341 is formed at one end of the intervening member 1340, and the band attachment 1342 is formed at the other end thereof. The intervening member 1340 is engaged to the band attachment 1391 of the watch main body 1302 by means of the spring rod inserted through the attachment 1341, and a resin-based wrist band member 1304 is engaged to the band attachment 1342 by means of the spring rod 1313.

Although the watch main body 1402 being an example other than the wristwatch 1401 shown in FIG. 43B is formed in rectangular shape, it is functionally similar to the aforementioned embodiment shown in FIGS. 38A and 38B. One wrist band 1401 is metallic. The intervening member 1340 is the same as that shown in FIG. 43A, and a metallic wrist band member 1404 is engaged to the band attachment 1342 at the other end by means of the spring rod 1313.

That is, in the present embodiment, the data carrier module 1305 is incorporated in the resin-based intervening member 1340. AS shown in FIG. 43B, even if the Wrist band members 1303 and 1304 are metallic, there is no problem in communication with the reader/writer 1310, making it possible to diversify ornamental properties or design of the Wrist band members 1303 and 1304 as well as watch main body 1302. As shown in FIG. 43A, resin-based Wrist band members 1303 and 1304 can be attached according to the user's preference, and the intervening member 1340 is intervened at the existing wristwatches 1301 and 1401, making it possible to add a function for contacting with the reader/writer 1310. Further, in the case where these watches are not required, the intervening member 1340 is removed, and the wrist bands 1304 and 1404 are attached directly to the watch main bodies 1302 and 1402, thereby making it possible to restore an ordinal wristwatch.

Fifteenth Embodiment

FIGS. 44A and 44B show the fifteenth embodiment of the present invention. A wristwatch 1501 shown in FIG. 44A is structured in the same manner as that shown in the FIG. 43B as described previously. The attachments 1405 and 1406 of the wrist band members 1403 and 1404 are engaged with the band attachments 1391 each of the watch main body 1402 by means of the spring rod 1313. In one wrist band member 1404, a module unit 1550 is movable in the longitudinal direction of the wrist band member 1404, and is removably attached thereto. In the module unit 1550, a pair of resin-based guides 1551, 1551 protruded in the vertical direction of the back face is integrally formed at both ends, stoppers 1552, 1552 protruding in mutually opposite direction are formed at the tip end of the guides 1551, 1551, and the wrist band member 1404 is sandwiched between the stoppers 1552, 1552 and the back face of the module unit 1550. A space 1553 is formed inside of the module unit 1550, and the data carrier module 1305 composed of the data carrier IC 1306 and the data carrier antenna coil 1307 as in the embodiment are incorporated in the space 1553. Therefore, according to the present embodiment, the module unit 1550 is movable in the longitudinal direction of the wrist band member 1404, and communication with the reader/writer 1310 can be reliably established by moving the module unit 1550 at a position at which data communication is proper.

Sixteenth Embodiment

Figure 45:
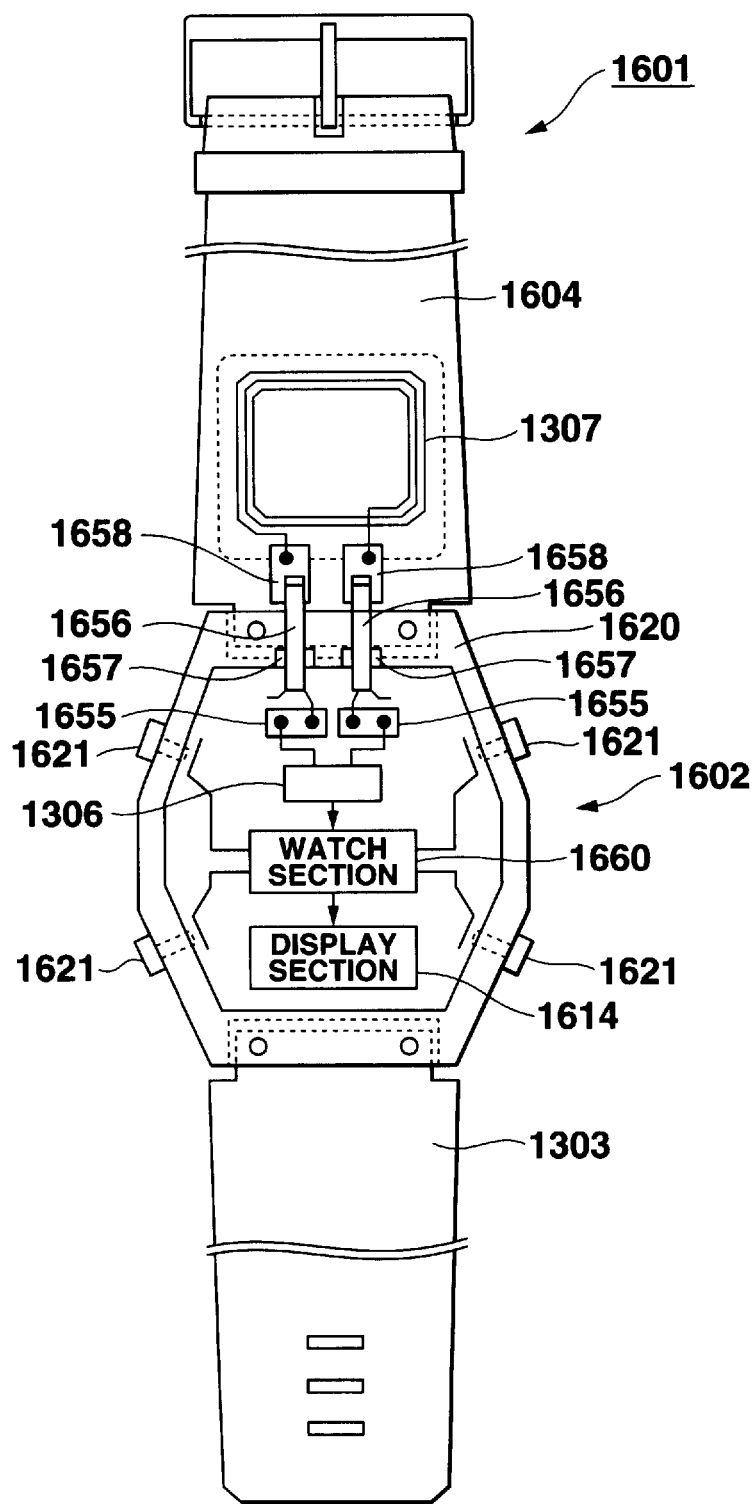
FIG. 45 is a conceptual view of a wristwatch according to a sixteenth embodiment of the present invention.

FIG. 45 shows a wristwatch 1601 according to the sixteenth embodiment of the present invention. That is, a key input section 1621 is arranged at the outer periphery of a watch main body 1602. A watch section 1660 and a display section 1614 are arranged inside of the watch main body 1602, and further, a data carrier IC 1306 is arranged. The data carrier IC 1306 is connected to a pair of connection terminals 1656, 1656 externally protruded in parallel from a band attachment 1620 via a pair of fixing terminals 1655, 1655. The connection terminals 1656, 1656 are insulated from the watch main body 1602 by means of insulation members 1657, 1657 arranged around there. The data carrier antenna coil 1307 is incorporated in a resin-based wrist band member 1604 connected to the band attachment 1620 of the watch main body 1602, and both ends of the data carrier antenna coil 1307 are connected to fixing terminals 1656, 1656 incorporated in the wrist band member 1604. Tip ends of the connection terminals 1656, 1656 come into contact with the fixing terminals 1658, 1658. Therefore, the data carrier antenna coil 1307 is incorporated in the resin-based wrist band member 1604 at the outside of the watch main body 1602, and thus, there is no problem in communication with the reader/writer 1301 even if the main body 1602 of the watch 1601 is metallic.

Figure 46:
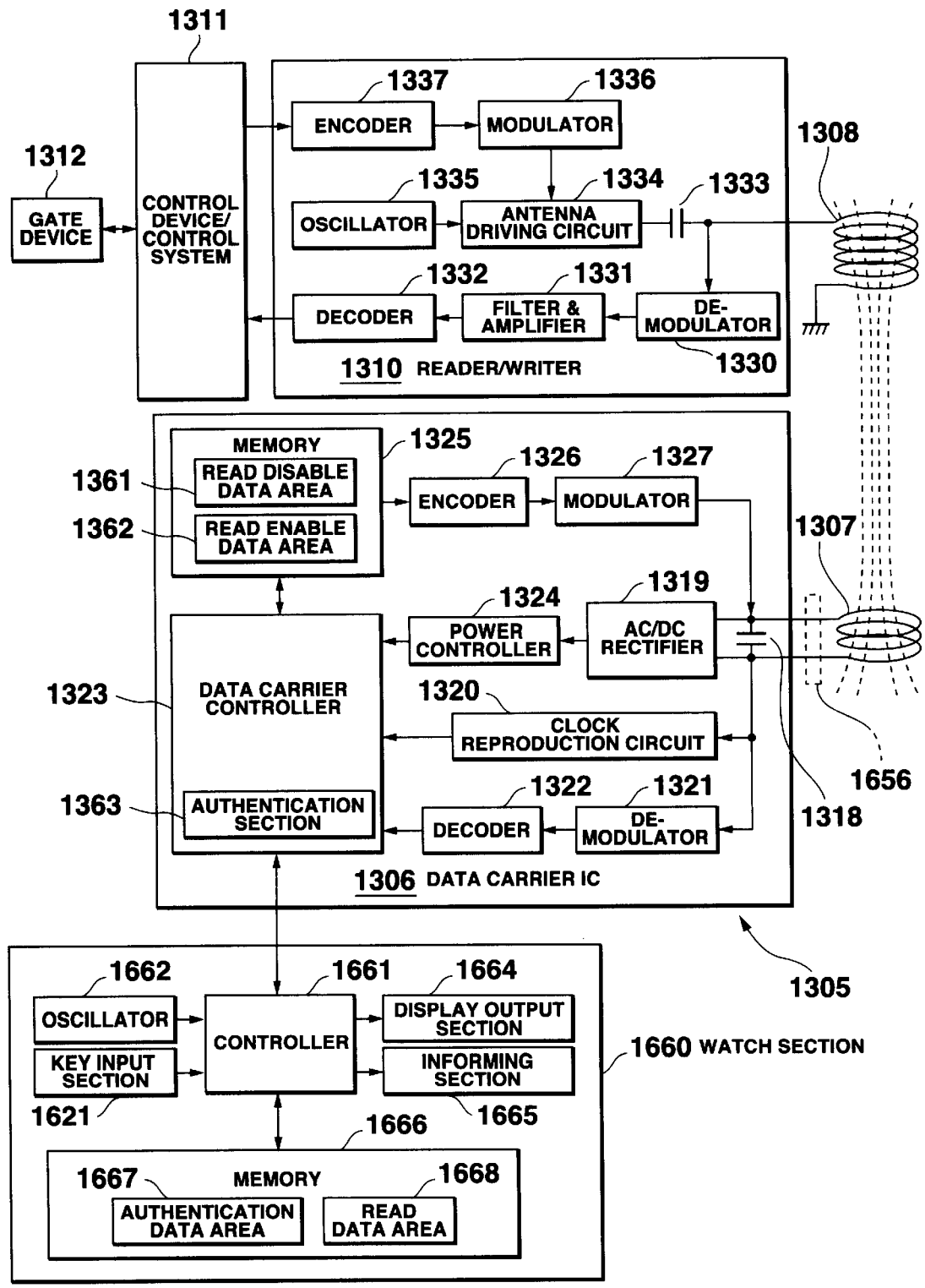
FIG. 46 is a block configuration diagram showing the entire system according to the sixteenth embodiment.

FIG. 46 is a block diagram showing a configuration of the data carrier module 1305, reader/writer 1310, and watch section 1660. In the figure, a configuration of the reader/writer 1310 and data carrier module 1305 is similar to the embodiment shown in FIG. 39. The memory 1325 of the data carrier IC 1306 includes a read disable data area 1361 and a read enable data area 1362, and the data carrier controller 1323 has an authentication section 1363. The watch section 1660 has a controller 1661, and an oscillator 1661 which generates a clock signal having a predetermined frequency, a key input section 1621, a display output section 1664 which outputs display data at a display section 1614, an informing section 1665 composed of speaker or the like, and a memory 1666 are connected to the controller 1661. An authentication data area 1667 and a read data area 1668 are in the memory 1666.

That is, in the sixteenth embodiment, the data carrier IC 1306 requiring high security is arranged inside of the watch main body 1602, thereby to ensure security by being employed for electronic currency or electronic settlement. The data carrier controller 1323 is connected to the controller 1661, thereby making it possible to read only utilization state of a system stored in the data carrier IC 1306 such as remainder, remaining count, or utilization history from the watch section 1660 side without lowering security. On the data carrier IC 1306 side, the input section 1621 or memory 1666 of the watch section 1660 or a power source is usably arranged. Thus, the read enable data area 1362 for enabling reading from the watch section 1660 side is provided, whereas the read disable data area 1361 for disabling reading is provided to ensure security.

An authentication section 1363 is provided at the data carrier controller 1323 that is a connection section between the watch section 1660 and the data carrier IC 1306, and only a case in which OK is authenticated at the authentication section 1363 can be accessed, thereby ensure security. Therefore, the authentication section 1363 incorporates a correlation circuit or an encoding/decoding circuit or the like such as device identification number, manufacturing serial number, user password for valid user authentication.

User authentication data 1667 required for authentication at the authentication section 1363 is stored in the memory 1666 of the watch section 1660, the user read data read from the data carrier IC 1306 side after authentication is stored, and the user read data is output and displayed at the display section 1614 via the display section 1664. Therefore, without changing a security function in the data carrier IC 1306 or connecting another external device, the data in the data carrier IC 1306 can be authenticated while security is ensured.

Without directly specifying areas 1361 and 1362 of the memory 1325 of the data carrier IC 1306 from the watch section 1660, only commands for information requests (remainder, remaining count, effective count, utilization history, correlation of owner's information or the like) may be transmitted to the data carrier IC 1306 together with authentication, and the data carrier IC 1306 may read and output information of the read enable data area 1362 only in the case of successful authentication in response to the command.

Seventeenth Embodiment

Figure 47:
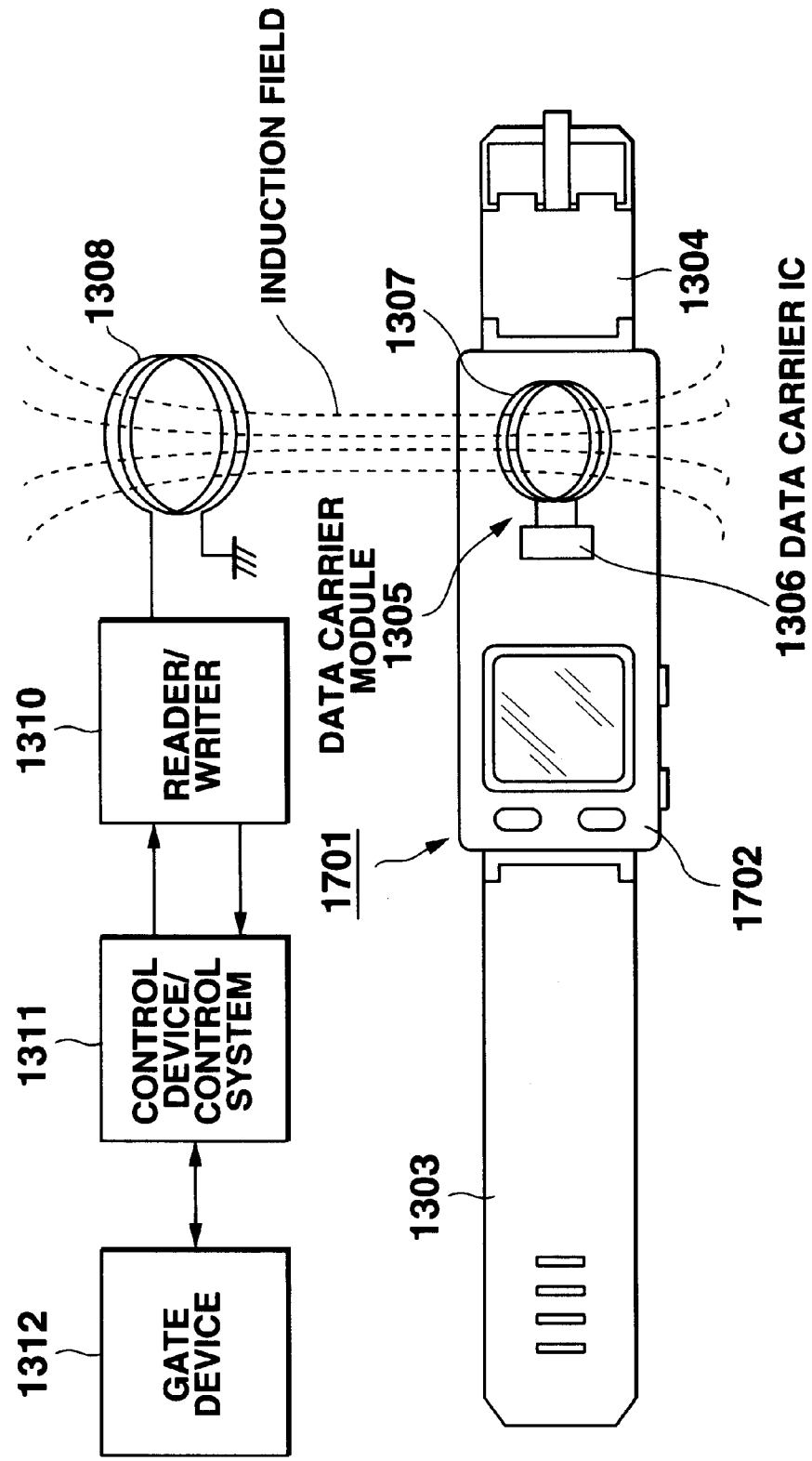
FIG. 47 is a view of system configuration showing a seventeenth embodiment of the present invention.
Figure 48:
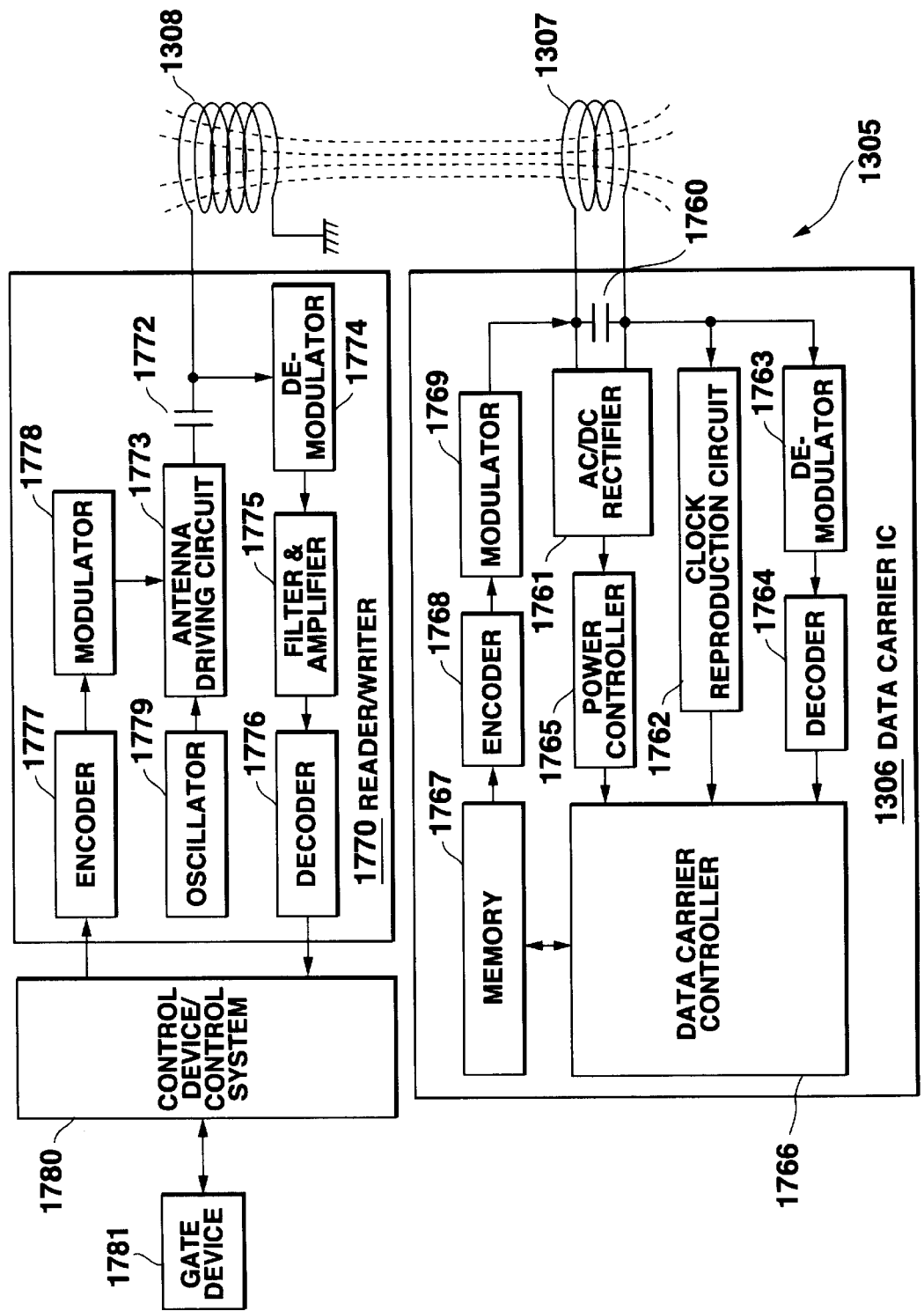
FIG. 48 is a block configuration diagram showing the entire system according to the seventeenth embodiment.

FIGS. 47 and 48 show the seventeenth embodiment of the present invention. As shown in FIG. 47, in the present embodiment, the data carrier module 1305 composed of the data carrier IC 1306 and the data carrier antenna coil 1307 connected to the data carrier IC 1306 is arranged in a watch main body 1702 of a wristwatch 1701, and the other configurations are similar to the embodiment shown in FIG. 37.

A system configuration according to the present embodiment, as shown in FIG. 48, is composed of the wristwatch 1701 and the non-contact data carrier reader/writer 1770, and the reader/writer 1770 is connected to a gate device 1781 via a control device/control system 1780.

As illustrated, the data carrier module 1305 of the wristwatch 1701 includes a capacitor 1760 connected at both ends of a data carrier antenna coil 1307, and includes an AC/DC (rectifier) 1761, a clock reproduction circuit 1762, a demodulator 1763, and a decoder 1764. A current rectified by the AC/DC (rectifier) 1761 is supplied to a data carrier controller 1766 via a power controller 1765, and further, a clock reproduced by a clock reproduction circuit 1762 and data decoded by a decoder 1764 are input to the data carrier controller 1766. The data carrier controller 1766 supplies the data stored in a memory 1767 to an encoder 1768 based on the data or the like input from each section. The data encoded by the encoder 1768 is modulated by a modulator 1769 so as to be transmitted to the data carrier antenna coil 1307.

The reader/writer 1770 includes an antenna driving circuit 1773 and a demodulator 1774 that are connected to one end of the reader/writer antenna coil 1308 via a capacitor 1772. A signal demodulated by the demodulator 1774 is filtered and amplified by means of a filter & amplifier 1775, is decoded to data by means of a decoder 1776, and is supplied to a control device/control system 1780. A control signal from the control device/control system 1780 is encoded by means of an encoder 1777, is modulated by means of a modulator 1778, and is supplied to an antenna driving circuit 1773. The antenna driving circuit 1773 is configured so as to drive the reader/writer antenna coil 1308 based on a watch of a predetermined frequency output from an oscillator 1779 and a signal modulated by means of the modulator 1778.

Therefore, as in the present embodiment, even if the data carrier module 1305 is arranged in the watch main body 1702 of the wristwatch 1701, as in the aforementioned embodiment shown in FIG. 39, a person who is allowed in advance to pass a gate device 1781 wears the wristwatch 1701 in the wrist, thereby enabling check-in.

In this case, a mounting structure of the data carrier antenna coil 1307 is desirable to be that described in the first to twelfth embodiments.

Eighteenth Embodiment

Figure 49:
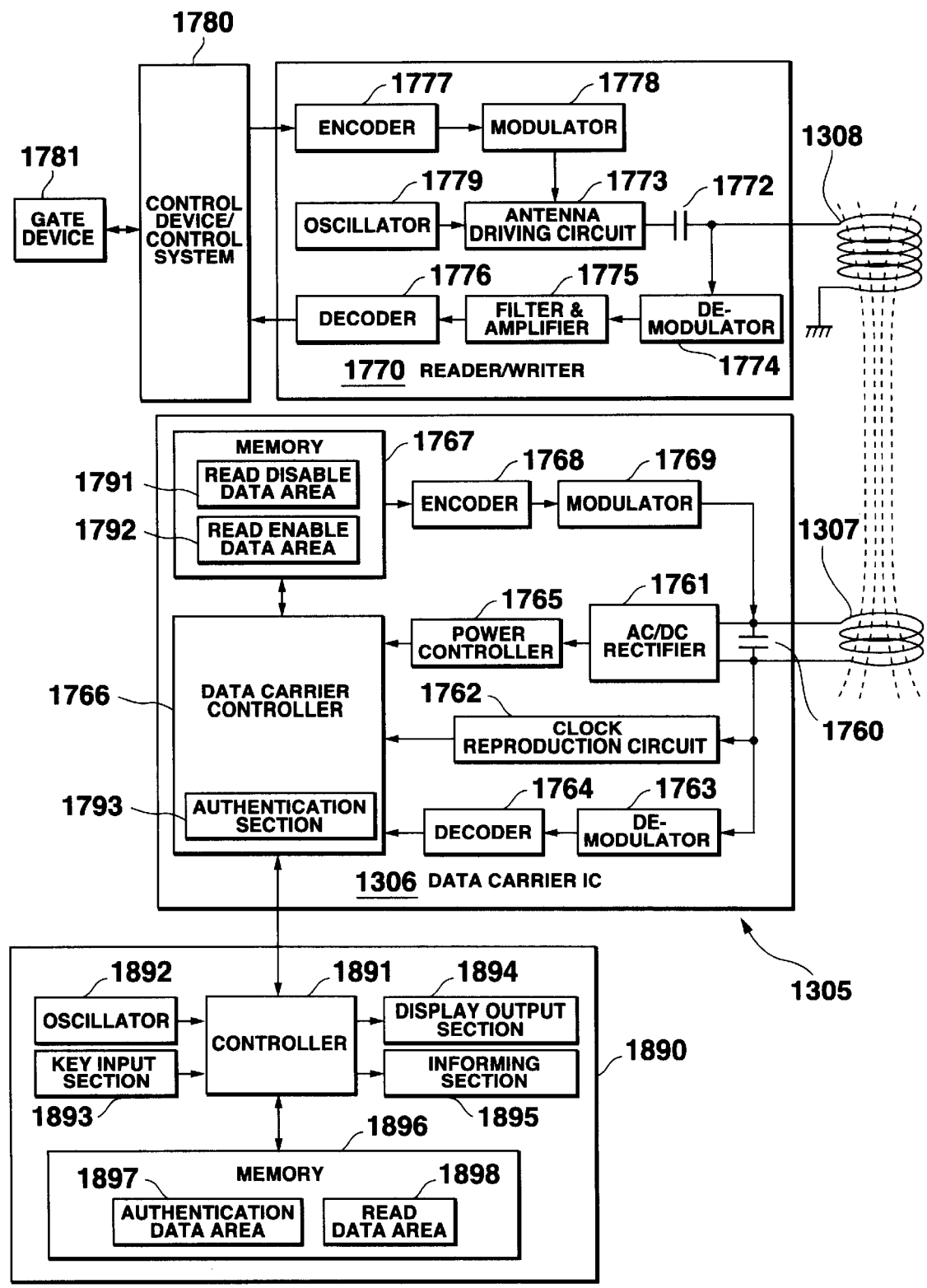
FIG. 49 is a block configuration diagram showing the entire system according to an eighteenth embodiment of the present invention.

FIG. 49 is a block diagram showing a configuration of the data carrier module 1305, reader/writer 1770, and watch section 1890 in the eighteenth embodiment of the present invention.

In the figure, the configuration of the reader/writer 1770 and data carrier module 1305 is similar to the embodiment shown in FIG. 48. The memory 1767 of the data carrier IC 1306 includes the read disable data area 1791 and the read enable data area 1792, and the data carrier controller 1766 includes the authentication section 1793.

A watch section 1890 is composed of the aforementioned watch LSI substrate 421 shown in FIG. 15, another device mounted thereon, the LCD panel 423, and the foregoing keys (key members) 410 shown in FIG. 16. The watch section 1890 includes a controller 1891, and an oscillator 1892 which generates a clock signal of a predetermined frequency, an input section 1893 composed of keys (key members) 410 or the like, a display output section 1894 for outputting display data to the LCD panel 423, an informing section 1895 composed of speakers or the like, and a memory 1896 are connected to the controller 1891. Authentication data area 1897 and read data area 1898 are stored in the memory 1896.

That is, in the twelfth embodiment, the data carrier IC 1306 requiring high security as employed for electronic currency or electronic settlement and the like is arranged inside of the watch main body, thereby ensuring security.

The data carrier module 1305 is connected to the controller 1891, thereby making it possible to read only a part of the utilization state of the RF-ID system in the data carrier IC 1306 such as remainder, remaining count, utilization history from the watch section 1890 side without losing security. On the data carrier IC 1306 side, the input section 1893 or memory 1896 of the watch section 1890 or a power source is usably arranged. Therefore, the memory 1767 of the data carrier IC 1306 is provided with the read enable data area 1792 for enabling reading from the watch section 1890 side and the user read disable area for disabling reading, thereby ensuring security.

The authentication section 1793 is provided at the data carrier control unit 1766 that is a connection section between the watch section 1890 and the data carrier IC 1306, and only a case in which OK is authenticated at the authentication section 1793 can be accessed, thereby ensuring security. Therefore, the user authentication section incorporates a collation circuit or encoding/decoding circuit and the like such as device identification number, manufacture serial number, or user password for valid user authentication. Authentication data area 1897 required for authentication at the authentication section 1793 is stored in the memory 1896 of the watch section 1890, user read data read from the data carrier IC 1306 side after authentication is stored, and the user read data is output and displayed on the LCD panel 423 via the display output section 1894. Therefore, without changing a security function in the data carrier IC 1306 or connecting another external device, the data in the data carrier IC 1306 can be visualized at the watch section 1890 while ensuring security.

Without directly specifying areas 1791 and 1792 for the memory 1767 of the data carrier IC 1306 from the watch section 1890, only commands for information request (remainder, remaining count, effective count, utilization history, correlation of owner's information or the like) may be transmitted to the data carrier IC 1306 together with authentication, and the data carrier IC 1306 reads and outputs information of the read enable data area 1792 only in the case of successful authentication in response to the command.

Nineteenth Embodiment

FIGS. 50A and 50B show the nineteenth embodiment of the present invention. That is, as in the embodiment shown in FIG. 43B, a watch main body 1902 of a wristwatch 1901 and wrists bands 1303 and 1304 are metallic, a resin-based intervening member 1940 is engaged with another band attachment 1941 of the watch main body 1902. A plurality of key members 1921 are arranged at the outer periphery of the watch main body 1902. A watch section 1660 and a display section 1614 are arranged inside of the watch main body 1902, and further, the data carrier IC 1306 is arranged. The data carrier IC 1306 is connected to a pair of connection terminals 1656, 1656 externally protruded in parallel from the band attachment 1941 via a pair of fixing members 1655, 1655. The connection terminals 1656, 1656 are insulated from the watch main body 1902 by means of insulation members 1657, 1657 arranged around there. A data carrier antenna coil 1307 is incorporated in an intervening member 1940, and both ends of the data carrier antenna coil 1307 are connected to fixing terminals 1658, 1658 arranged in the intervening member 1940. The tip ends of the connection terminals 1656, 1656 come into contact with the fixing terminals 1658, 1658. Therefore, the data carrier antenna coil 1307 is incorporated in the intervening member 1940 at the outside of the watch main body. Even if the watch main body 1902 and wrist and 1304 are metallic, there is no problem in communication with the reader/writer 1310.

Twentieth Embodiment

Figure 51A:
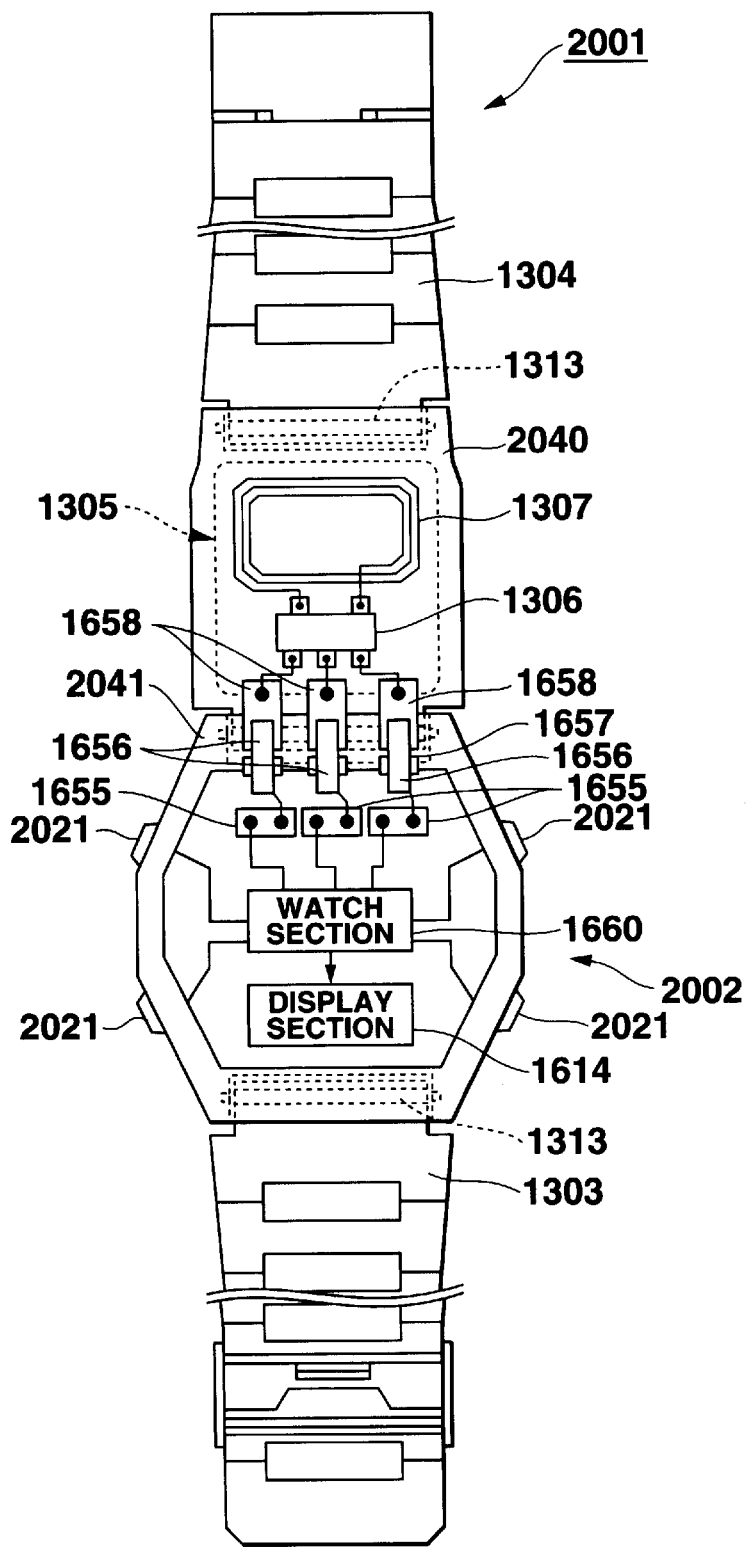
FIG. 51A is a conceptual view of a wristwatch according to a twentieth embodiment of the present invention.
Figure 51B:
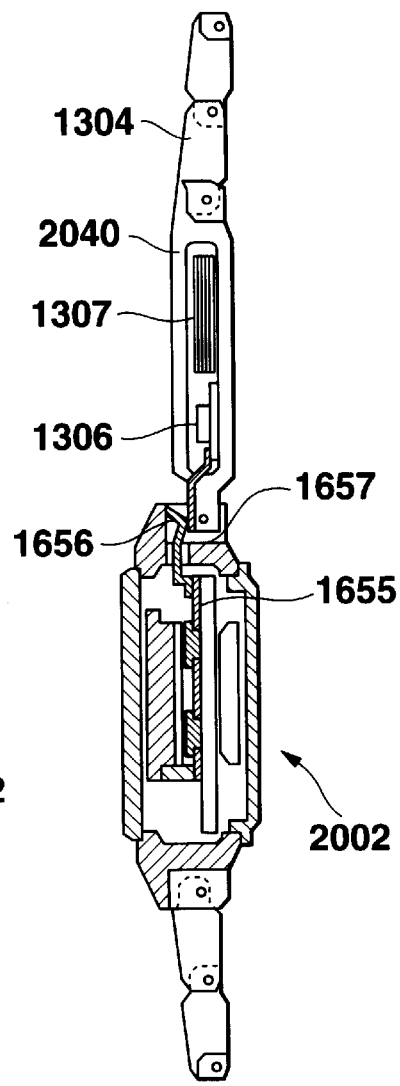
FIG. 51B is a cross section view of a wristwatch according to the twentieth embodiment of the present invention.
Figure 52:
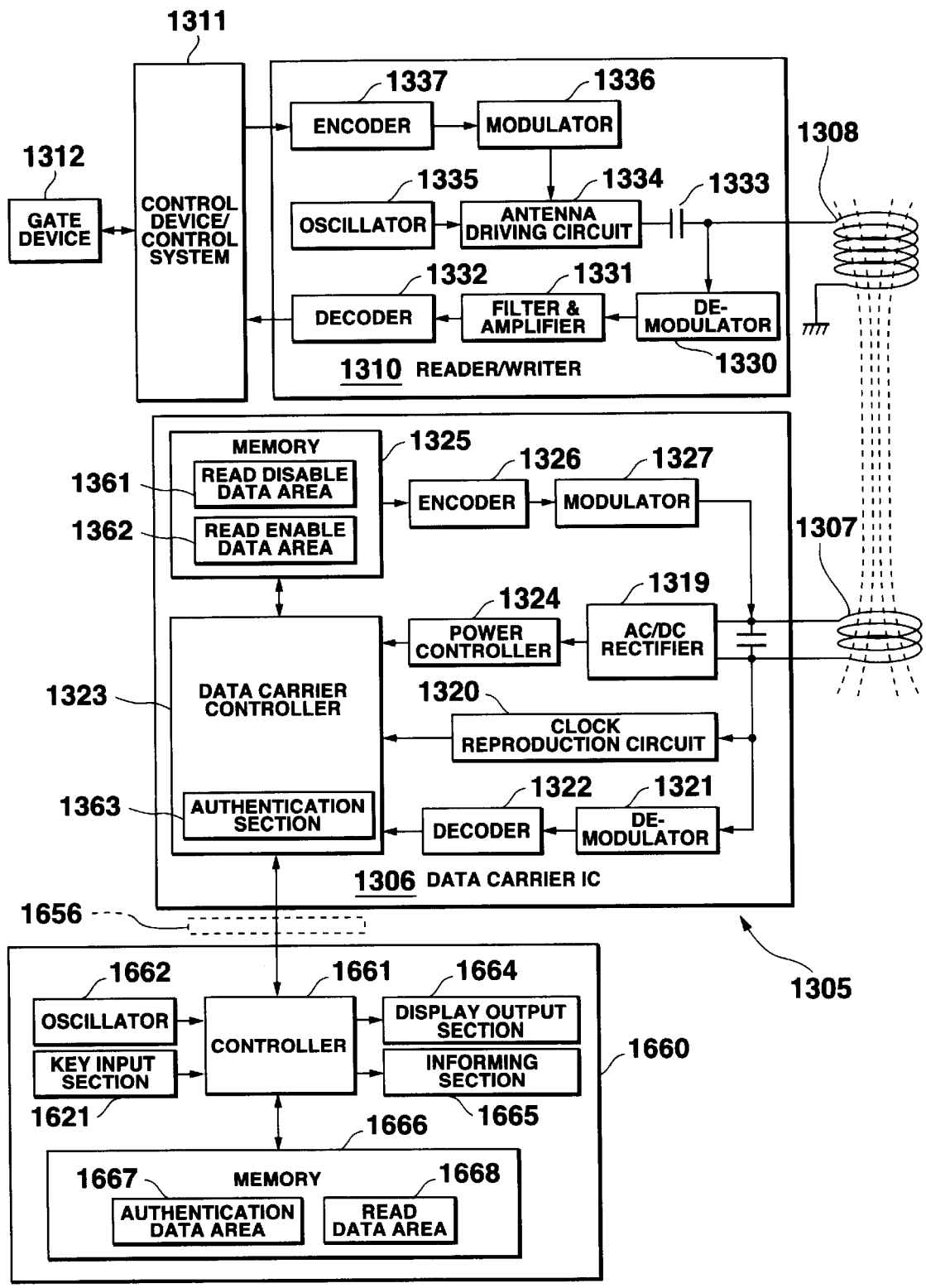
FIG. 52 is a block configuration diagram showing the entire system according to the twentieth embodiment.

FIGS. 51A, 51B and 52 show the twentieth embodiment of the present invention. That is, as illustrated, a watch main body 2002 of a wristwatch 2001 and Wrist band members 1303 and 1304 are metallic. As in the embodiment shown in FIG. 43B, a resin-based intervening member 2040 is engaged with another band attachment 2041 of the watch main body 2002. A plurality of key members 2021 are arranged at the outer periphery of the watch main body 2002. The watch section 1660 and display 1614 are arranged inside of the watch main body 2002, and the watch section 1660 is connected to three connection terminals 1656 externally protruded in parallel from the band attachment 2014 via three fixing terminals 1655. Each of the connection terminals 1656 is insulated from the watch main body 2002 by means of the insulation member 1657 arranged around there. The data carrier module 1305 composed of the data carrier IC 1306 and the data carrier antenna coil 1307 is incorporated in the intervening member 2040, and the data carrier module 1305 is connected to three fixing terminals 1658 arranged in the intervening member 2040. The tip end of each contact terminal 1656 comes into contact with each fixing terminal 1658. Therefore, the data carrier antenna coil 1307 is incorporated in the intervening member 2040 outside of the watch main body 2002. Thus, even if the watch main body 2002 and wrist band member 1304 are metallic, there is no problem in communication with the reader/writer 1310. The watch input/output section or power source and the like can be used with the data carrier module 1305 via the watch section 1660, and the intervening member 2040 having the data carrier module 1305 incorporated therein and the watch main body 2002 can be exchanged individually each other.

FIG. 52 is a block diagram showing a configuration of the data carrier module 1305, reader/writer 1310, and watch section 1660 in the present embodiment. As illustrated, the configuration of the reader/writer 1310, data carrier module 1305, and watch section 1610 is similar to the embodiment shown in FIG. 49. The authentication section 1363 of the data carrier module 1305 is connected to the controller 1661 of the watch section 1660 via the connection terminal 1656.

Twenty-first Embodiment

FIG. 53 shows a system configuration according to the twenty-first embodiment of the present invention. In the figure, a wristwatch 2101 constituting this system is composed of a watch main body 2102, and resin-based wrist band members 2103 and 2104 engaged with both ends of the watch main body 2102. The data carrier antenna coil 1307 is arranged at one wrist band member 2104. The watch main body 2102 is provided with the data carrier IC 1306 connected to the data carrier antenna coil 1307, a controller 2105 connected to the data carrier IC 1306, and a display section 2106 and a body mount sensor (or physiological information sensor) 2107, each of which is connected to a controller 2105. The body mount sensor (or physiological information sensor) 2107 is a temperature sensor that detects a body temperature or a pulse sensor that detects pulses, and is configured so that the controller 2105 detects the mounting of the wristwatch by means of a signal from the body mount sensor (or physiological information sensor) 2107.

A system configuration from the reader/writer antenna coil 1308 to the gate device 1312 is similar to the embodiment shown in FIG. 37.

In the present embodiment, an output signal (FIG. 54A) from the body mount sensor (or physiological information sensor) 502 is at a low level when the wristwatch 2101 is not attached to the user's body (arm), and is at a high level when it is attached to the body. The controller 2105 generates a clock signal (FIG. 54B) of a predetermined period. Then, the data carrier IC 1306 is set to ON at an interval from the clock signal (FIG. 54B) when the output signal (FIG. 54A) from the body mount sensor (or physiological information sensor) 2107 is changed to a high level to the clock signal (FIG. 54B) when the signal is changed to a low level, and generates a data carrier control strobe signal (FIG. 54C). In this duration, the data carrier IC 1306 receives a periodic transmitting signal (FIG. 54D) from the reader/writer 1301 side, and executes a response/transmission and reception process (FIG. 54E) on the data carrier IC side corresponding to the transmitting signal (FIG. 54D).

Namely, in the present embodiment, while the mounting of the wristwatch 2101 to the body is detected, it is periodically waited and received. Only when electromagnetic waves from the reader/writer 1310 or a signal in the electromagnetic field is received, the watch is normally activated as ID Tag for response. When it is detected that the wrist is not worn, even if a signal from the reader/writer 1310 is received, the data carrier IC is controlled so as not to operate. Therefore, when the wristwatch 2101 is not attached to the body or when it is lost, the watch does not operate, thereby making it possible to ensure security and prevent power consumption.

Twenty-second Embodiment

FIG. 55 shows a system configuration according to the twenty-second embodiment of the present invention. In the system configuration according to the present embodiment, a tilt sensor 2207 is provided instead of a body mount sensor (or physiological sensor) 2107 in the embodiment shown in FIG. 53. The tilt sensor 2207 is provided with a sensor combined with a permanent magnet enabling tilting or rotation and a reed switch (or magnetic sensor) or a conductive switch such as capsule or opposite electrode on an internal wall of a spherical small-sized mainframe, and is configured of a sensor in which a metal ball or electrically conductive liquid is sealed in the mainframe or the like. Therefore, the tilt sensor 2207 is configured so as to detect whether or not a position angle of a wrist wearing the wristwatch 2101 or a position of the wristwatch 2101 is tilted at a certain angle.

Figures 56A, 56B, 56C, 56D:
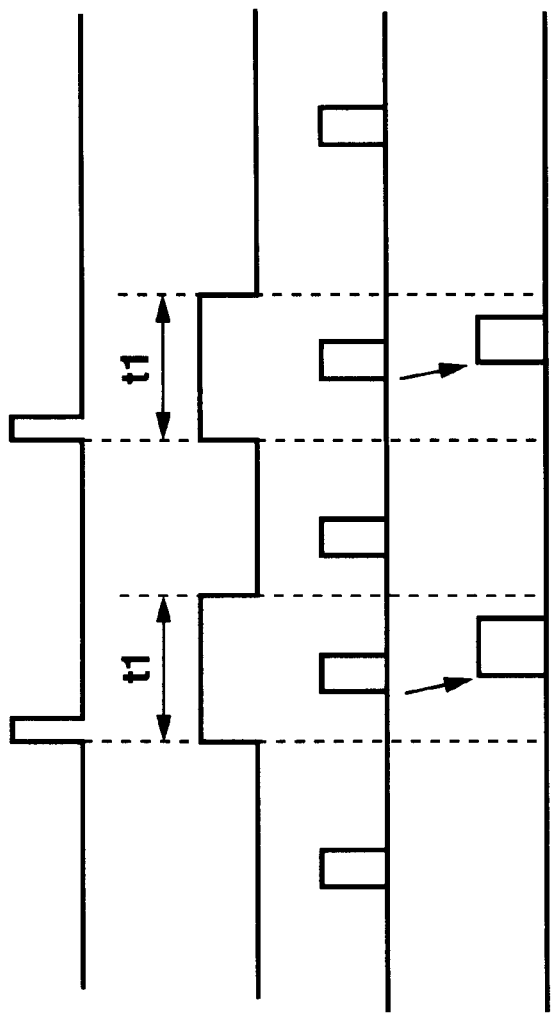
FIGS. 56A, 56B, 56C ad 56D are timing charts showing operation of the twenty-second embodiment.

In the present embodiment, when the tilt sensor 2207 detects a state in which the arm is tilted at a certain angle for a certain period of time, it outputs a tilt sensor detecting signal (FIG. 56A) at a predetermined timing. Then, the data carrier IC 1306 is set to ON at an interval of t1 every output timing of the tilt sensor detecting signal (FIG. 56A), and generates the data carrier control strobe signal (FIG. 56B). In this duration only, the data carrier IC 1306 receives a periodic transmitting signal (FIG. 56C) from the reader/writer 1310 side, and executes a response/transmission and reception process (FIG. 56D) on the data carrier IC side corresponding to the transmitting signal (FIG. 56C).

Namely, in the present embodiment, only when the wristwatch 2101 is attached to the user's body, and is tilted within the range of a certain angle, or only for a certain time after a certain tilt position has been set, the watch operates as ID Tag. Otherwise, the watch stops operation automatically or is controlled so as not to response even if it receives a signal from the reader/writer 1310. Therefore, the wristwatch 1 or the data carrier antenna coil 1307 operates to the reader/writer antenna coil 1308 only in the case of a certain behavior or tilt position only, and reliably makes communication operation. In the case of an unnatural behavior or position, it can be determined that the watch is not used, thereby making it possible to ensure security and prevent malfunction.

Twenty-third Embodiment

Figure 58:
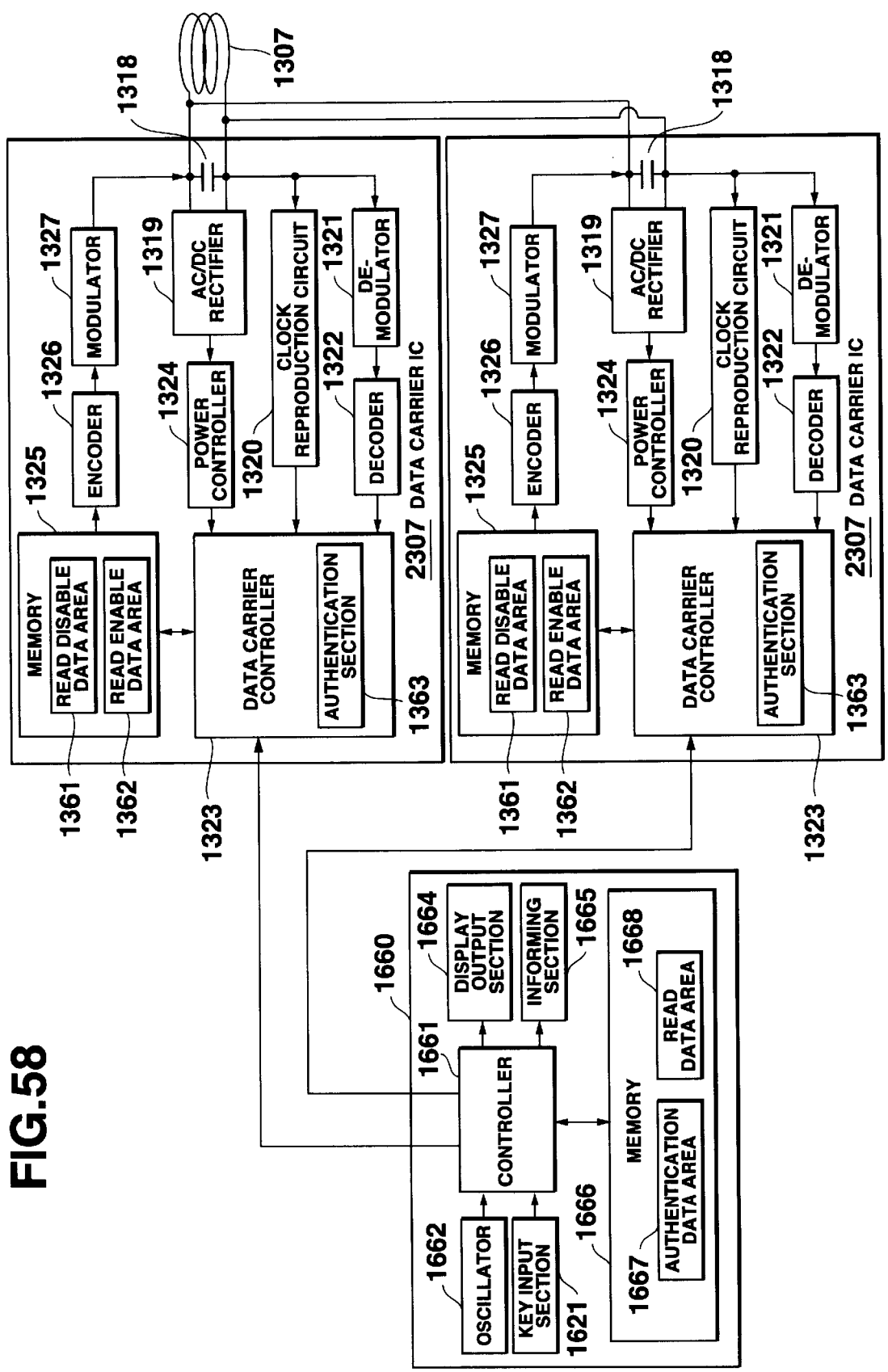
FIG. 58 is a block configuration diagram showing a circuit configuration of the wristwatch according to the twenty-third embodiment.

FIGS. 57 and 58 show the twenty-third embodiment of the present invention. As shown in FIG. 57, the present embodiment is composed of a wristwatch 2301, a first system 2311, and a second system 2322. The wristwatch 2301 is composed of a metallic watch main body 2302, and resin-based wrist band members 2303 and 2304 engaged with both ends of the watch main body 2302, and the data carrier antenna coil 1307 is arranged at one wrist band member 2304.

A sequentially connected display section 2305, watch section 2306, first data carrier IC 2307, and second data carrier IC 2308 are arranged in the watch main body 2302. Both of the first data carrier IC 2307 and the second data carrier IC 2308 are connected to the data carrier antenna coil 1307.

The first and second systems 2311 and 2322 are controlled in the same manner. As in the embodiment, these systems are composed of the reader/writer antenna coil 1308, reader/writer 1310, control device/control system 1311, and gate device 1312. However, the carrier frequencies of the first and second systems 2311 and 2322 are different from each other. For example, the carrier frequencies of the first and second systems 2311 and 2322 are set to 125 KHz and 13.56 MHz, respectively.

As shown in FIG. 58, the first and second data carrier ICs 2307 and 2308 have the same circuit configuration, and have the circuit configuration similar to the embodiment shown in FIG. 46. However, the carrier frequencies of the first and second data carrier ICs 2307 and 2308 are different from each other. For example, the carrier frequencies of the first and second data carrier ICs 2307 and 2308 are set to 125 KHz and 13.56 MHz, respectively. The watch section 2306 has a circuit configuration similar to the embodiment shown in FIG. 46 so that a control signal from the controller 1616 in the watch section 2306 is supplied to the data carrier controller 1323 in each of the data carrier ICs 2307 and 2308.

Therefore, the data carrier controller 1323 in each of the data carrier ICs 2307 and 2308 is controlled by means of a control signal from the controller 1616, whereby making it possible to perform transmission and reception between the first and second systems 2311 and 2322 having their different carrier frequencies. In this manner, a single wristwatch 2301 is only worn, thereby enabling transmission to and reception from a plurality of systems. Of course, many more data carrier ICs are incorporated, thereby making it possible to use the same wristwatch for various types of systems.

MODIFIED EXAMPLE 1

Figure 59:
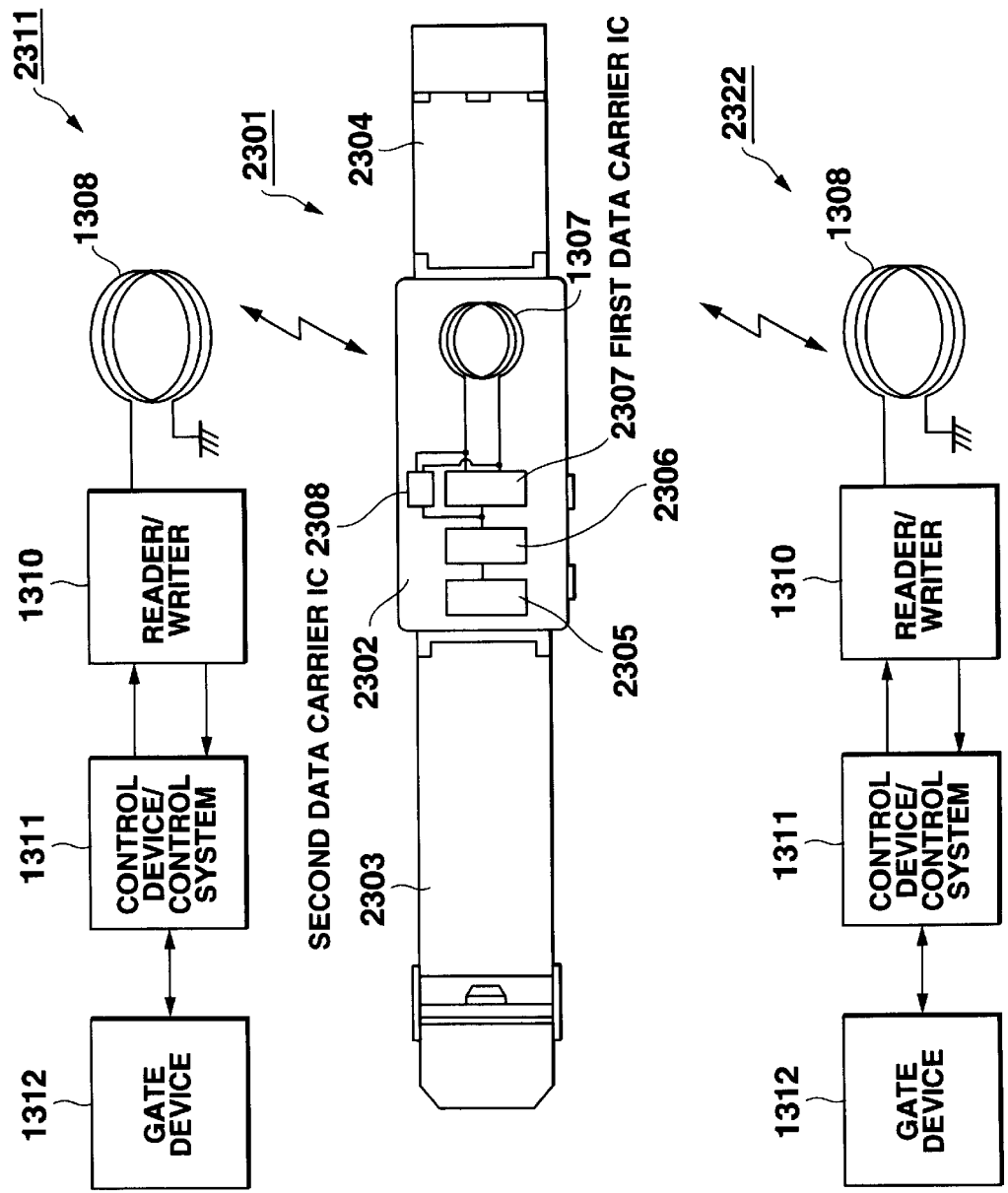
FIG. 59 is a view of system configuration showing a modified example of the twenty-third embodiment.

In the present embodiment, although the data carrier antenna coil 1307 is arranged at one wrist band member 2304, as shown in FIG. 59, the data carrier antenna coil 1307 may be arranged in the watch main body 2302.

In this case, the mount structure of the data carrier antenna coil 1307 to the watch main body is desirable to be that described in the first to twelfth embodiments.

MODIFIED EXAMPLE 2

Figure 60:
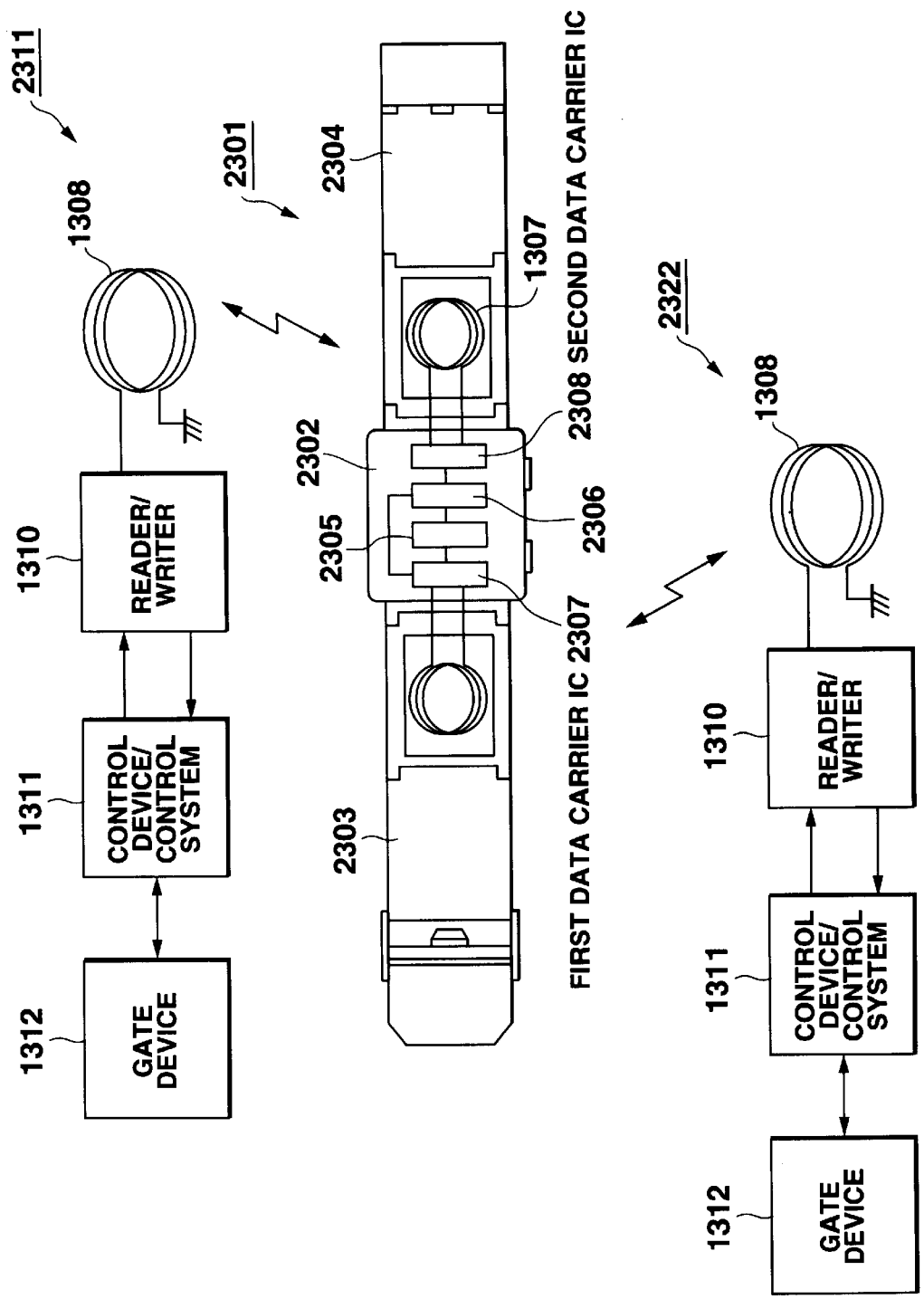
FIG. 60 is a view of system configuration showing a modified example of the twenty-third embodiment.

In the present embodiment, only a single data carrier antenna coil 1307 is provided so that the first and second data carrier ICs 2307 and 2308 share the data carrier antenna coil 1307. However, as shown in FIG. 60, the first and second data carrier ICs 2307 and 2308 may be provided with individual data carrier antenna coils 1307, 1307 connected to the first and second data carrier ICs 2307 and 2308, respectively. In this case, as illustrated, the data carrier antenna coils 1307, 1307 are preferably arranged individually at wrist bands 2304, 2304.

MODIFIED EXAMPLE 3

Figure 61:
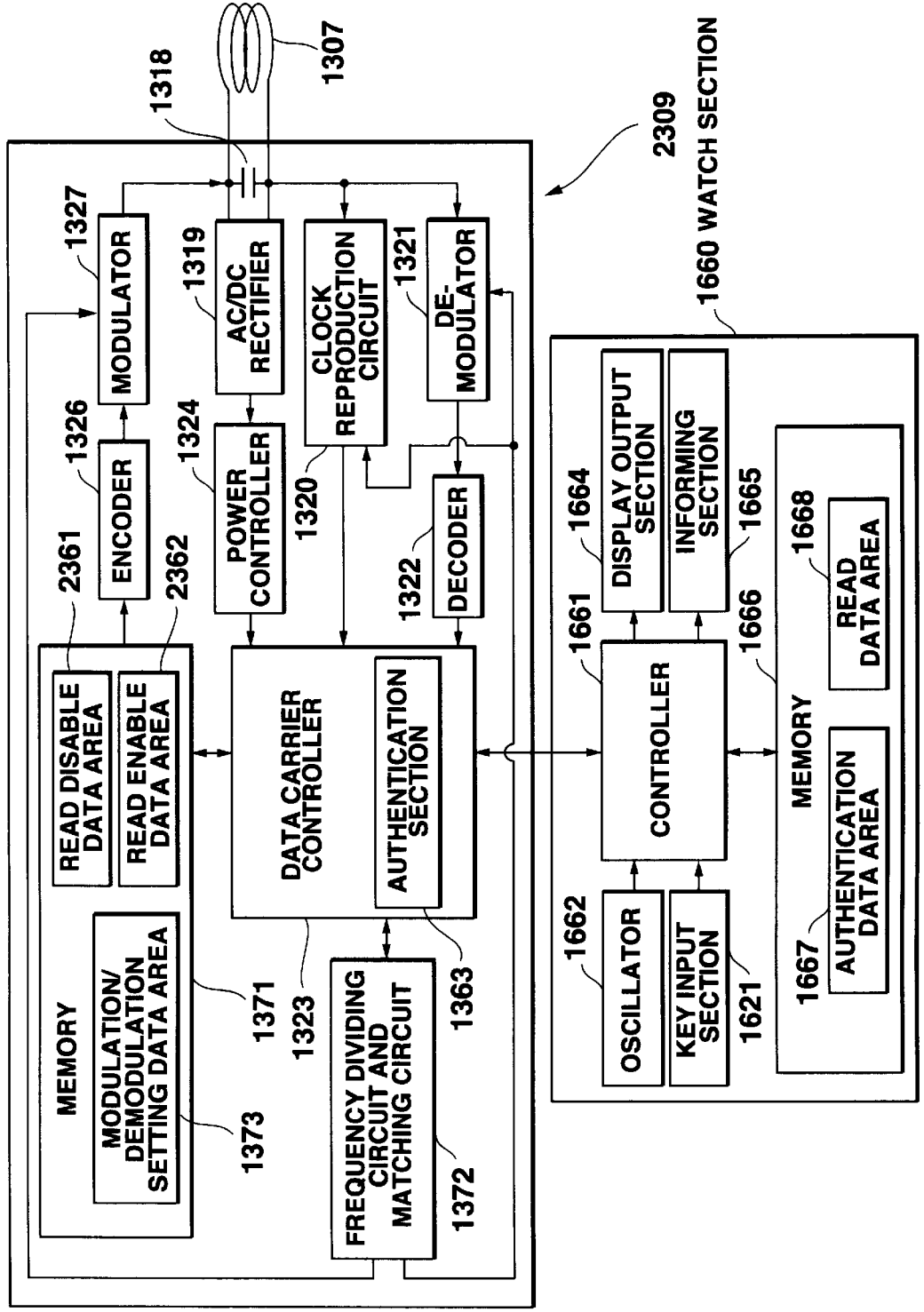
FIG. 61 is a block configuration diagram showing a circuit configuration of the wristwatch in the modified example of the twenty-third embodiment.

When only a single data carrier antenna coil 1307 is employed, a circuit configuration as shown in FIG. 61 can be formed. In this modified example, the watch section 1660 has a circuit configuration similar to the embodiment shown in FIG. 46. A data carrier IC 2309 is different from the embodiment shown in FIG. 46 in that the data carrier IC 2309 has a configuration of the memory 1371 and the frequency dividing circuit and matching circuit 1372. That is, the memory 1371 includes a read disable data area 2361 and a read enable data area 2362 that are similar to the embodiment shown in FIG. 46, and has a modulation/demodulation setting area 1373. The frequency dividing circuit and matching circuit 1372 generating a carrier wave of a frequency width corresponding to a different system, is connected to the data carrier controller 1323, and is connected to the modulator 1327, clock reproduction circuit 1320, and demodulator 1321.

In such configuration, when the user operates a key input section 1621 in advance, and inputs carrier frequencies of plural types of systems, the input plural carrier frequencies are stored in the modulation/demodulation setting area 1373 of the memory 1371. The data carrier controller 1323 reads a frequency stored in the modulation/demodulation setting area 1372, and supplies it to the frequency dividing circuit and matching circuit 1372. The frequency dividing circuit and matching circuit 1372 output a signal of the frequency to a modulator 1327, a clock reproduction circuit 1320, and a demodulator 1321. Therefore, a signal from a system of its carrier frequency stored in the modulation/demodulation setting area 1373 is demodulated by means of the demodulator 1321. Alternatively, the signal for the system is modulated by means of the modulator 1327, making it possible to perform transmission and reception. Namely, according to this modified example, communication with plural types of systems corresponding to plural types of frequencies stored in the modulation setting area 1373 is made possible.

In the twenty-third embodiment, although frequencies of one or two antenna coils are controlled so as to be applicable to a plurality of RF-ID systems, a system capable of making wireless data communication using a loop-shaped antenna coil is applicable to a local/wide-area paging system.

FIGS. 62 to 74 show twenty-fourth to twenty-ninth embodiments of the present invention, and show services such as various network systems, electronic commence and the like utilizing a wristwatch with a data carrier function. Hereinafter, each of the embodiments will be described in detail.

Twenty-fourth Embodiment

Figure 62:
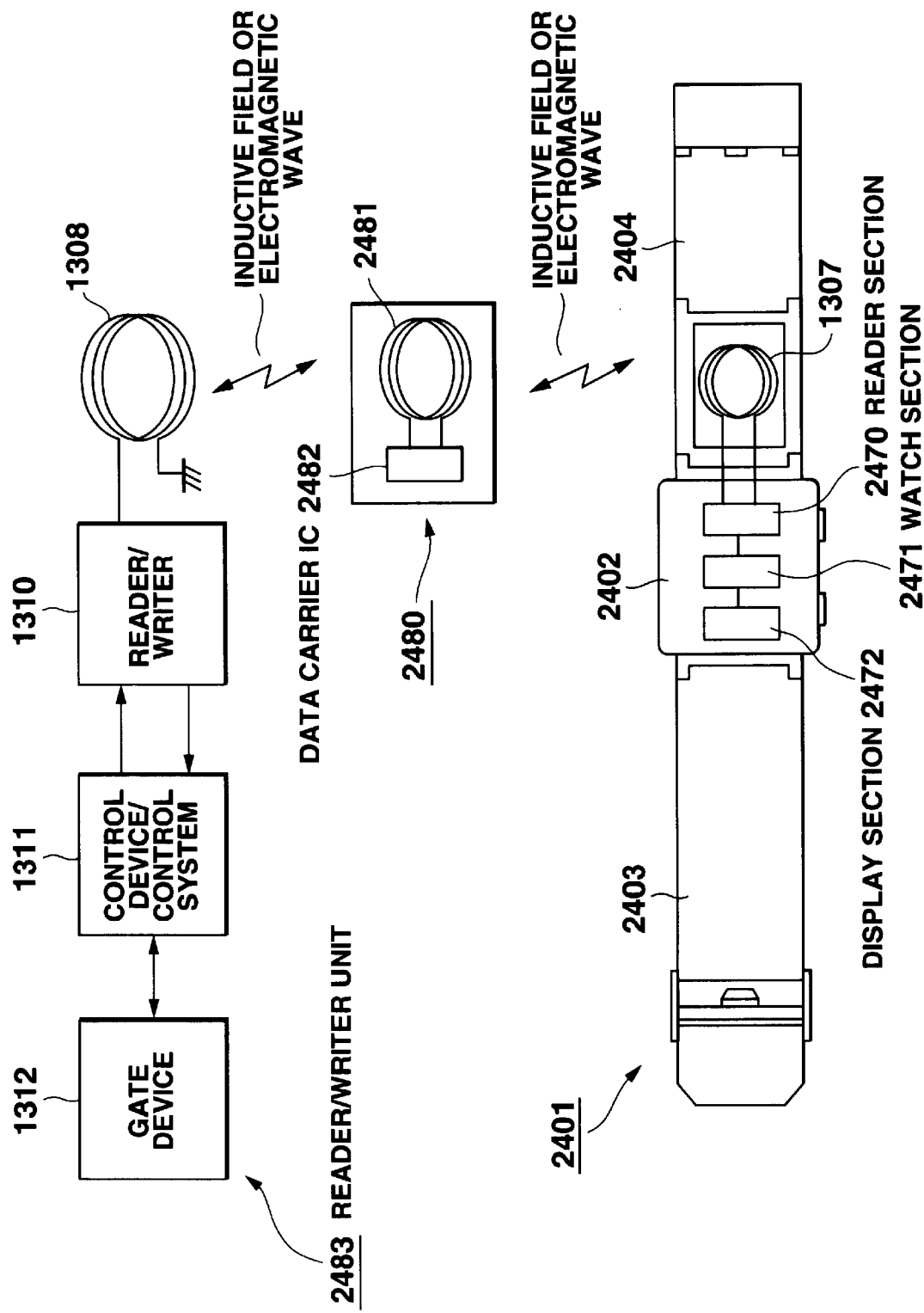
FIG. 62 is a view of system configuration showing a twenty-fourth embodiment of the present invention.

FIG. 62 shows a system configuration according to the twenty-fourth embodiment of the present invention. As illustrated, this system is composed of a wristwatch 2401, a non-contact type transcending card 2480 and a reader/writer unit 2483. The wristwatch 2401 is composed of a watch main body 2402 and wrist band members 2403 and 2404 engaged with both ends of the watch main body 2402. The data carrier antenna coil 1307 is arranged at one wrist band member 2404. The watch main body 2402 comprises a read-only reader section 2470 connected to the data carrier antenna coil 1307, a controller 2471, and a display section 2472 and a display section (not shown) and the like.

The non-contact type IC card 2480 (ID Tag) comprises the data carrier antenna coil 1307, a data carrier antenna coil 2481 contacted by the inductive electromagnetic field or electromagnetic waves, and a data carrier IC 2482. The reader/writer coil 2483 comprises the data carrier antenna coil 2481 of the non-contact type Transponding card 2480 and the reader/writer antenna coil 1308 contacted by the inductive electromagnetic field or electromagnetic waves. The reader/writer antenna coil 1308 is grounded at one end, and is connected to the reader/writer 1310 at the other end. The reader/writer 1310 is connected to the gate device 1312 via the system 1311.

Figure 63:
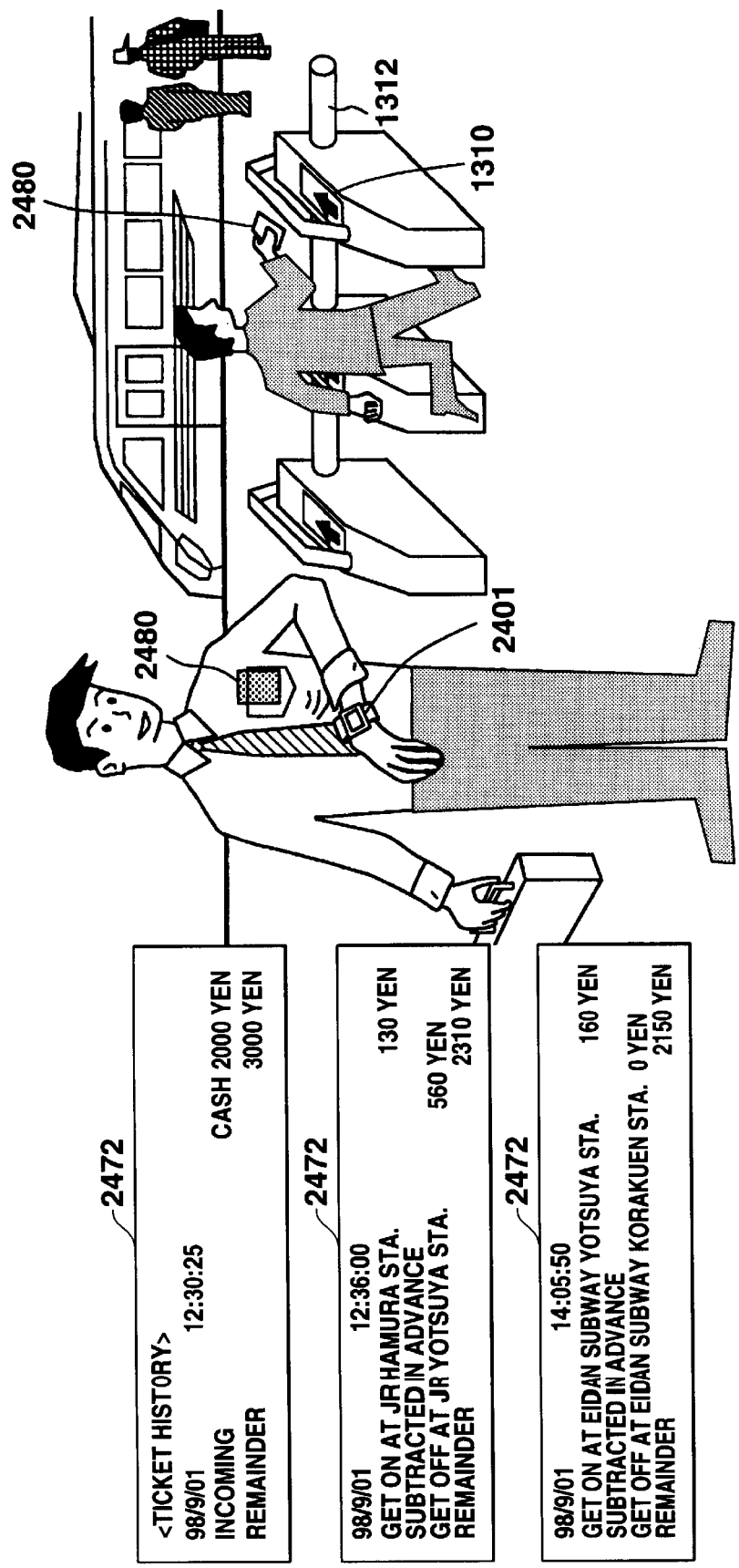
FIG. 63 is a conceptual view showing a utilization example of the twenty-fourth embodiment.

Therefore, in the present embodiment, as shown in FIG. 63, the non-contact type IC card 2480 (ID Tag) is worn in pocket or the like, whereby making it possible to generate the ID Tag function for automatically opening/closing the gate device 1312 or electronic currency data. Further, when the system user wears the wristwatch 2041, and makes the non-contact type transponding card 2480 close to the wristwatch 2041, contact using inductive electromagnetic waves between the non-contact type IC card 2480 (ID Tag) and the wristwatch 2041 is automatically performed. As illustrated, the utilization history or the like stored in the data carrier IC 2482 is displayed on a display section 2472 of the wristwatch 2401.

Therefore, the system user can easily check the utilization state of the system or the like.

As to a specific configuration of the wristwatch 2401, a configuration shown in each of the embodiments may be adopted as required.

Figure 64:
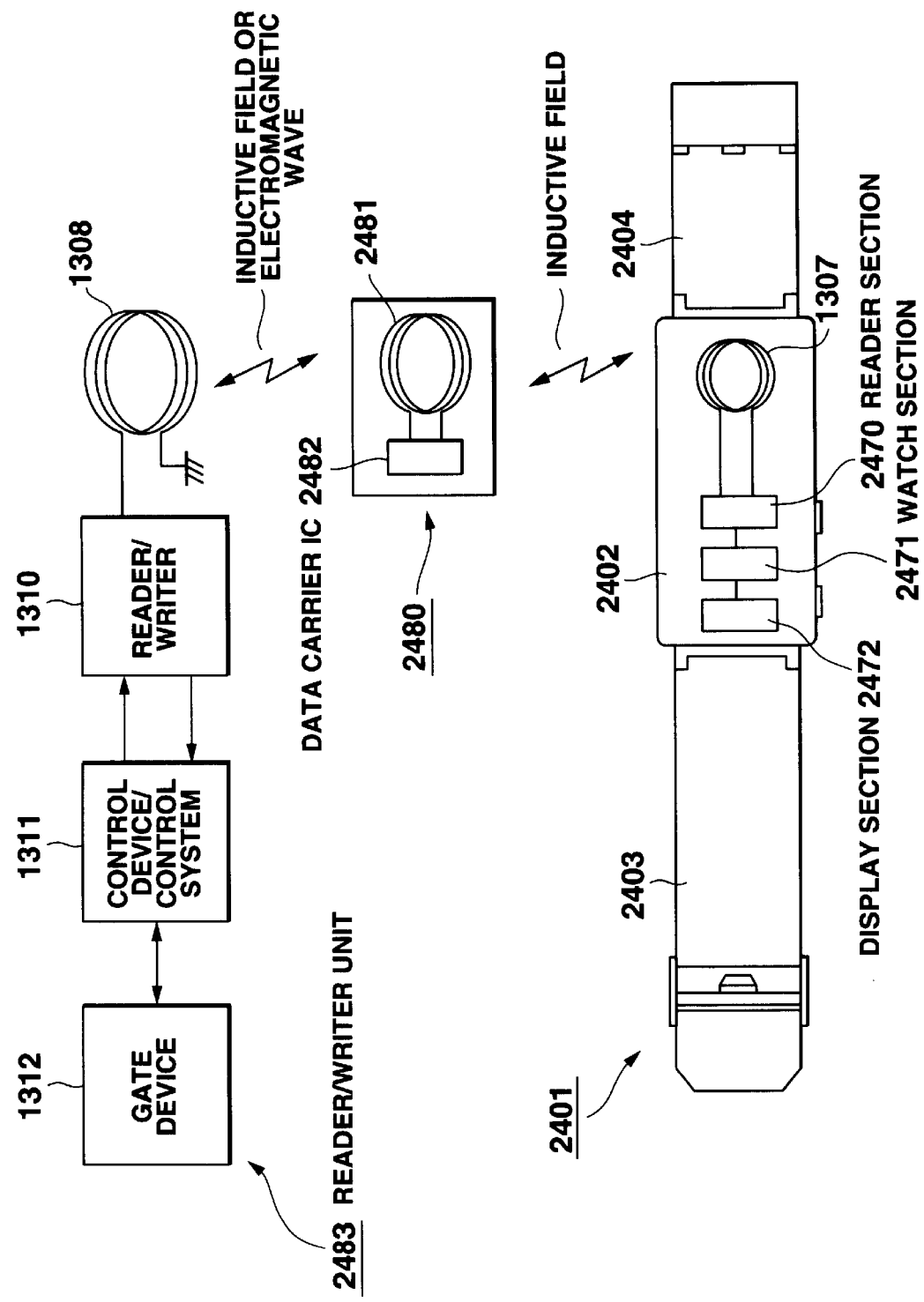
FIG. 64 is a view of system configuration showing a modified example of the twenty-fourth embodiment.

As shown in FIG. 64, the data carrier antenna coil 1307 may be arranged in the watch main body 2402.

In this case, a mount structure of the data carrier antenna coil 1307 to the watch main body 2402 is desirable to be that described in the first to twelfth embodiments.

Twenty-fifth Embodiment

Figure 65:
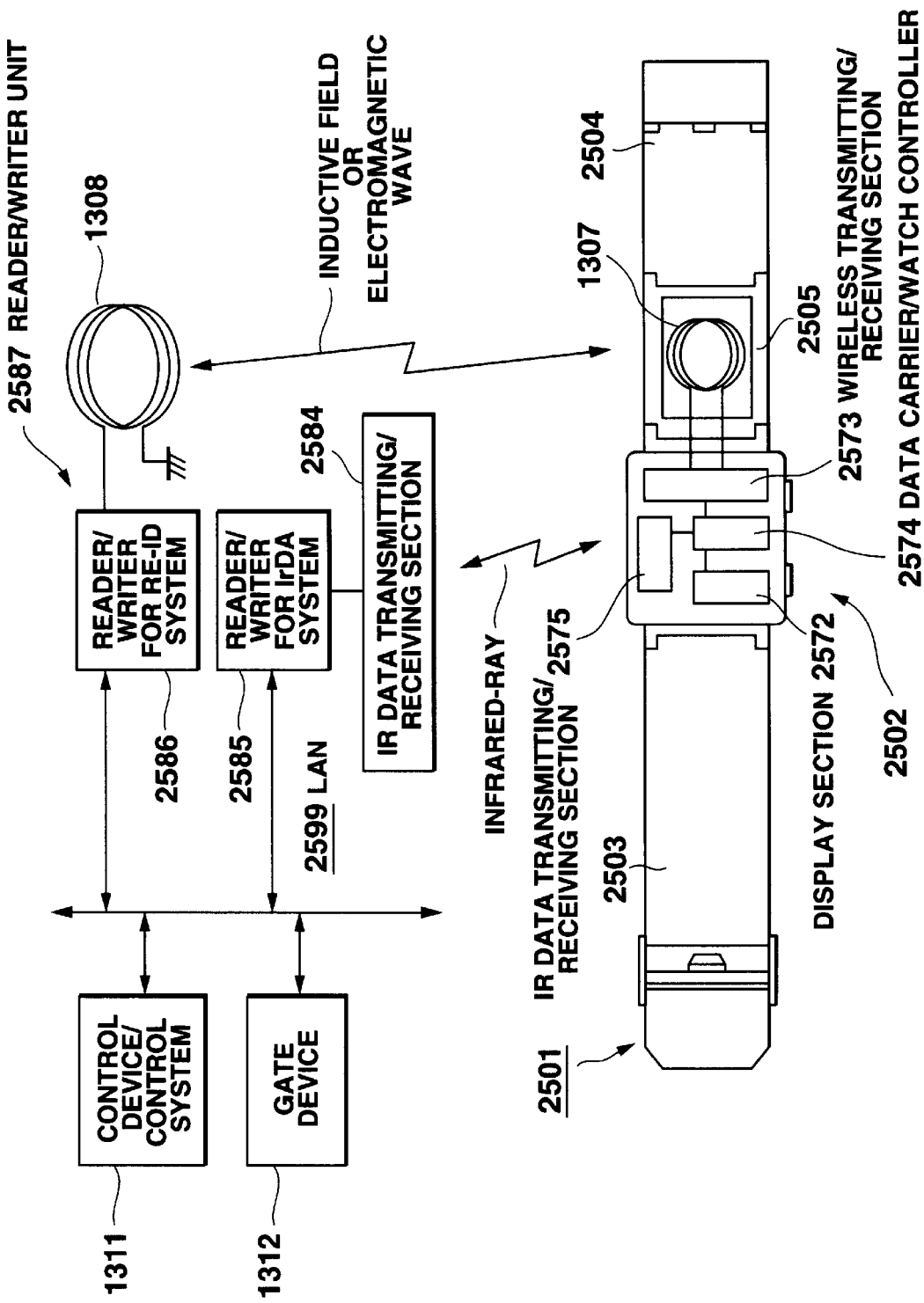
FIG. 65 is a view of system configuration showing a twenty-fifth embodiment of the present invention.

FIG. 65 shows a system configuration according to the twenty-fifth embodiment of the present invention. As illustrated, this system is composed of a wristwatch 2501 and a reader/writer unit 2587. The wristwatch 2501 is composed of a watch main body 2502 and wrist band members 2503 and 2504 engaged with both ends of the watch main body 2502. The data carrier antenna coil 1307 is arranged at one wrist band section or a band mount section 2505. The watch main body 2502 is provided with a wireless transmitting/receiving section 2573 connected to the data carrier antenna coil 1307, and the wireless transmitting/receiving section 2573 is connected to a data carrier/watch controller 2574. The display section 2572 and an Ir data transmitting/receiving section 2575 for infrared-ray data communication (hereinafter, referred to as IrDA (Infrared Data Association)) system conforming with the IrDA specifications are connected to the data carrier/watch controller 2574.

A reader/writer unit 2587 comprises the data carrier antenna coil 1307 of the wristwatch 2501 and the reader/writer antenna coil 1308 communicated by the inductive electromagnetic field or electromagnetic waves, and further, comprises an Ir data transmitting/receiving section 2575 of the wristwatch 2501 and an Ir data transmitting/receiving section 2584 for data communication by means of the IrDA system. The reader/writer antenna coil 1308 is grounded at one end, and is connected to a reader/writer 2586 for the RF-ID system at the other end. The transmitting/receiving section 2584 is connected to the IrDA reader/writer 2585. The RF-ID system reader/writer 2586 and the IrDA reader/writer 2585 are connected to the control device/control system 1311 and the gate device 1312 via a LAN 2599.

Figure 66:
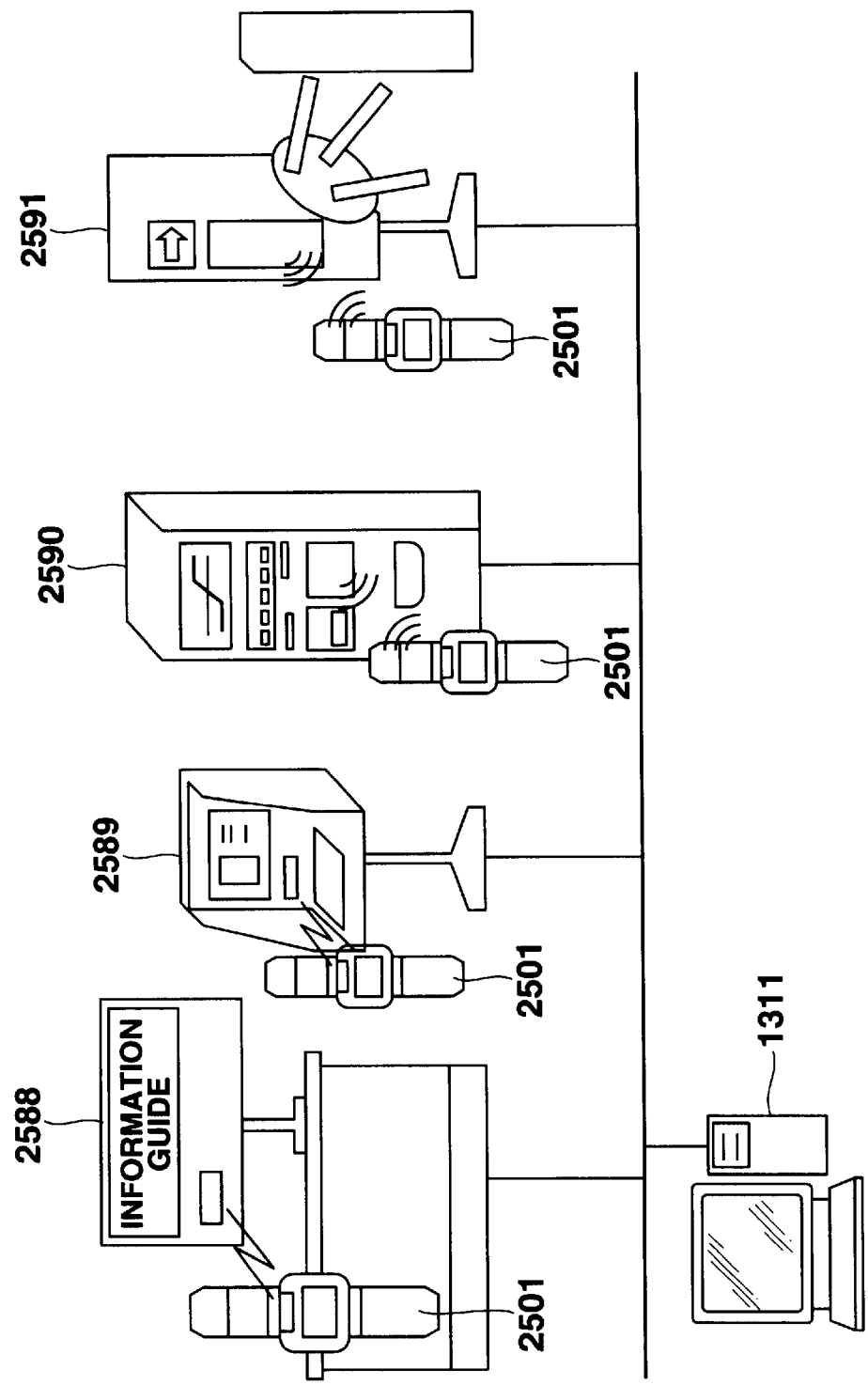
FIG. 66 is a conceptual view showing a utilization example of the twenty-fifth embodiment.

Therefore, according to the twenty-fifth embodiment, infrared-ray data communication as well as communication using the inductive electromagnetic field or electromagnetic waves are made possible, and can be used for various systems as shown in FIG. 66.

For example, in a network management system such as cyber mall in which various data communication systems coexist, the system user searches information stored and managed by the control device/control system 1311 or registers new information between the control device/control system 1311 constructed in a network server and an information data transmitter or message display device 2588 of an information transmitter or IrDA method of the IrDA system connected to the control device/control system 1311.

Desired information from an information source provided by the control device/control system 1311 such as regional information, guide information or service information is read and browser-displayed on a multimedia kiosk 2589 of the IrDA system connected to the control device/control system 1311 and installed in city or sightseeing spot and the like, and information exchange is performed.

The control device/control system 1311 connects with and manages an external electronic settlement system (not shown) and an automatic vending machine, ticket selling machine, and charging machine 2590 compatible with the RF-ID/IrDA system, whereby a desired commercial good and the like are purchased without cash utilizing the automatic vending machine, ticket selling machine, and charging machine 2590 compatible with these RF-ID/IrDA system.

Further, the system user can perform automatic ticket examination by means of communication with an automatic ticket examination 2591 for the above mentioned RF-ID system connected to the control device/control system 1311.

Thus, according to the twenty-fifth embodiment, the system user does not need carrying an information terminal conforming to each data type in a network system comprising an infrastructure in which various data communication protocols coexist, and can utilize various information services provided merely by wearing the wristwatch 2501.

Figure 67:
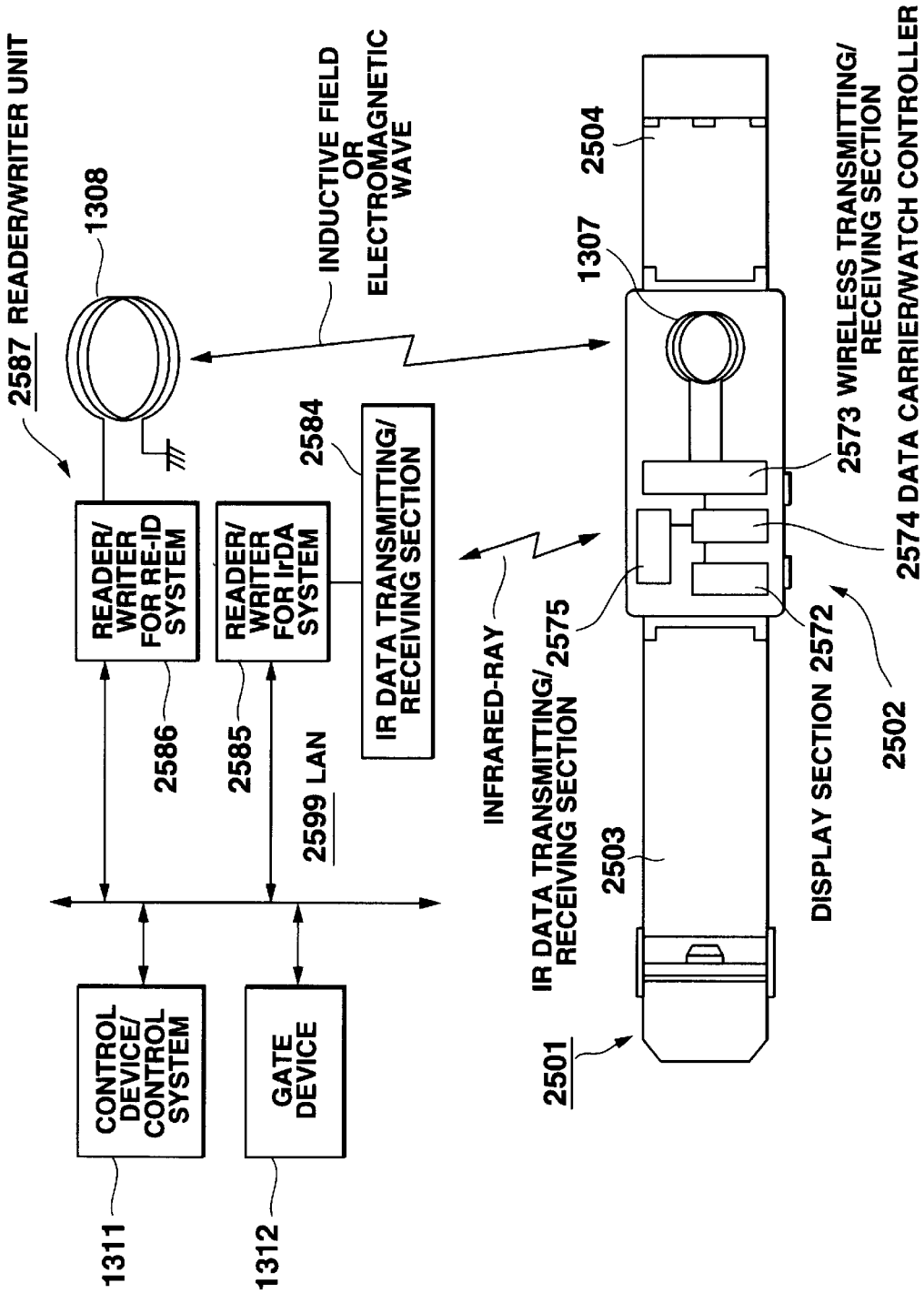
FIG. 67 is a view of system configuration showing a modified example of the twenty-fifth embodiment.

In the present embodiment, as shown in FIG. 67, the data carrier antenna coil 1307 may be arranged in the watch main body 2502.

In this case, a mount structure of the data carrier antenna coil 1307 to the watch main body is desirable to be that as described in the first to twelfth embodiments.

Twenty-sixth Embodiment

Figure 68:
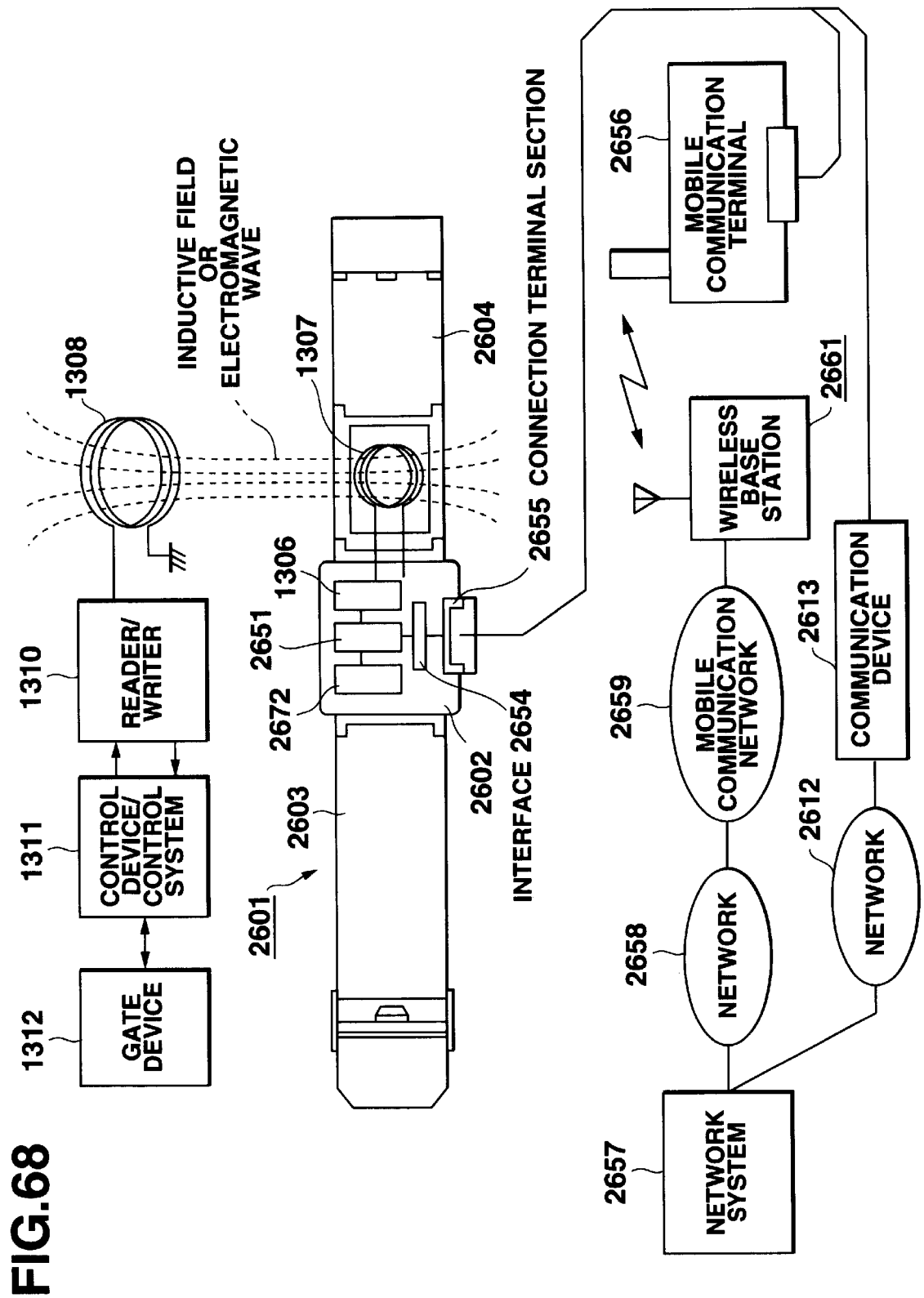
FIG. 68 is a view of system configuration showing a twenty-sixth embodiment of the present invention.

FIG. 68 shows a system configuration according to the twenty-sixth embodiment of the present invention. As illustrated, a wristwatch 2601 constituting this system is composed of a watch main body 2602 and wrist band members 2603 and 2604 engaged with both ends of the watch main body 2602. The watch main body 2602 is provided with a data carrier IC 1306 connected to the data carrier antenna coil 1307, a controller 2651 connected to the data carrier IC 1306, and a display section 2672 and an interface 2654, each of which is connected to the controller 2651. A connection terminal section 2655 is connected to the interface 2654.

The connection terminal section 2655 employs a mobile communication terminal 2656 such as cellular phone, smart phone, PDA, for example to perform data communication with a wireless base station 2651 on a wireless data communication network system in which the user of the network system 2657 is connectable to a public telephone line network (PSTN) or to connect with a communication device 2613 equipped with a wired/wireless model port, thereby making it possible to make data communication with the wireless data communication network.

The wireless base station 2651 is connected to a mobile communication network 2659 and the network system 2657 via a network 2658, and the communication device 2613 is connected to the network system 2657 via the network 2612.

Therefore, according to the present embodiment, the data received from the reader/writer 1310 by means of the data carrier antenna coil 1307 and the data carrier IC 1306 can be transmitted to the network system 2657 by means of the mobile communication terminal 2656 or communication device 2613. Alternatively, the data of non-contact type data carrier from the network system 2657 is received and written on the wristwatch 2601 via the mobile communication terminal 2656 or communication equipment 1613, and the data can be transmitted on the reader/writer 1310 via the data carrier IC 1306 and the data carrier antenna coil 1307.

According to the twenty-sixth embodiment, the system user merely wears the wristwatch 2601, making it possible to facilitate utilization or update procedures and in services (basic telephone conversation service or data communication service) to be provided by the wireless data communication network system or in registration services requiring the user's authentication.

Figure 69:
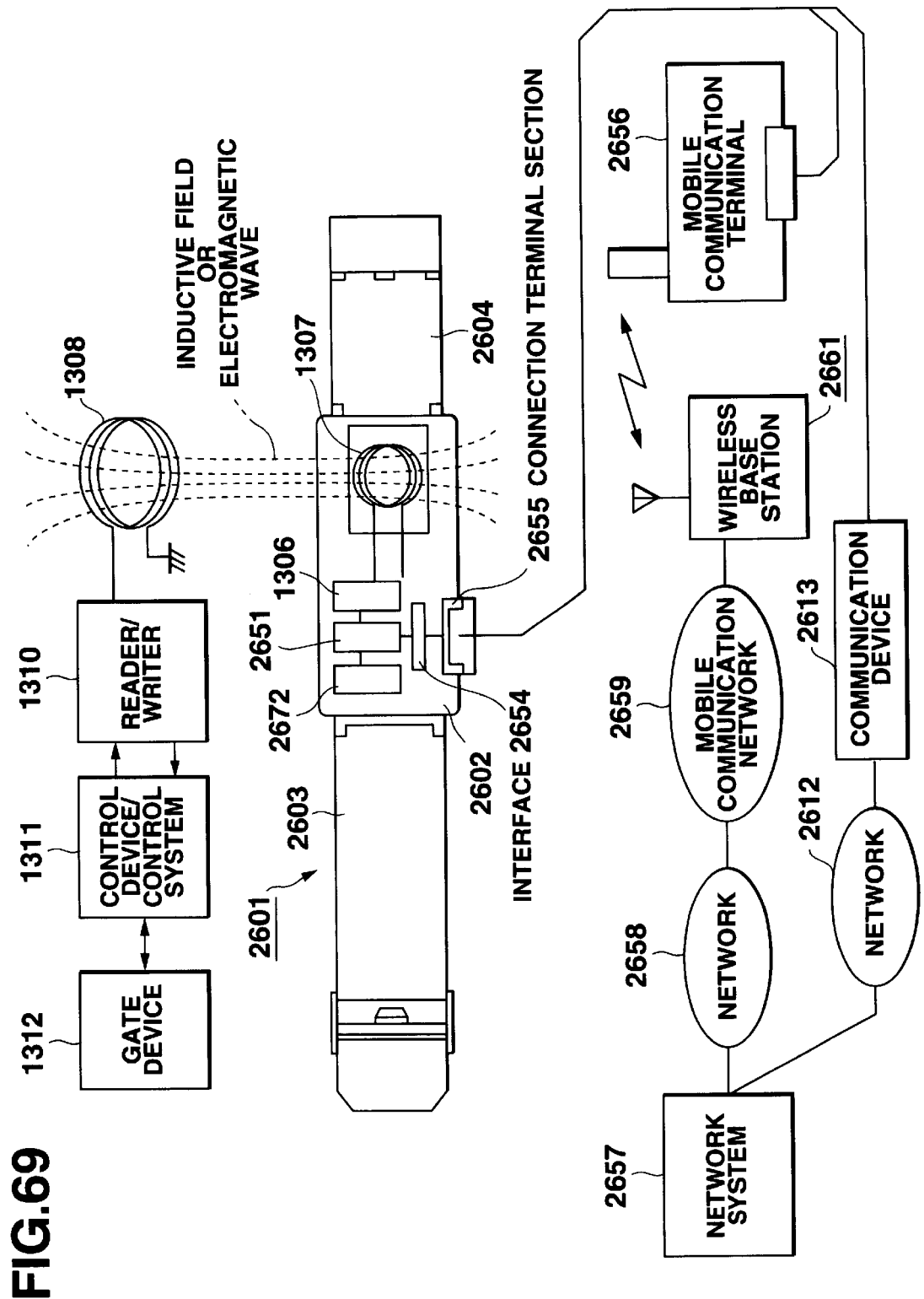
FIG. 69 is a view of system configuration showing a modified example of the twenty-sixth embodiment.

Of course, in the present embodiment, as shown in FIG. 69, the data carrier antenna coil 1307 may be arranged in the watch main body 2602.

In this case, a mount structure of the data carrier antenna coil 1307 to the watch main body is desirable to be that as described in the first to twelfth embodiments.

Twenty-seventh Embodiment

Figure 70:
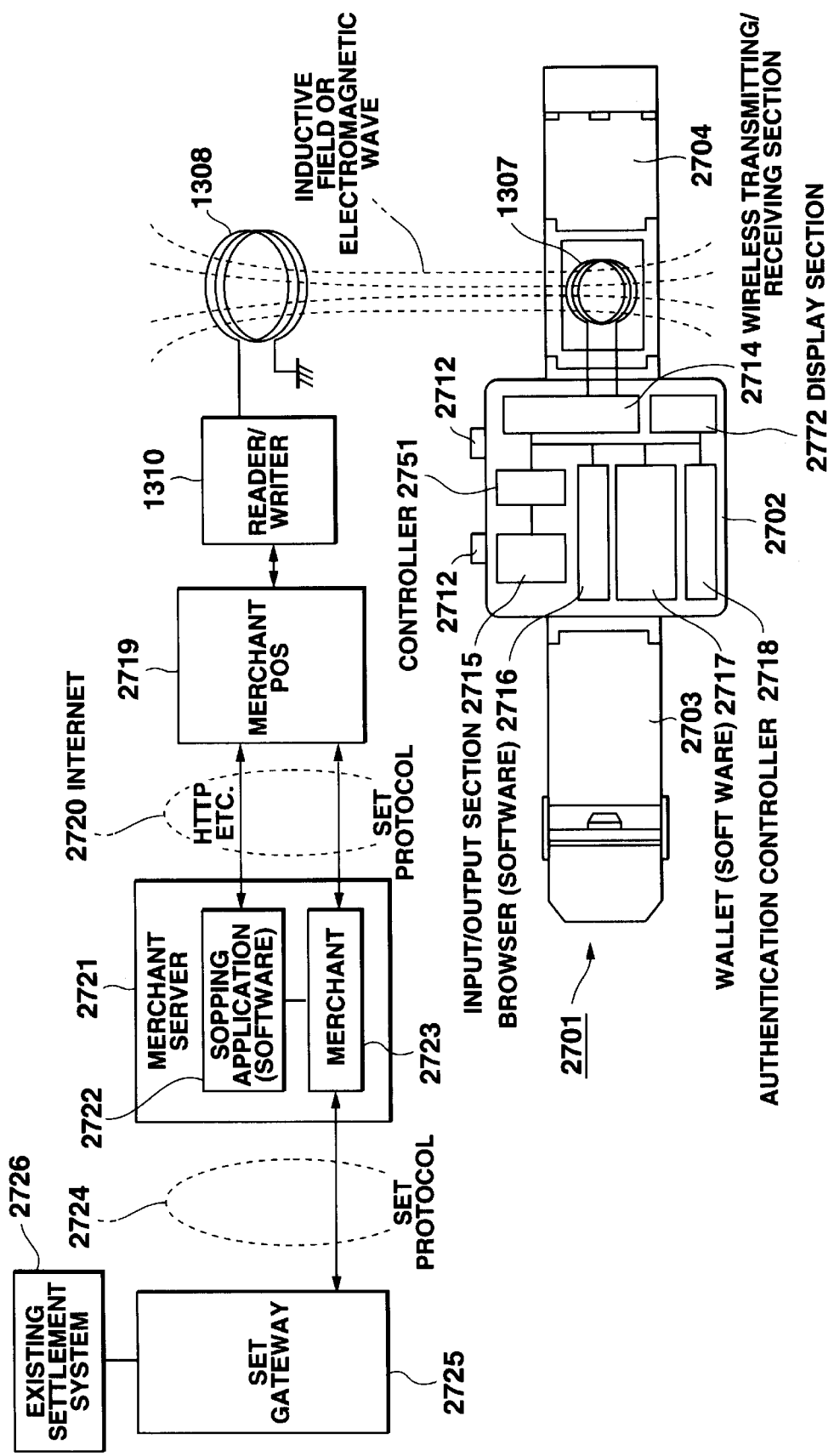
FIG. 70 is a view of system configuration showing a twenty-seventh embodiment of the present invention.

FIG. 70 shows the twenty-seventh embodiment of the present invention. In the figure, there is shown a settlement service system when a settlement protocol called Secure Electronic Transaction (hereinafter, referred to as SET) is applied onto Internet, and the wristwatch type ID Tag is employed for the protocol.

That is, in this system, the wristwatch 2701 is composed of a watch main body 2702 and band members 2703 and 2704 engaged with both ends of the watch main body 2702.

The data carrier antenna coil 1307 is provided at one wrist band member 2704, and a watch main body 2702 is provided with a transmitting/receiving section 2714 connected to the data carrier antenna coil 1307, an input/output section 2715 for connecting a controller 2751 to the transmitting/receiving section 2714, a key 2721, and a display section 2772. Browser (software) 2716 or Wallet (software for transmitting a shopping settlement instruction to a merchant POS described later) conforming to the above SET are pre-installed in a non-volatile memory such as ROM (not shown) of the watch main body 2702.

An authentication controller 2718 comprises a memory which stores a card number for identity check when this user is a member of the existing credit card as well as authentication of the user in the RF-ID system, and this memory function conforms to the user authentication data area 1667 in each of the embodiments described above.

A merchant POS (Merchant POS) 2719 is connected to the reader/writer 1310 comprising the reader/writer antenna coil 1308, and the merchant POS is connected to a merchant server 2721 of each member store in virtual shopping center via Internet 2720.

A shopping application (software) 2722 and a merchant (software) 2733 for performing processing conforming to the above SET and the user's certificate management processing are pre-installed in the merchant server 2721, and the merchant server 2721 is controlled by these software components during electronic commerce generation.

The merchant server 2721 connects Internet 2724 with the existing settlement system 2726 through the POS line via SET Gateway (Payment Gateway conforming to the above SET) 2725.

That is, in the present embodiment, the watch main body 2702 incorporates browser 2716, Wallet (software) 2717, credit number data for identity check, and memory (authentication controller 2718) for storing specific information allocated to the user.

First, when the user inputs URL of the desired member store in virtual shopping center by a key 2721, and holds the wristwatch 2701 on the reader/writer antenna coil, the wristwatch provides access to the merchant server of this member store on Internet 2720 by means of HTTP via the reader/writer antenna coil 1308, reader/writer 1310, and merchant POS.

The access-requested member store activates a shopping application 2722, and transmits data such as created commercial good information.

For a data communication method, the RF-ID system may be employed. If a data quantity of HTTP data is large, IrDA, wired/wireless data distribution is preferred. In this case, a system configuration conforms to the twenty-fifth and twenty-sixth embodiments.

After tradable commercial goods has been inspected through commercial information or the like displayed on the display section 2772, when the user selects and instructs a purchase of the desired commercial good by means of the key 2721, electronic commerce utilizing Internet is established merely by holding the wristwatch 2701 to the reader/writer.

That is, when the user holds the wristwatch 2701 to the reader/writer antenna coil 1308, the identification number of the selected commercial good is read from a memory which stores the identification number of the selected commercial good (in the controller 2751). Then, a settlement instruction conforming to SET is prepared by Wallet, and the information is transmitted by being connected from the data carrier antenna coil 1307 to the merchant server 2721 of each member store in vertical shopping center in Internet 2720 by means of SET (settlement protocol) via the reader/writer antenna coil 1308, reader/writer 1310, and merchant POS.

Further, Merchant (software) 2723 relays SET Gateway 2725 from Internet 2724, checks authentication or notification by means of the existing settlement system 2726 in financial institute via a POS line, and causes the checked data to be settled as a credit.

Figure 71:
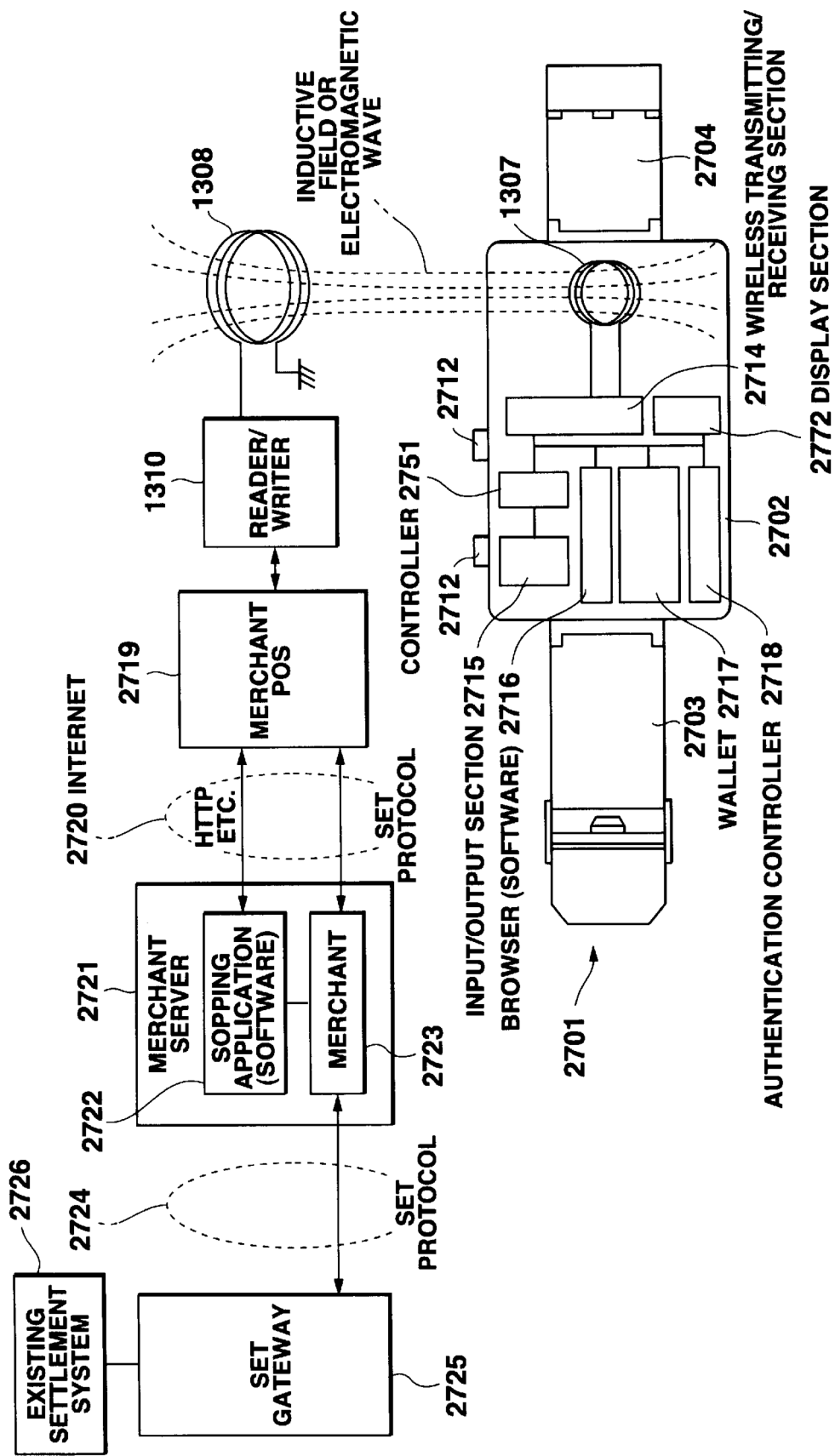
FIG. 71 is a view of system configuration showing a modified example of the twenty-seventh embodiment.

Of course, in the present embodiment also, as shown in FIG. 71, the data carrier antenna coil 1307 may be arranged in the watch main body 2702.

In this case, a mount structure of the data carrier antenna coil 1307 to the watch main body is desirable to be that as described in the first to twelfth embodiments.

Twenty-eighth Embodiment

Figure 72:
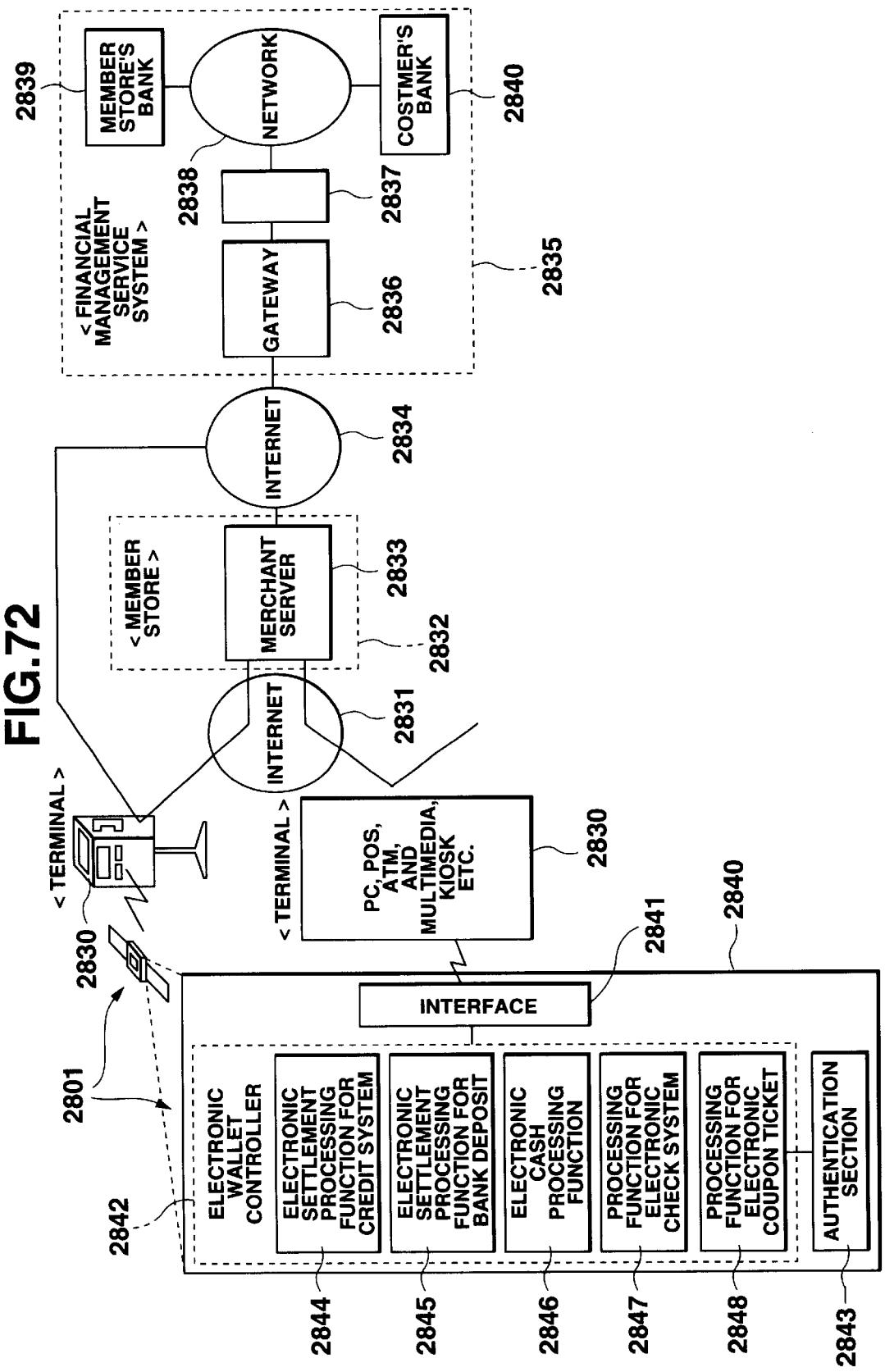
FIG. 72 is a view of system configuration showing a twenty-eighth embodiment of the present invention.

FIG. 72 shows the twenty-eighth embodiment of the present invention, wherein the present invention is applied to a charge settlement system, an electronic settlement system, an electronic currency payment system developed on a network system based on the twenty-seventh embodiment.

That is, a wristwatch 2801 having an ID Tag function is installed at street corners, authentication and commercial good trading between the user and the member store in virtual shopping center are performed by connection with a terminal 2830 (the types of terminals are PC, POS, ATM (CD), a multimedia kiosk installed at street corners without limited thereto if they has a network connection function and includes an RF-ID system).

Then, a terminal 2830 is connected to a merchant server 2833 of a member store 2832 via a wide area information communication network such as Internet (hereinafter, referred to as WWW (World Wide Web)) 2831.

Further, the merchant server 2833 is connected to a gateway 2836 of a financial management service system 2835 and a financial management host (main bank on network) 2837 via the Internet 2834 again.

Here, with respect to the encoded and received information associated with electronic commerce between the user and the member store 2832, the financial management host obtains specific information for identifying a person targeted for authentication using a predetermined, public key, registration information on the network 2838 of the member store, and trade information (money) or the like.

Then, based on the above information, money data based on the above trade information is read from a deposit of the customer's bank 2840, and transfer substitution processing is performed for the member store's bank 2839 (the member store's bank 2839 and the customer's bank 2840 may be identical to each other expect different deposit numbers)

The wristwatch 2801 incorporates various programs (functions) corresponding to the above processing.

First, an interface 2841 corresponding to the RF-ID system is provided (although the RF-ID system is employed as one of the features of the present invention, IrDA or Blue tooth may be employed).

The wristwatch 2801 comprises an electronic wallet controller 2842 connected to the interface 2841 and made of IC chips or the like, and an identity authentication section 2843 made of a non-volatile memory such as ROM, connected to the electronic wallet controller 2842, and storing credit number data, deposit number data, and specific information for identifying a person targeted for authentication such as passwords in the network.

Further, the electronic wallet controller 2842 comprises programs (software) for executing a credit system electronic settlement function 2844, a bank deposit electronic settlement function 2845, an electronic currency processing function 2846, an electronic check system processing function 2847, and an electronic coupon processing function 2848. The controller 2842 further comprises a memory (not shown) for receiving money data generated in the electronic commerce corresponding to the respective functions via the existing network and storing the utilization state (deposit remainder or the like) by utilizing the data.

Thus, in the twenty-eighth embodiment, as in the aforementioned twenty-seventh embodiment, the owner (user) of the wristwatch 2801 merely holds the wristwatch 2801 on the reader/writer (not shown, the details are given in the twenty-seventh embodiment) installed in the terminal, whereby performing a settlement instruction of data communication (electronic commerce) with the member store 2832 via a terminal 2830. Further, authentication and notification obtained from the financial institution 2835 through Internet 2831, 2834 can be checked, enabling credit system electronic settlement, bank deposit electronic settlement, electronic currency settlement, electronic check settlement, and electronic coupon settlement.

Twenty-ninth Embodiment

FIG. 73 shows the twenty-ninth embodiment of the present invention, wherein the present invention is applied to an authentication system for providing access to various servers (included multimedia database) from the outside.

That is, a wristwatch 2901 constituting this system is composed of a watch main body 2902 and wrist band members 2903 and 2904 engaged with both ends of the watch main body 2902.

The data carrier antenna coil 1307 is provided at one wrist band member 2904, and the watch main body 1902 is provided with a wireless transmitting/receiving section 2914 connected to the data carrier antenna coil 1307, a controller 2951 sequentially connected to the wireless transmitting/receiving section 2914, a communication processing execution program 2960 storing processing programs in this authentication system, a communication connection controller 2961, and an input/output section 2915.

The other end of the reader/writer antenna coil 1308 grounded at one end is connected to the communication connection apparatus or remote access server 2964 via a wireless transmitting/receiving section 2963.

The communication connection apparatus or remote access server 2964 is provided with a communication controller 2965, an authentication controller 2966, a communication connection controller 2987, and a network connection section 2968.

The network connection section 2968 is connected to an authentication server 2969, various servers (included multimedia database) 2970 and 2971, and a host PC 2972 via a LAN 2973.

In the present embodiment the wristwatch 2901 controls the communication connection controller 2961 based on the contents of the communication processing execution program 2960, and transmits from the data carrier antenna coil

1307 the identity authentication data based on specific information such as registered-member's number data allocated in advance in the network, stored in the identity authentication data section 2692. The reader/writer antenna coil 1308 receives this, and the communication connection apparatus or remote access server 2964 captures the identity authentication data via a wireless transmitting/receiving section 2963.

Thereafter, the communication connection apparatus or remote access server 2964 is connected to the LAN 2973 at the network connection section 2968, captures identity authentication data shown in a registered-members list (not shown) stored in the authentication server 2969, collates it with the identity authentication data at the authentication controller 2966, and performs authentication processing.

When authentication processing completes normally, the communication connection apparatus or remote access server 2964 reads data from various servers (included multimedia database) 2970 and 2971, and transmits the data to the wristwatch 2901 side via the wireless transmitting/receiving section 2963 and the reader/writer antenna coil 1308.

When a data quantity is large, IrDA and wired/wireless data communication system as well as RF-ID system may be employed.

The wristwatch 2901 can receive/store/manage the read data from various servers (included multimedia database) 2970 and 2971.

Of course, in the present embodiment also, as shown in FIG. 74, the data carrier antenna coil 1307 may be arranged in a watch main body 2902.

In this case a mount structure of the data carrier antenna coil 1307 to the watch main body is desirable to be that as described in the first to twelfth embodiments.

In the above mentioned embodiments, although a case the data carrier is incorporated in the wristwatch has been described, the data carrier may be incorporated in a device provided with an article with its highly ornamental properties such as pendant, for example. In this case, even if a metal member is used, a high-quality data communication function can be maintained in the RF-ID system.

Thus, according to the present invention, even if a mainframe is resin-based, the guarantee of water resistance (pressure resistance), shock resistance, rigidity, and hostile-environment resistance of the intrinsic wristwatch main body can be maintained by a metallic annular member allocated thereon and a metallic plate-shaped member installed on the back face side of the mainframe.

The antenna coil is allocated at a position distant from the metallic plate-shaped member, the probability that a magnetic flux is prevented by this plate-shaped member or metallic annular member can be reduced significantly. Therefore, the guarantee of water resistance (pressure resistance) shock resistance, rigidity, and hostile-environment resistance of the intrinsic wristwatch main body can be maintained.

With a box body structure having a resin-based fixing member that comprises a cutout to fix the antenna coil between the annular member ad the plate-shaped member, the antenna coil can be reliably fixed between the annular member and the plate-shaped member. Therefore, a probability that the magnetic flux is prevented by the metallic annular member and plate-shaped member can be reduced.

The mainframe is worn on the wrist, is formed in preferable shape, and comprises a bezel provided with a fixing mechanism for fixing the antenna coil therein, thereby making it possible to wear a data communication apparatus on the arm and eliminate risk if the user has left it.

The antenna coil is fixed to the bezel, thereby making it possible to reduce the resultant effect upon the magnetic flux even if metal parts are arranged in the mainframe.

The mainframe further comprises a circuit section that operates corresponding to electromotive force generated at the antenna coil, thereby making it possible to generate various functions by operation of the circuit section by wristwatch simplex even if it is applied to the wristwatch main body.

Moreover as described previously, since an effect upon the magnetic flux is small, electromotive force due to the antenna coil is sufficiently generated, thereby ensure reliable operation of the circuit section.

A plurality of antenna coils corresponding to periodic properties according to change with time in the mutually different magnetic fluxes are provided inside of the mainframe, whereby making it possible to make data communication with plural types of apparatuses having their different periodic properties in change with time in the magnetic flux such as the RF-ID system reader/writer or the like having their different use frequencies.

This magnetic member is formed by cutting out a part of the plate-shaped member, whereby making it possible to ensure a magnetic flux path in which a magnetic flux passes through a part of the metallic plate-shaped member installed on the back face side of the mainframe, i.e., a magnetic flux path in which a magnetic flux passes from the back face side to the surface side. In this manner, data communication performance can be improved.

The magnetic member is provided at the inner periphery of the antenna coil, thereby making it possible to ensure a magnetic flux path in which a magnetic flux passes through the inner periphery of the antenna coil. In this manner, data communication performance can be further improved.

The mainframe is formed in preferable shape when it worn on the arm so that time information is displayed by a display member. In this manner a wristwatch function and a data communication function can be provided together, the user wears the wristwatch on the arm without feeling resistance, making it possible to perform data communication.

A transparent member for protecting the display member is further provided, an annular member is employed as a fixing member for fixing this transparent member on this mainframe, whereby making it possible to ensure shock resistance and rigidity of a resin-base mainframe through efficient use of the fixing member.

In a wristwatch type electronic device according to the present invention, an electromotive generating section is provided at a wrist band section. Even if the wristwatch type electronic device main body is formed of a conductive material such as metallic material, there is no problem in operation of electromotive generating section which generates electromotive force according to change with time in the magnetic flux supplied from the outside. Thus, ornamental properties and design of the wristwatch type electronic device main body can be diversified.

Moreover, unlike a case when electromotive generating section is incorporated in the device main body, electromagnetic inducting waves with their appropriate frequency bandwidths can be utilized without considering a magnetic flux forming problem. Further, since an electromotive generating section is not arranged in the apparatus main body, the mounting constraint is not expanded, and thus, there is no need for large-sizing the equipment main body according to the size of the electromotive generating section.

Therefore, a wristwatch type electronic device comprising a data processing function can be achieved in size almost equal to the existing wristwatch.

A wrist band section is provided with at least one of the data processing section for data processing corresponding to electromotive force and the controller which controls the electromotive force generating section. Thus, the number of parts arranged at the device main body is relatively reduced, and a wristwatch type electronic device comprising a watch function and a data processing function can be achieved while the device main body is minimized.

The electromotive force generating section is detachably connected to the wristwatch type electronic device main body and the wrist band section. Thus, this wristwatch type device main body can function as a data communication apparatus having the watch function, and can function as an ordinary wristwatch.

The wristwatch type electronic device is provided with at least one of the data processing section and controller so as to be electrically connected to the electromotive force generating section provided at the wrist band section. Thus, the data processing section or controller can be arranged so as to be easily mounted through efficient use of a space at the wristwatch type electronic device main body while ensuring electric connection with the electromotive force generating section.

The wristwatch type electronic device according to the present invention is capable of generating a function as a wristwatch by a calculator which calculates time information and a display which displays the calculation result obtained by the calculator. The electronic device is further capable of generating a function as a data communication apparatus by the electromotive force generating section, data processing section, and controller.

Therefore, the wristwatch type electronic device having the function as a wristwatch and a function as a data communication apparatus can be achieved.

Data to be used is stored, is read, and is displayed by the display. Thus, the data can be displayed using the display which displays time information without connecting any other external device, thereby making it possible to visualize the data to be used any time.

Read/display enable data and read/display disable data are stored in individual data storage means. Thus, data security can be ensured, making it possible to display data using the display which displays time information.

The electromotive force generating section is provided at the wrist band section. Thus, even if a large-sized display is provided at the wristwatch type electronic device main body, there is no problem with operation of the electromotive force generating section configured to generate electromotive force according to change with time in the magnetic flux supplied from the outside. Therefore, the display is large-sized, an visibility of data to be displayed is improved, making it possible to ensure normal operation of electromotive force generating section.

A plurality of data processing sections are provided corresponding to periodic properties in change with time of electromotive force generated by the electromotive force generating section. Thus, electromagnetic inducting waves having their different periodic properties can be output from single electromotive force generating section, thereby enabling data communication with a plurality of devices with their different frequencies.

A processing control section which controls the data processing section is further provided corresponding to periodic properties of change with time in electromotive force generated by the electromotive force generating section. In this manner, when data communication with a plurality of devices having their different frequencies is performed, the data processing section can be properly controlled corresponding to the devices that perform the data communication.

In the case where it is determined whether or not the electronic device is attached to a human body, and it is determined that the device has been attached to the human body, data processing is executed. Thus, when this wristwatch type electronic device is not worn on the arm or is lost, data processing can be prevented from being executed wastefully, whereby data security can be ensured.

A tilt state of the device main boy is determined so as to control execution of data processing. Only when the device is worn on the user's wrist, and is set at a tilted posture within the range of a certain angle, processing is executed by data processing section. Otherwise, control for stopping processing is enabled.

Therefore, operation at an unnatural posture or position can be eliminated as an incorrect use or invalid use, whereby making it possible to ensure security and prevent incorrect operation.

Data communication via a public line network is enabled, the data communicated via the public line network is stored, an data used for data processing is stored and managed based on the stored data. Thus, this wristwatch type electronic device can be employed for a management system using the public line network.

A section which communicates the stored data through data communication via the public line network is provided. Thus, the data acquired by data communication with electromagnetic inductive waves via the electromotive force generating section can be transmitted via the public line network, whereby making it possible to improve efficiency when this wristwatch type electronic device is employed for a management system using the public line network.

In an authentication system according to the present invention, authentication data is read from an electronic device attached to a person targeted for authentication by electromagnetic induction in non-communication state. In the case where the authentication data matches authentication data registered in the system, the utilization of the system by the person targeted for authentication is enabled. Thus, the user can manage the utilization of the system without feeling complication during use.

The utilization of the system is read by electromagnetic induction from a card-like storage medium that the person targeted for authentication owns, and is displayed. The user wears the card-like storage medium in cloth pocket or the like, thereby making it possible to easily check the system utilization state.

When the authentication data from the electronic device side is matched, the permissible data is transmitted, and the data is received on the authentication system side. Information is displayed based on the received data. When authentication data is matched, message or the like is displayed by information display on the authentication system side, and can be visualized by a person targeted for authentication.

The electronic device performs data communication via a public line network, and stores the communicated data. Of the stored data, the electronic device is controlled based on the data used in the authentication system. Therefore, according to this authentication system, the data used in the authentication system is distributed via the public line network, thus making it possible to use the electronic device in the authentication system without storing the data in advance in the electronic device.

The electronic device comprises means for communicating authentication data via a public line network, thereby making it possible to diversify transmission mode of the authentication data and improve convenience during authentication.

The present invention comprises a management section which manages a deposit of a person targeted for authentication and a management section which manages the accounting contents of the person targeted for authentication utilizing the authentication system. When the person targeted for authentication is enabled to utilize the system, the contents of the management sections are controlled using the authentication data. Thus, when the authentication data is matched, and the person targeted for authentication is enabled to utilize the system, the deposit and accounting contents of the person targeted for authentication are updated.

Therefore, verification of authentication or notification is given from the financial institute side by means of this authentication system, making it possible to construct a system capable of performing credit system electronic settlement, bank deposit electronic settlement, electronic currency settlement, electronic check settlement, and electronic coupon settlement.

An enabling section which enables utilization of the system and each of the management sections are connected via a network, thus making it possible to check a deposit and an accounting (trading) due to system utilization via a network any time and anywhere.

When connection with a storage management system that exists outside of the authentication system via a network enables utilization of the authentication system due to the matching of authentication, access to the storage management system is enabled. In this manner, the security of the storage management system that exists outside of the authentication system is ensured, making it possible to efficient use data stored in the storage management system.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data communication apparatus comprising:

a resin-based mainframe;

a metallic annular member installed at said mainframe;

a metallic plate-shaped member installed on a back face of said mainframe; and an antenna coil positioned at a position distant from said plate-shaped member, wherein electromotive force is generated due to change with time in a magnetic flux that passes between said annular member and said plate-shaped member;

wherein said mainframe comprises a magnetic member for introducing said magnetic flux into said mainframe; and wherein said magnetic member is formed by cutting out a part of said plate-shaped member.

2. The data communication apparatus according to claim 1, wherein said mainframe comprises a resin-based fixing member provided with a cutout for fixing said antenna coil between said annular member and said plate-shaped member.

3. The data communication apparatus according to claim 1, wherein said mainframe is shaped to be worn on a wrist, and comprises a bezel provided with a fixing mechanism for fixing said antenna coil.

4. The data communication apparatus according to claim 1, wherein said mainframe further comprises a circuit section that operates corresponding to the electromotive force generated at said antenna coil.

5. The data communication apparatus according to claim 1, wherein said mainframe comprises a plurality of antenna coil segments corresponding to periodic properties of change with time in different magnetic fluxes therein.

6. The data communication apparatus according to claim 1, wherein said mainframe is shaped to be worn on a wrist, and said data communication apparatus further comprises:

a calculation circuit configured to calculate at least time information; and a display device configured to display said at least time information calculated by said calculation circuit.

7. The data communication apparatus according to claim 6, wherein:

said mainframe comprises a transparent member for protecting said display member, and said annular member comprises a fixing member for fixing said transparent member to said mainframe.

8. The data communication apparatus according to claim 1, wherein said magnetic member is provided at an inner periphery of said antenna coil.

* * * * *